(12) United States Patent
Aflalo et al.

(10) Patent No.: US 10,878,486 B1
(45) Date of Patent: Dec. 29, 2020

(54) METHODS, SYSTEMS, AND DEVICES FOR DYNAMIC CUSTOMIZED RETAIL EXPERIENCE AND INVENTORY MANAGEMENT

(71) Applicant: LYMI INC., Vernon, CA (US)

(72) Inventors: Yael Aflalo, Venice, CA (US); Jessica Chappell, Los Angeles, CA (US); Kevin Hollingsworth, Los Angeles, CA (US)

(73) Assignee: LYMI INC., Vernon, CA (US)

( * ) Notice: Subject to any disclaimer, the term of this patent is extended or adjusted under 35 U.S.C. 154(b) by 374 days.

(21) Appl. No.: 15/871,456

(22) Filed: Jan. 15, 2018

Related U.S. Application Data

(60) Provisional application No. 62/455,817, filed on Feb. 7, 2017.

(51) Int. Cl.
| | |
|---|---|
| *G06Q 30/06* | (2012.01) |
| *H04W 4/35* | (2018.01) |
| *H04W 4/33* | (2018.01) |
| *G06Q 10/08* | (2012.01) |

(52) U.S. Cl.
CPC ....... *G06Q 30/0641* (2013.01); *G06Q 10/087* (2013.01); *H04W 4/33* (2018.02); *H04W 4/35* (2018.02)

(58) Field of Classification Search
None
See application file for complete search history.

(56) References Cited

U.S. PATENT DOCUMENTS

2004/0128025 A1* 7/2004 Deal ............... G06Q 10/06
700/236

2009/0289775 A1* 11/2009 Kubota ............... G06Q 10/087
340/10.6
2014/0279294 A1* 9/2014 Field-Darragh ..... G06Q 10/087
705/28
2015/0262288 A1* 9/2015 Cypher .............. G06F 16/955
705/27.2
2019/0043002 A1* 2/2019 King ............... G06Q 30/0281

OTHER PUBLICATIONS

Melià-Seguf, Joan, et al. "Enhancing the shopping experience through RFID in an actual retail store." Proceedings of the 2013 ACM conference on Pervasive and ubiquitous computing adjunct publication. 2013 (Year: 2013).*

* cited by examiner

*Primary Examiner* — Michelle T Kringen

(74) *Attorney, Agent, or Firm* — Kunzler Bean & Adamson, PC

(57) ABSTRACT

A physical retail establishment system comprises a physical retail establishment comprising a showroom area, a stockroom area, a dressing room area, and a wardrobe, the wardrobe comprising a first door that separates the wardrobe from the dressing room area, and a second door that separates the wardrobe from the stockroom area; a first electronically controllable lock for selectively locking the first door; a second electronically controllable lock for selectively locking the second door; an electronic lock controller in electronic communication with the first and second electronically controllable locks to control whether the first and second electronically controllable locks are in a locked state or an unlocked state; a plurality of user access point systems located at the retail establishment; and a central server configured to present an API over a computer network to the plurality of user access point systems.

20 Claims, 53 Drawing Sheets

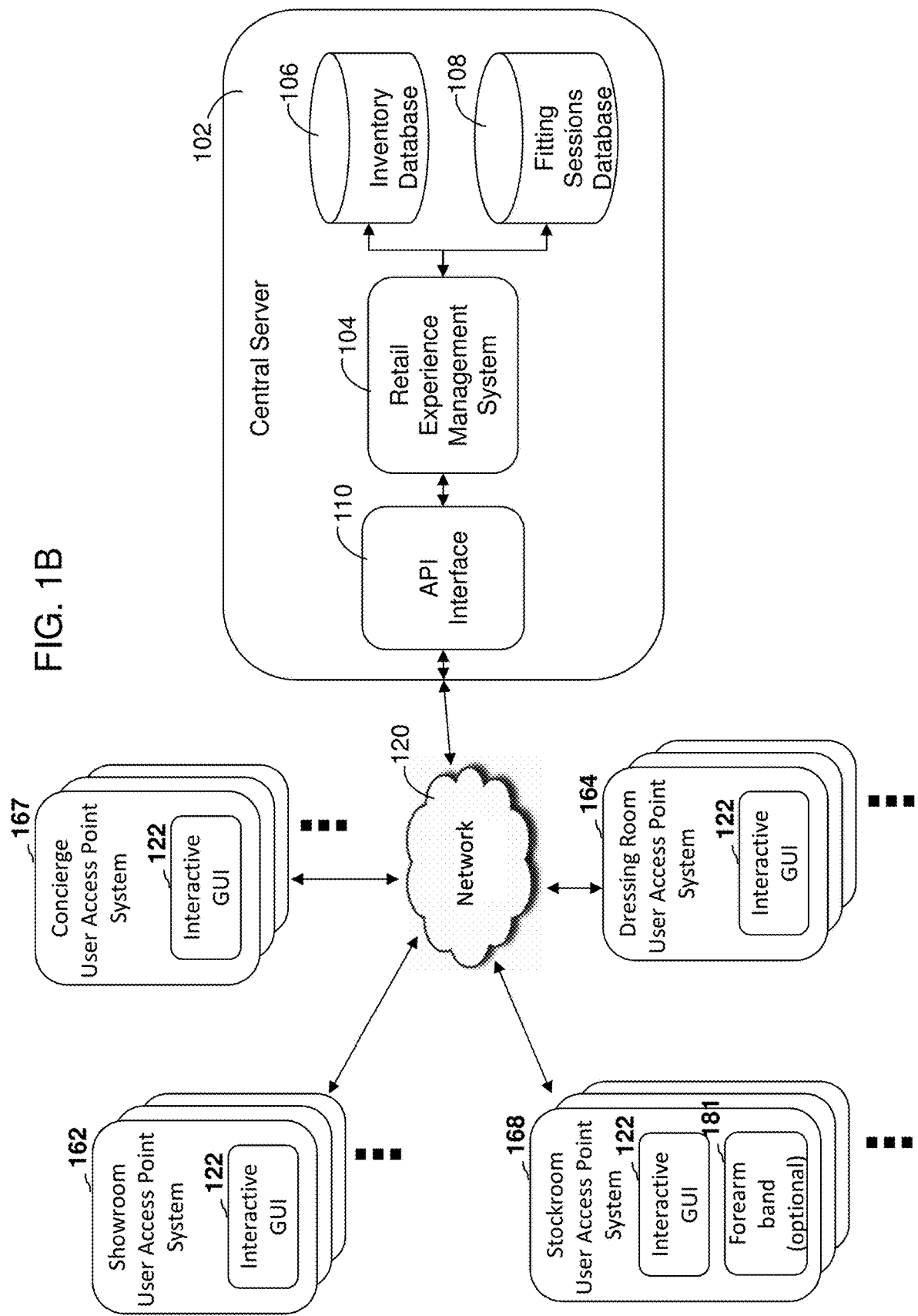

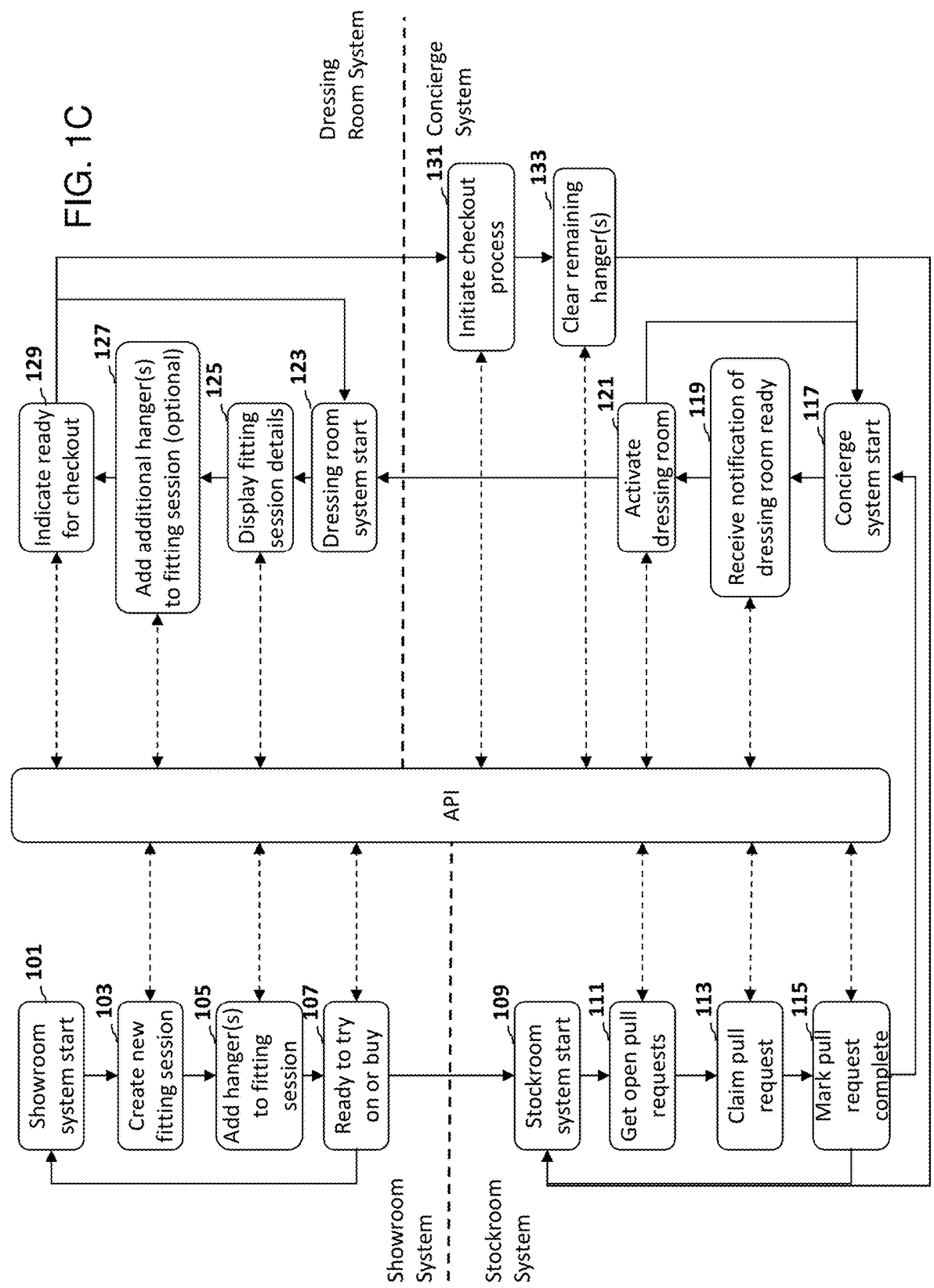

FIG. 1E
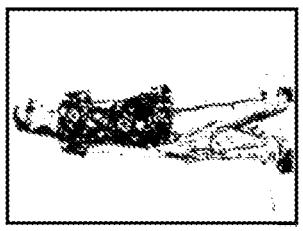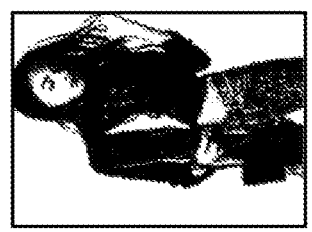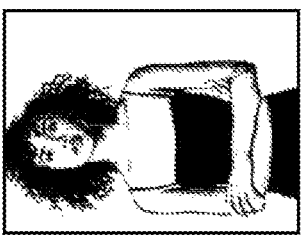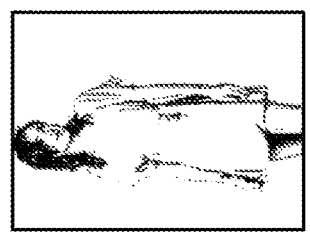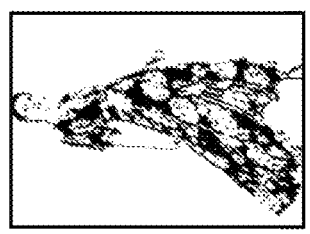

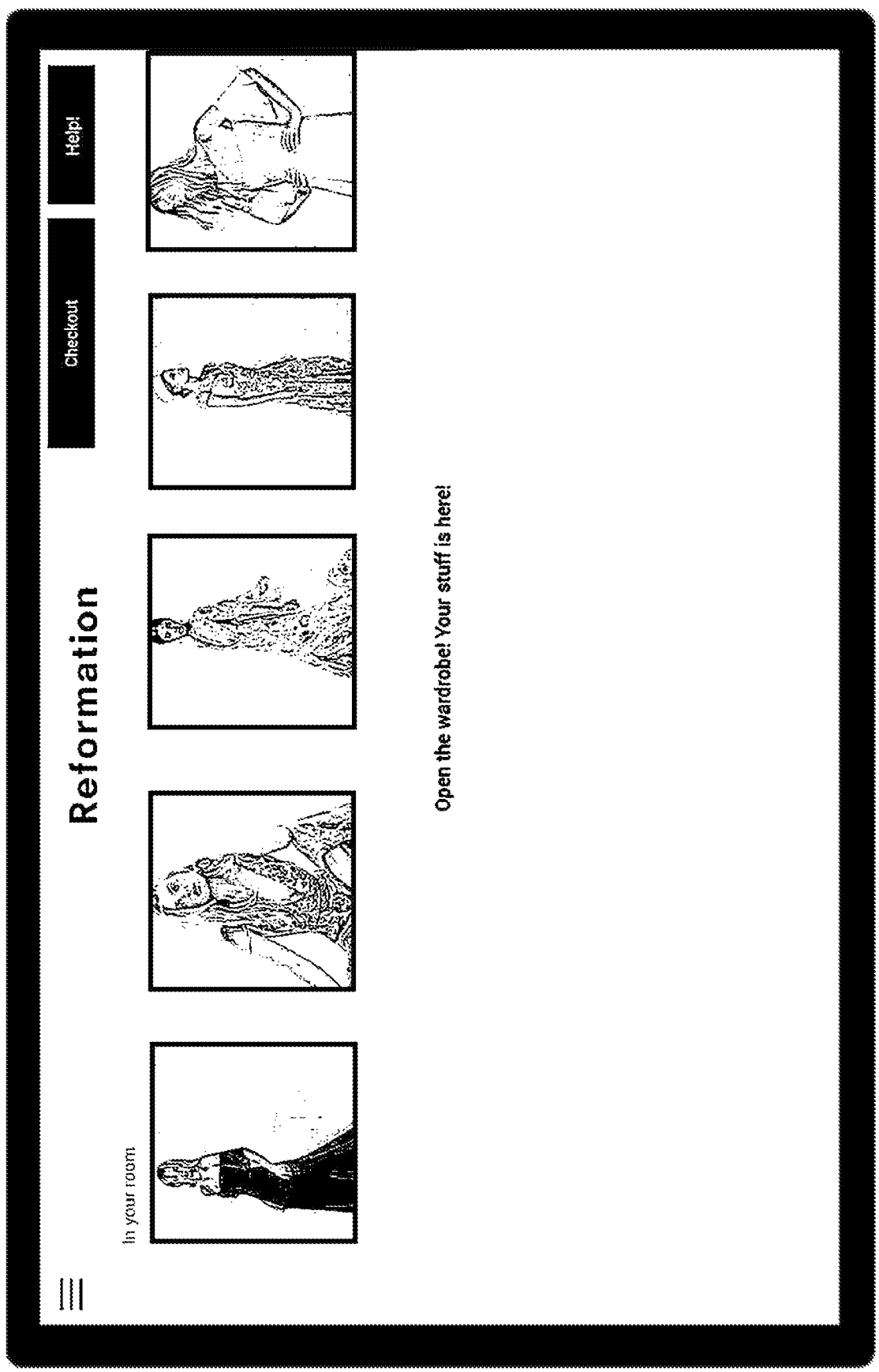

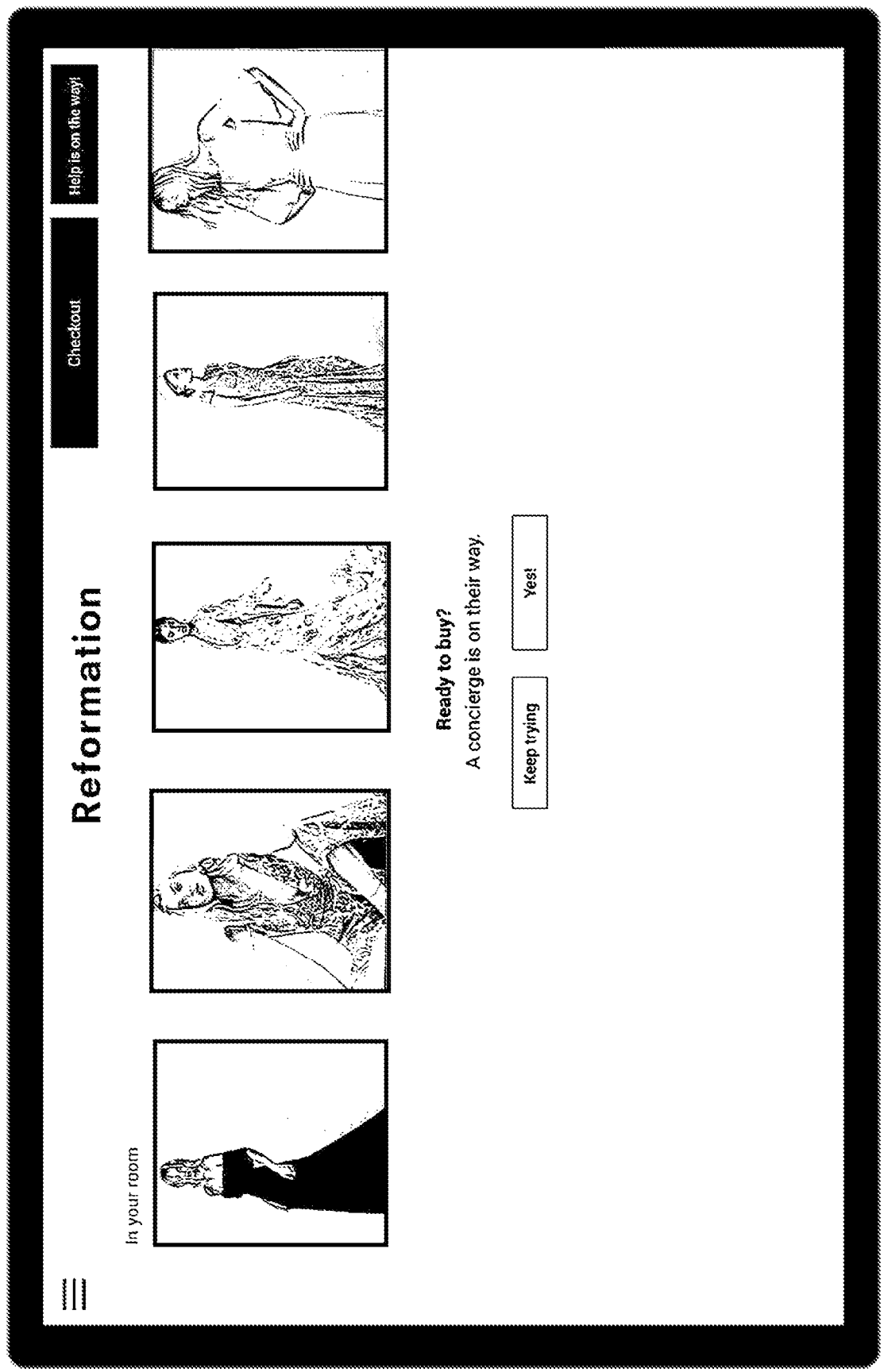

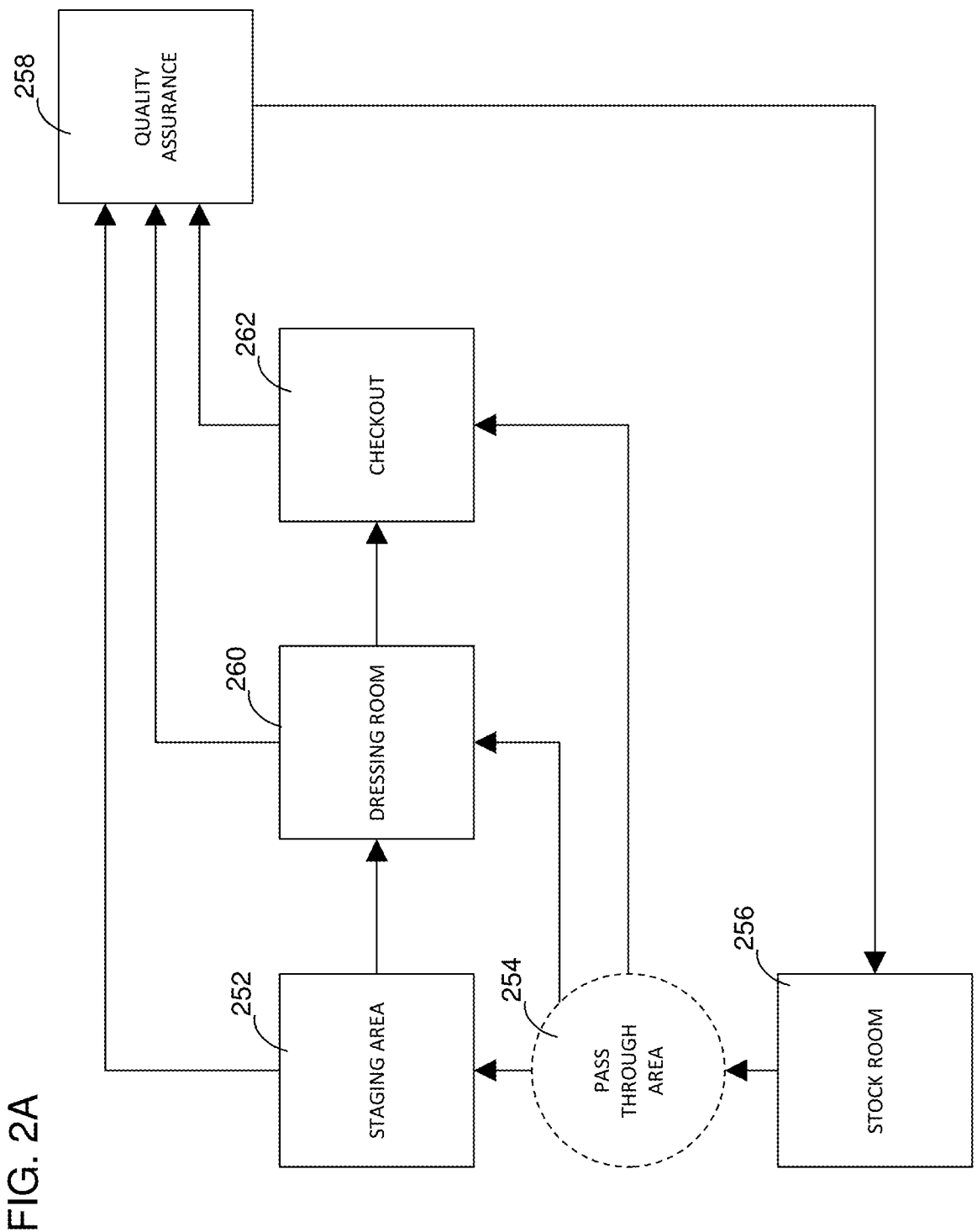

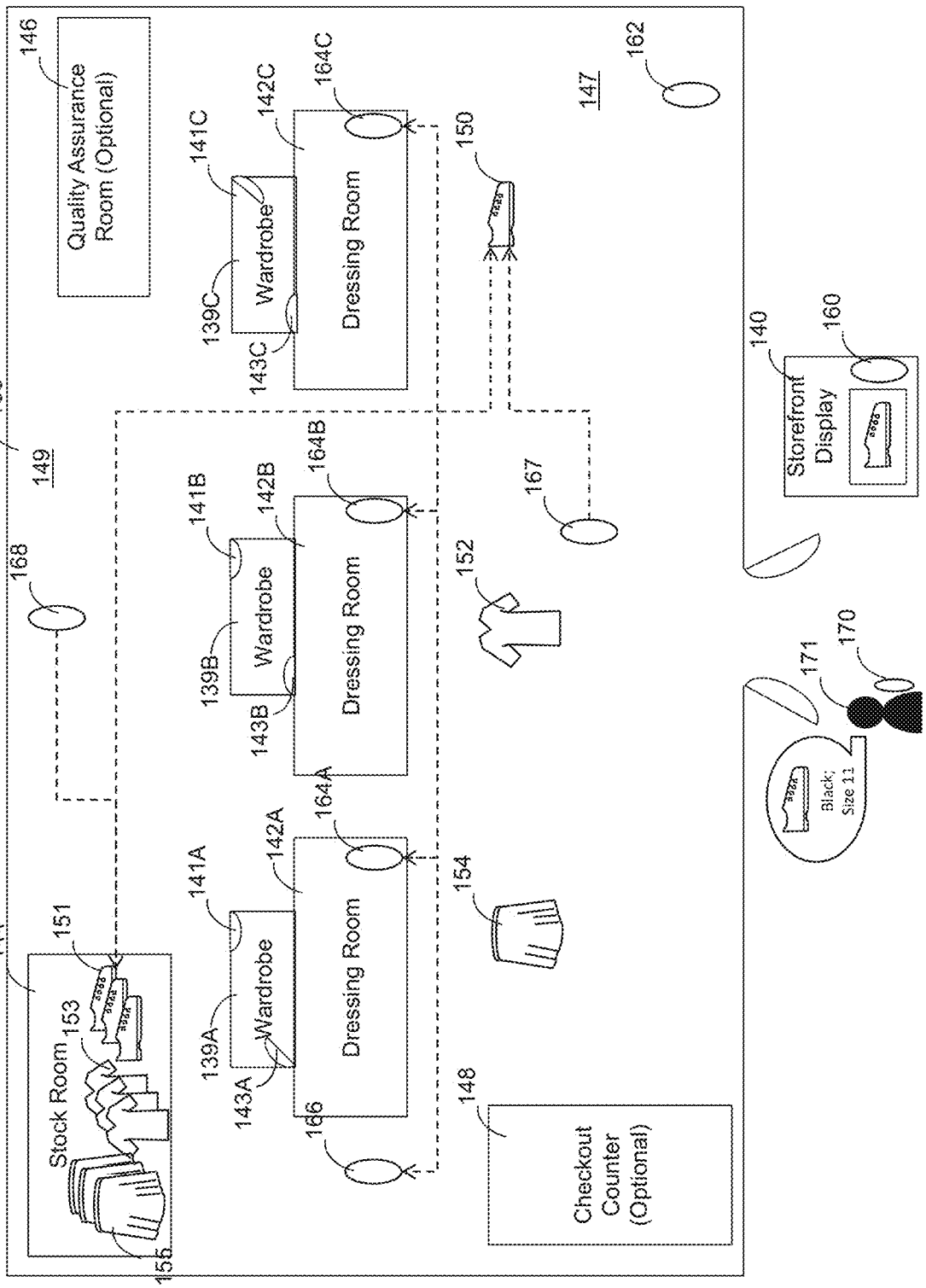

METHODS, SYSTEMS, AND DEVICES FOR DYNAMIC CUSTOMIZED RETAIL EXPERIENCE AND INVENTORY MANAGEMENT

CROSS REFERENCE TO RELATED APPLICATIONS

This application claims the benefit of U.S. Provisional Patent Application No. 62/455,817, titled SYSTEMS, METHODS, AND DEVICES FOR DYNAMIC CUSTOMIZED RETAIL EXPERIENCE AND INVENTORY MANAGEMENT, filed on Feb. 7, 2017, which is hereby incorporated by reference herein in its entirety.

BACKGROUND

Field

The disclosure relates generally to the field of retail sales, and more specifically to systems, methods, and devices for managing retail experiences and inventory.

Description

Retail sales of consumer products can occur in various ways, such as through an online website or via a brick-and-mortar store. The current trend is for more and more consumer retail sales to be conducted online instead of in brick-and-mortar stores. Certain types of products, such as clothing, can be more difficult to sell through an online website, however, because customers typically prefer to try on clothing prior to purchasing it. The traditional brick-and-mortar retail experience is not ideal, however. Accordingly, it can be advantageous to have systems, methods, and devices that enable a dynamic customized retail experience.

SUMMARY

The present disclosure presents various embodiments of systems, methods, and devices for providing a dynamic, automated, customizable, and/or more efficient retail shopping experience and/or management of inventory. In some embodiments, the systems disclosed herein can be implemented in a retail setting, such as, for example, a retail clothing store. In some embodiments, for example, the systems, methods, and devices disclosed herein can enable a customer of a retail establishment to view and/or select inventory from a showroom computing device, to have the selected inventory automatically delivered to a temporary product storage area of a dressing room of the retail establishment, and/or to complete a checkout experience after evaluating the inventory. In some embodiments, the systems, methods, and devices disclosed herein can comprise various processes and techniques configured to occur "behind the scenes" to effectively and automatically manage the inventory of the retail establishment while the customer experience remains relatively "seamless."

According to some embodiments, a physical retail establishment system for enabling a dynamic in-person shopping experience comprises: a physical retail establishment comprising a showroom area, a stockroom area, a dressing room area, and a wardrobe, the wardrobe comprising a first door that separates the wardrobe from the dressing room area, and a second door that separates the wardrobe from the stockroom area; a first electronically controllable lock for selectively locking the first door; a second electronically controllable lock for selectively locking the second door; an electronic lock controller in electronic communication with the first and second electronically controllable locks to control whether the first and second electronically controllable locks are in a locked state or an unlocked state; a plurality of user access point systems located at the retail establishment, the plurality of user access point systems each comprising an electronic display configured to present an interactive graphical user interface, the plurality of user access point systems comprising at least a showroom system located in the showroom area, a dressing room system located in the dressing room area, a portable concierge system, and a portable stockroom system; a central server comprising one or more electronic databases configured to store data related to physical inventory of the retail establishment and to store data related to individual unique fitting sessions associated with the retail establishment, the central server configured to present an API over a computer network to the plurality of user access point systems, the API comprising a plurality of endpoints that enable the plurality of user access point systems to create and manage the unique fitting sessions, wherein the plurality of user access point systems and the central server each comprise one or more computer readable storage devices configured to store a plurality of computer executable instructions; and one or more hardware computer processors in communication with the one or more computer readable storage devices and configured to execute the plurality of computer executable instructions in order to: present to a first user, by the electronic display of the showroom system, an interactive graphical user interface that enables the first user to input user identifying information and to electronically browse the physical inventory of the retail establishment; transmit, from the showroom system to the central server, a first API request to create a new unique fitting session, the first API request comprising at least the user identifying information; transmit, from the central server to the showroom system, an identifier associated with the unique fitting session; transmit, from the showroom system to the central server, a second API request to add one or more inventory items to the unique fitting session, the second API request comprising at least the identifier associated with the unique fitting session and one or more identifiers associated with the one or more inventory items; generate, by the central server, a pull request associated with the unique fitting session, the one or more inventory items, and the wardrobe; access, by the stockroom system, the pull request; present to a second user, by the electronic display of the stockroom system, an interactive graphical user interface that enables the second user to view an action associated with the pull request, the action comprising at least transporting of the one or more inventory items from the stockroom area to the wardrobe, and to indicate that the action has been completed; transmit, from the stockroom system to the central server, a third API request comprising data indicating the pull request has been completed; transmit, from the central server to the concierge system, responsive to the central server receiving the third API request, a notification comprising data indicating the dressing room is ready for the first user; transmit, from the central server to the dressing room system, data associated with the unique fitting session; present to the first user, by the electronic display of the dressing room system, an interactive graphical user interface that enables the first user to view electronic images associated with the one or more inventory items that are located in the wardrobe, wherein the electronic lock controller is configured to, responsive to detecting the first door of the wardrobe has been opened, control the second electronically controllable lock to keep the second electronically controllable lock in the locked state at least until the electronic lock controller detects the first door has been closed; and initiate, by the dressing room system or the concierge system, a checkout process to enable the first user to purchase one or more of the one or more inventory items.

In some embodiments, the one or more hardware computer processors are further configured to execute the plurality of computer executable instructions in order to: generate, by the central server, a second pull request associated with any of the one or more inventory items that were not purchased by the first user; access, by the stockroom system, the second pull request; present to the second user, by the electronic display of the stockroom system, an interactive graphical user interface that enables the second user to view a second action associated with the second pull request, the second action comprising at least transporting of the any of the one or more inventory items that were not purchased by the first user from the wardrobe to the stockroom area, and to indicate that the second action has been completed; and transmit, from the stockroom agent to the central server, a fourth API request comprising data indicating the second pull request has been completed. In some embodiments, the one or more hardware computer processors are further configured to execute the plurality of computer executable instructions in order to: disable, by the central server, association of any of the one or more inventory items with a second unique fitting session until at least the second pull request has been completed. In some embodiments, the central server is located in the physical retail establishment. In some embodiments, the central server is located remotely from the physical retail establishment. In some embodiments, the physical retail establishment comprises a plurality of dressing room areas, and at least one wardrobe associated with each of the plurality of dressing room areas. In some embodiments, the stockroom system comprises a tablet computer coupled to a band that is configured to attach to a forearm of the second user. In some embodiments, the stockroom area comprises at least one room and at least one hallway. In some embodiments, the electronic lock controller is controllable by one or more of the central server or the plurality of user access point systems. In some embodiments, the electronic lock controller is not controllable by one or more of the central server or the plurality of user access point systems.

According to some embodiments, a physical retail establishment system for enabling a dynamic in-person shopping experience comprises: a plurality of user access point systems configured to be located at a retail establishment, the retail establishment comprising a showroom area, a stockroom area, a dressing room area, and a wardrobe, the wardrobe comprising a first door that separates the wardrobe from the dressing room area, and a second door that separates the wardrobe from the stockroom area, the plurality of user access point systems each comprising an electronic display configured to present an interactive graphical user interface, the plurality of user access point systems comprising at least a showroom system configured to be located in the showroom area, a dressing room system configured to be located in the dressing room area, a portable concierge system, and a portable stockroom system, the wardrobe comprising a first electronically controllable lock for selectively locking the first door, and a second electronically controllable lock for selectively locking the second door, wherein the first and second electronically controllable locks are in electronic communication with an electronic lock controller to control whether the first and second electronically controllable locks are in a locked state or an unlocked state; a central server comprising one or more electronic databases configured to store data related to physical inventory of the retail establishment and to store data related to individual unique fitting sessions associated with the retail establishment, the central server configured to present an API over a computer network to the plurality of user access point systems, the API comprising a plurality of endpoints that enable the plurality of user access point systems to create and manage the unique fitting sessions, wherein the plurality of user access point systems and the central server each comprise one or more computer readable storage devices configured to store a plurality of computer executable instructions; and one or more hardware computer processors in communication with the one or more computer readable storage devices and configured to execute the plurality of computer executable instructions in order to: present to a first user, by the electronic display of the showroom system, an interactive graphical user interface that enables the first user to input user identifying information and to electronically browse the physical inventory of the retail establishment; transmit, from the showroom system to the central server, a first API request to create a new unique fitting session, the first API request comprising at least the user identifying information; transmit, from the central server to the showroom system, an identifier associated with the unique fitting session; transmit, from the showroom system to the central server, a second API request to add one or more inventory items to the unique fitting session, the second API request comprising at least the identifier associated with the unique fitting session and one or more identifiers associated with the one or more inventory items; generate, by the central server, a pull request associated with the unique fitting session, the one or more inventory items, and the wardrobe; access, by the stockroom system, the pull request; present to a second user, by the electronic display of the stockroom system, an interactive graphical user interface that enables the second user to view an action associated with the pull request, the action comprising at least transporting of the one or more inventory items from the stockroom area to the wardrobe, and to indicate that the action has been completed; transmit, from the stockroom system to the central server, a third API request comprising data indicating the pull request has been completed; transmit, from the central server to the concierge system, responsive to the central server receiving the third API request, a notification comprising data indicating the dressing room is ready for the first user; transmit, from the central server to the dressing room system, data associated with the unique fitting session; present to the first user, by the electronic display of the dressing room system, an interactive graphical user interface that enables the first user to view electronic images associated with the one or more inventory items that are located in the wardrobe, wherein the electronic lock controller is configured to, responsive to detecting the first door of the wardrobe has been opened, control the second electronically controllable lock to keep the second electronically controllable lock in the locked state at least until the electronic lock controller detects the first door has been closed; and initiate, by the dressing room system or the concierge system, a checkout process to enable the first user to purchase one or more of the one or more inventory items.

In some embodiments, the one or more hardware computer processors are further configured to execute the plurality of computer executable instructions in order to: generate, by the central server, a second pull request associated with any of the one or more inventory items that were not purchased by the first user; access, by the stockroom system, the second pull request; present to the second user, by the electronic display of the stockroom system, an interactive graphical user interface that enables the second user to view a second action associated with the second pull request, the second action comprising at least transporting of the any of the one or more inventory items that were not purchased by the first user from the wardrobe to the stockroom area, and to indicate that the second action has been completed; and transmit, from the stockroom agent to the central server, a fourth API request comprising data indicating the second pull request has been completed. In some embodiments, the one or more hardware computer processors are further configured to execute the plurality of computer executable instructions in order to: disable, by the central server, association of any of the one or more inventory items with a second unique fitting session until at least the second pull request has been completed. In some embodiments, the physical retail establishment comprises a plurality of dressing room areas, and at least one wardrobe associated with each of the plurality of dressing room areas. In some embodiments, the stockroom system comprises a tablet computer coupled to a band that is configured to attach to a forearm of the second user. In some embodiments, the central server is located in the physical retail establishment. In some embodiments, the central server is located remotely from the physical retail establishment.

According to some embodiments, a computer-readable, non-transitory storage medium comprises one or more computer programs stored thereon for causing a suitably programmed computer system to process by a plurality of processors computer-program code by performing a method for enabling a dynamic in-person shopping experience at a retail establishment when the one or more computer programs are executed on the suitably programmed computer system, the suitably programmed computer system comprising a central server and a plurality of user access point systems, the plurality of user access point systems configured to be located at the retail establishment and comprising at least a showroom system configured to be located in a showroom area of the retail establishment, a dressing room system configured to be located in a dressing room area of the retail establishment, a portable concierge system, and a portable stockroom system, the method comprising: managing, by the central server, one or more electronic databases configured to store data related to physical inventory of the retail establishment and to store data related to individual unique fitting sessions associated with the retail establishment; presenting, by the central server, an API over a computer network to the plurality of user access point systems, the API comprising a plurality of endpoints that enable the plurality of user access point systems to create and manage the unique fitting sessions; presenting to a first user, by an electronic display of the showroom system, an interactive graphical user interface that enables the first user to input user identifying information and to electronically browse the physical inventory of the retail establishment; transmitting, from the showroom system to the central server, a first API request to create a new unique fitting session, the first API request comprising at least the user identifying information; transmitting, from the central server to the showroom system, an identifier associated with the unique fitting session; transmitting, from the showroom system to the central server, a second API request to add one or more inventory items to the unique fitting session, the second API request comprising at least the identifier associated with the unique fitting session and one or more identifiers associated with the one or more inventory items; generating, by the central server, a pull request associated with the unique fitting session, the one or more inventory items, and a wardrobe of the retail establishment; accessing, by the stockroom system, the pull request; presenting to a second user, by an electronic display of the stockroom system, an interactive graphical user interface that enables the second user to view an action associated with the pull request, the action comprising at least transporting of the one or more inventory items from the stockroom area to the wardrobe, and to indicate that the action has been completed; transmitting, from the stockroom system to the central server, a third API request comprising data indicating the pull request has been completed; transmitting, from the central server to the concierge system, responsive to the central server receiving the third API request, a notification comprising data indicating the dressing room is ready for the first user; transmitting, from the central server to the dressing room system, data associated with the unique fitting session; presenting to the first user, by an electronic display of the dressing room system, an interactive graphical user interface that enables the first user to view electronic images associated with the one or more inventory items that are located in the wardrobe; and initiating, by the dressing room system or the concierge system, a checkout process to enable the first user to purchase one or more of the one or more inventory items.

In some embodiments, the method further comprises: generating, by the central server, a second pull request associated with any of the one or more inventory items that were not purchased by the first user; accessing, by the stockroom system, the second pull request; presenting to the second user, by the electronic display of the stockroom system, an interactive graphical user interface that enables the second user to view a second action associated with the second pull request, the second action comprising at least transporting of the any of the one or more inventory items that were not purchased by the first user from the wardrobe to the stockroom area, and to indicate that the second action has been completed; and transmitting, from the stockroom agent to the central server, a fourth API request comprising data indicating the second pull request has been completed. In some embodiments, the method further comprises: disabling, by the central server, association of any of the one or more inventory items with a second unique fitting session until at least the second pull request has been completed.

According to some embodiments, a computer-implemented method for implementing a multi-point access system that dynamically communicating with a interfaces to a plurality of agents of a retail concierge system comprises: receiving, by a computer system, a request to create a fitting session; accessing, by the computer system, inventory data associated with inventory available at a retail location; accessing, by the computer system, agent data related to agents at the retail location via API calls to the respective agents, wherein agents comprise at least one of a shopper agent, store front agent, a show room agent, a dressing room agent, a waiting list agent, a stock room agent, a check out agent, or a quality assurance agent, wherein the at least one of the shopper agent, the store front agent, the show room agent, the dressing room agent, the waiting list agent, the stock room agent, the check out agent, or the quality assurance agent; receiving, by the computer system, a request to search for inventory, wherein the request to search for the inventory comprises one or more identifiers to identify at least one article of clothing; identifying, by the computer system, the at least one article of clothing based on a match to the one or more identifiers; transmitting, by the computer system, the at least one article of clothing to a shopper agent to be displayed to a user; receiving, by the computer system, a selection by the user of one or more identified inventory items to add to the fitting session; and in response to receiving, from a shopper agent, a user selection of the one or more identified inventory items: generating a pull request for the user selected inventory item; transmitting the pull request to a plurality of stock room agents; receiving notification that a stock room agent claimed the pull request; transmitting, by the computer system, a temporarily unavailable status for the at least one article of clothing to show room agents, and disable the show room agents and other shopper agents from claiming the at least one article of clothing; receiving, by the computer system, dressing room availability from one or more dressing room agents; transmitting, by the computer system, dressing room availability to the shopper agent; and transmitting, by the computer system, an unavailability status for the at least one article of clothing to disable stock room agents from transporting the at least one article of clothing, wherein the computer system comprises a computer processor and an electronic storage medium.

In some embodiments, the method further comprises: receiving, by the computer system, a request to reserve a dressing room from a shopper agent; transmitting, by the computer system, the request for current dressing room status to one or more dressing room agents; receiving, by the computer system, an indication of whether a dressing room is available; in response to the dressing room being available: receiving, by the computer system, a selection of an available dressing room from the shopper agent; transmitting, by the computer system, a request to the dressing room agent associated with the selected dressing room to assign the dressing room to the user; transmitting, by the computer system, an unavailability status of the dressing room to other shopper agents in order to prevent the other shopper agents from reserving the selected dressing room; and transmitting, by the computer system, a request to the stock room agent to transport the at least one article of clothing to the selected dressing room; and in response to the dressing room not being available: transmitting, by the computer system, a request to place the user on a waiting list for the dressing room to a wait list agent; and transmitting, by the computer system, a message to the shopper agent that the user is on the waiting list. In some embodiments, the wait list agent is configured to: determine an estimated time for dressing room availability; and transmit the estimated time to the shopper agent. In some embodiments, the wait list agent is configured to: determine a next-in-line shopper agent that is to be assigned to a next-available dressing room; access a channel of communication to notify the next-in-line shopper agent of an updated status of the waiting list for the dressing room; and transmit a message that the user is to be assigned the next available dressing room via the channel of communication. In some embodiments, the one or more identifiers comprises a barcode. In some embodiments, the one or more identifiers comprises keywords to search for the at least one article of clothing in an inventory search engine. In some embodiments, the method further comprises: enabling a stock room agent from accessing the dressing room to place the at least one article of clothing in the dressing room; and in response to completion of placing the at least one article of clothing in the dressing room, disabling the stock room agents from accessing the dressing room by transmitting a signal to a locking mechanism that locks access to the dressing room by the stock room agents.

According to some embodiments, a system for dynamically managing and customizing various agents of a retail concierge system comprises: one or more computer readable storage devices configured to store a plurality of computer executable instructions; and one or more hardware computer processors in communication with the one or more computer readable storage devices and configured to execute the plurality of computer executable instructions in order to: transmit inventory data on content items to a shopper agent; receive a selection of a content item, wherein the selection is indicative of a user request to claim the content item; and in response to receiving a request to claim the content item: transmit an updated availability status of the content item to disable other shopping agents from claiming the content item; and transmit a claim request to a stock room agent to transport the content item into a testing location.

In some embodiments, the system is further configured to: access a user profile associated with the user, wherein to receive a selection of a content item comprises identifying a previous selection of a content item by a user by accessing a selection history of the user profile. In some embodiments, the system is further configured to: access a geographic location for each of one or more retail locations; receive a geographic location of a shopper agent; determine whether the shopper agent location is approaching a retail location of the one or more retail locations; and in response to determining that the shopper agent location is approaching the retail location, transmit a message to a store front agent to display a customized message for the user. In some embodiments, the system is further configured to: receive an indication of a defective content item; transmit to a quality assurance agent to repair the content item; enabling access by a stock room agent to access a dressing room to retrieve the defective content item; transmit a request to the stock room agent to identify an alternative content item for the user; determine whether the content item was located in a show room; and in response to determining that the content item was located in the show room, transmit to a stock room agent a request to restock the show room. In some embodiments, the system is further configured to: receive an indication of a purchase of the content item; determine whether the content item was located in a show room; and in response to determining that the content item was located in the show room, transmit to a stock room agent a request to restock the show room. In some embodiments, the content item comprises a product. In some embodiments, the content item comprises an article of clothing.

According to some embodiments, a computer-implemented method for dynamically managing and customizing various agents of a retail concierge system comprises: receiving, by a computer system, a request from a shopper agent to claim a content item; and in response to receiving a request to claim the content item: transmitting, by the computer system, a message to update an availability status of the content item and disable other shopper agents from claiming the content item; receiving, by the computer system, a request from the shopper agent to reserve a dressing room; requesting, by the computer system, status of the dressing rooms from one or more dressing room agents; determining, by the computer system, whether a dressing room is available; in response to a dressing room being available: transmitting, by the computer system, a request to a stock room agent to transport the content item to the dressing room; and upon completion of transporting the content item to the dressing room, disabling, by the computer system, stock room agents from accessing the dressing room; and in response to dressing rooms not being available, transmitting, by the computer system, a request to place a user on a waiting list for the dressing room to a wait list agent, wherein the wait list agent determines an estimated time for a dressing room, wherein the computer system comprises a computer processor and an electronic storage medium.

In some embodiments, the method further comprises: accessing, by the computer system, layout data of a retail location, wherein the layout data comprises a floor plan of a store front, show room, and one or more dressing rooms of the retail location; determining a location of the content item; and transmitting, by the computer system, the location of the content item in reference to the layout data to a shopper agent. In some embodiments, the method further comprises: determining a location of a user in reference to the layout data; and transmitting, by the computer system, the location of the user in reference to the layout data to at least one of a store front agent, a show room agent, a dressing room agent, a waiting list agent, a stock room agent, a check out agent, or a quality assurance agent, wherein the at least one of the store front agent, the show room agent, the dressing room agent, the waiting list agent, the stock room agent, the check out agent, or the quality assurance agent displays the location of the user. In some embodiments, the method further comprises: determining a location of at least one of a store front agent, a show room agent, a dressing room agent, a waiting list agent, a stock room agent, a check out agent, or a quality assurance agent in reference of the layout data; and transmitting, by the computer system, the location of at least one of the store front agent, the show room agent, the dressing room agent, the waiting list agent, the stock room agent, the check out agent, or the quality assurance agent to the shopper agent, wherein the shopper agent displays the location of the at least one of the store front agent, the show room agent, the dressing room agent, the waiting list agent, the stock room agent, the check out agent, or the quality assurance agent in reference to the layout data. In some embodiments, the content item comprises an article of clothing. In some embodiments, the method further comprises: receiving, by the computer system, a user request to provide directions to a retail location, wherein the user request comprises a location of the shopper agent; determine, by the computer system, route information from the shopper agent to the retail location; and transmit, by the computing system, the route information for display of direction information to the retail location.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

The foregoing and other features, aspects, and advantages of the present invention are described in detail below with reference to the drawings of various embodiments, including the appendices submitted herewith, which are intended to illustrate and not to limit the invention. The drawings comprise the following figures in which:

FIG. 1B is a block diagram illustrating an example embodiment of an implementation of the system of FIG. 1A;

FIG. 1C is an example embodiment of a process flow diagram illustrating a process performed by a retail establishment system;

FIGS. 1D-1N are example embodiments of graphical user interfaces that may be presented by customer-facing systems of the system of FIG. 1A;

FIG. 1O is a schematic diagram illustrating an example embodiment of a wardrobe;

FIG. 2A is a block diagram illustrating an example inventory item flow according to some embodiments;

FIGS. 9A-9E are graphical user interfaces for managing pull requests for a back of house employee according to some embodiments;

FIGS. 12A-12H are graphical user interfaces for a concierge user access point system according to some embodiments;

FIGS. 13A-13L are additional graphical user interfaces for a concierge user access point system according to some embodiments;

FIGS. 14A-14L are additional graphical user interfaces for a concierge user access point system according to some embodiments;

FIG. 16A is a schematic diagram illustrating a retail concierge system for an arriving customer according to some embodiments;

DETAILED DESCRIPTION

Figure 1A:
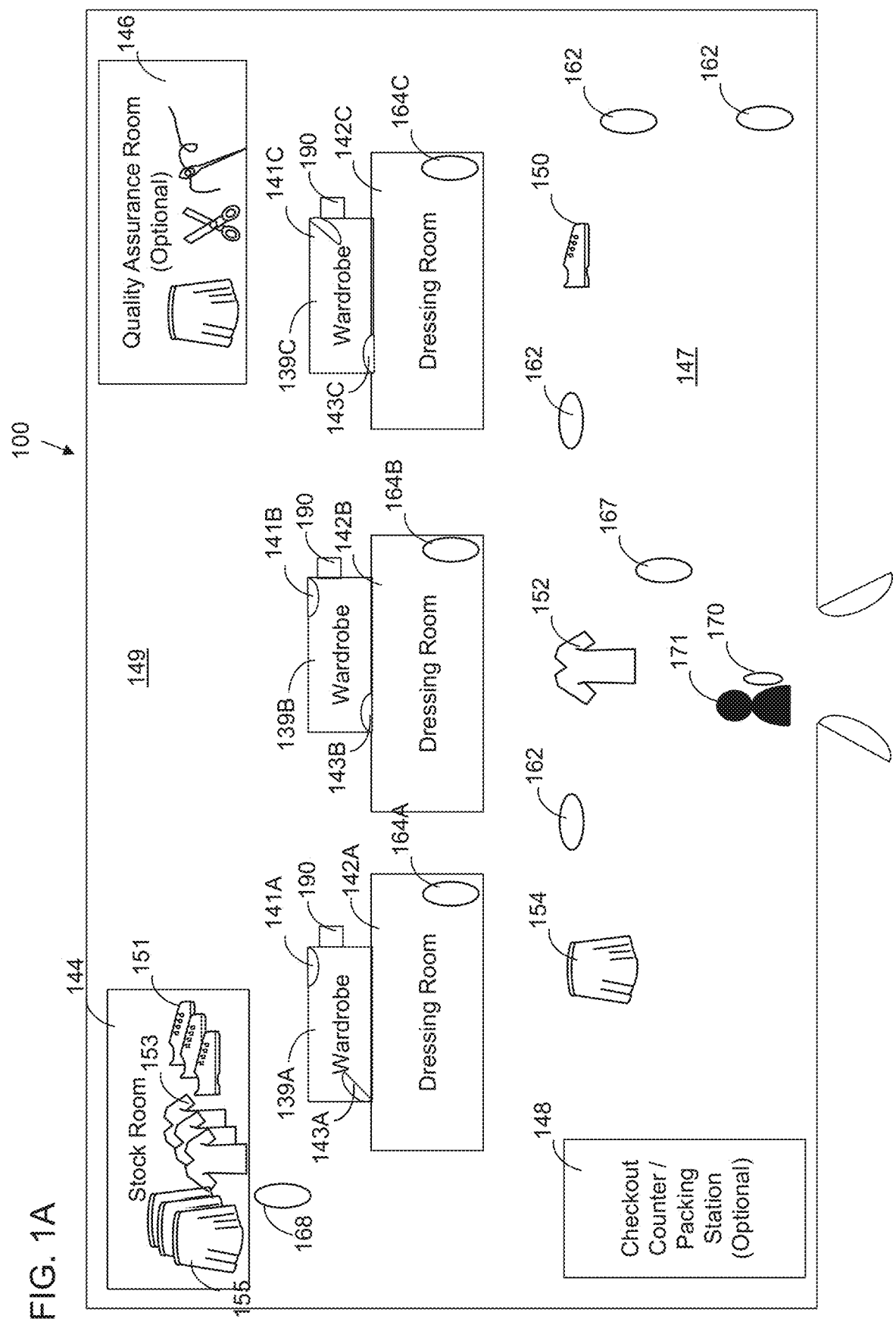
FIG. 1A is a schematic diagram illustrating an example embodiment of a retail establishment system for enabling a dynamic in-person shopping experience.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

OVERVIEW OF SOME EMBODIMENTS, FEATURES, AND BENEFITS

The present disclosure presents various embodiments of systems, methods, and devices for providing a dynamic, automated, customizable, and/or more efficient retail shopping experience and/or management of inventory. In some embodiments, the systems disclosed herein can be implemented in a retail setting, such as, for example, a retail clothing store. Although various examples given herein are given with respect to a retail clothing store, the various systems, methods, and devices disclosed herein can be used in other settings, too, such as retail stores selling other types of goods, warehouse environments, wholesale environments, and/or the like.

In some embodiments, a system as disclosed herein comprises various components that work together to provide an enjoyable and efficient retail shopping experience for a customer. For example, some embodiments comprise at least four components, including an electronic device for use by a customer, an electronic device for use by a stockroom or back of house employee, an electronic device for use by a concierge or user-experience employee, and a server that communicates with the various devices, such as via an API and/or the like. In some embodiments, the system further comprises an electronic device for use by a quality assurance employee.

In some embodiments, a system as disclosed herein can be configured to allow a user and/or customer to have an efficient enjoyable retail shopping experience. For example, in a retail clothing store setting, the retail clothing store may be setup to have samples of clothing for sale in a showroom that a customer can browse. A separate area, sometimes referred to herein as a back of house (BOH), stockroom, inventory area, warehouse, and/or the like, may be used to store inventory that is available for the customer to try on and/or purchase. In some embodiments, the back of house area is in the same building, but in some embodiments the back of house area may be located off-site and/or serve more than one retail store. In some embodiments, the samples on display in the showroom that the customer can browse are only a subset of the items actually available for sale/try-on.

In an example embodiment, when the customer is browsing the samples available in the showroom, the system may enable the customer to indicate which items for sale the customer wishes to try on. In some embodiments, the customer may be able to express these preferences by interacting with a computer device, such as a touch screen device located in the showroom area, the user's own computer device, such as the user's smart phone, a device for a concierge employee, and/or an electronic device or computer device located in another area of the retail store, such as in a dressing room area. In some embodiments, regardless of the device being used, the device can be configured to show to the customer or user a real-time inventory of what is available to try on and/or purchase. In some embodiments, this inventory is more than just what is on display in the showroom area.

In some embodiments, the customer and/or the concierge employee can interact with the system to build a "wardrobe" of clothing items that the user can then try on. For example, the user can interact with the system to select a plurality of items, including the type of item, color, fabric, size, and/or the like. The system can be configured to receive this information from the customer (such as, for example, via a user device communicating with a server), and/or automatically notify a back of house system that the various items selected by the customer need to be placed in a dressing room for the customer to try on. In some embodiments, this automatic notification can take the form of a notification sent to a back of house employee, who then gathers the required items and places them in the dressing room. In some embodiments, a dressing room is automatically assigned to a customer. In some embodiments, a customer and/or a concierge employee requests a dressing room.

In some embodiments, the server is configured to maintain a list of "pull requests" (e.g., a request for at least one item of inventory to be physically moved from one location to another), and user devices (such as computing devices operated by an employee) can be configured to communicate with the server, such as via an API, to select or claim one or more pull requests. Once a pull request has been claims by an employee (via the employee's computing device), the employee can then physically move the items of inventory and/or notify the server that the pull request has been completed. In some embodiments, notification to the server of the completed pull request is done manually, such as by the employee checking off the pull request on the user interface. In some embodiments, the notification to the server of the completed pull request is done automatically, such as in response to the employee scanning a barcode and/or the like. In some embodiments, the system can be configured to automatically retrieve the requested items, such as robotically, and/or place them in the dressing room for the customer to try on.

In some embodiments, the dressing room that the customer uses to try on the plurality of items comprises a temporary product storage area, product transition area, or the like, sometimes referred to herein as a magic wardrobe or just a wardrobe. The temporary product storage area, or magic wardrobe, may comprise, for example, an opening or access point accessible to the user in the dressing room via a hinged door, sliding door, curtain, and/or the like. In some embodiments, the temporary product storage area may have at least two access points, with one access point being into the dressing room for the customer to use, and a second access point being into the inventory or back of house area, such as for an inventory or back of house employee to use to stock the temporary product storage area and/or to retrieve goods from the temporary product storage area that are no longer needed by the customer. In embodiments that have at least two access points into the temporary product storage area, the temporary product storage area can be configured such that only one access point can be opened at a time.

In some embodiments, the system can be configured to notify customers and/or employees when items need to be added to the temporary product storage area, when items need to be removed from the temporary product storage area, and/or the like. In some embodiments, the access points to the temporary product storage area can be automatically lockable and/or unlockable. For example, the access point between the temporary product storage area and the inventory area may be configured to automatically be locked when a customer is in the dressing room to try clothes on and is not in need of additional items. As another example, the access point to the dressing room area from the temporary product storage area may be configured to be automatically locked when items are being added to or removed from the temporary product storage area. In some embodiments, the access points comprise electronically activated locks, such as magnetic locks or the like. In some embodiments, these electronically activated locks can be controlled by a controller that detects when the various access points are open or closed. In some embodiments, the controller can be configured to detect that one access point has been opened and automatically cause any other access points into that wardrobe to be locked (and/or to remain locked). In some embodiments, the controller is integrated into the server that controls other retail concierge system functionality as disclosed herein. In other embodiments, however, the controller is a separate device or system that does not necessarily communicate with the rest of the retail concierge system servers and/or devices disclosed herein.

Such features can have safety and/or privacy benefits. For example, keeping the access point to the inventory area locked when the customer is trying on goods can help to ensure privacy and/or to make sure that a back of house employee does not accidentally open the temporary product storage area when the customer may be in a state of undress. Another benefit is that while items are being added to and/or removed from the temporary product storage area, it may be desirable to not allow the customer access to that area. This may be for safety reasons, such as particularly if the system is automated and/or items are being added or removed robotically. Further, not allowing the customer to see the clothing being added or removed can enhance the customer experience, and/or make the temporary product storage area seem more like a "magic" wardrobe, making the customer experience more "seamless."

In some embodiments, while a user is building their wardrobe or dressing room, for example if they are in the showroom area and adding items to the list of items they would like to try on, the system may wait until the customer indicates they are ready to try everything on before the system notifies the inventory system or back of house system to place the items in the user's magic wardrobe. In other embodiments, the system may be configured to at least partially begin collecting inventory items and/or filling the magic wardrobe while of the user is still in the process of selecting more items to try on (such as, for example, by generating one or more pull requests as described below).

In some embodiments, the system can be configured to automatically assign an available dressing room to a customer and/or automatically notify one or more employees and/or the inventory system as to what dressing room is assigned and/or also notify the customer as to what dressing room has been assigned. In some embodiments, the system can be configured to enable the customer to select a dressing room, and then automatically cause the inventory system to direct that user's items to the magic wardrobe in the selected dressing room (such as, for example, by generating one or more pull requests that are claimed and/or interacted with by an employee device using API calls).

In some embodiments, once the customer is in a dressing room, a computer device, such as a touch screen device, may be available to the customer for the customer to, for example, view what is being loaded into the magic wardrobe, view what is already in the magic wardrobe, request additional items to try on, complete a sale, and/or the like.

In some embodiments, the dressing room can also comprise a port, a wireless device, and/or the like that allows the user to play his or her own music and/or videos while they are trying on clothes. In some embodiments, the system is configured to enable a user to select the music and/or videos that can be played while they are trying on clothes.

In some embodiments, the system is substantially or entirely automated from the customer's perspective. By automatically implementing some features "behind the scenes," this can lead to a more enjoyable and/or seamless customer experience. For example, in some embodiments, the system may be configured to enable a customer to shop the showroom floor, build a wardrobe, try clothes on, complete the purchase, and leave the store without ever having to interact with a human. In some embodiments, however, it may be desirable for there to be at least some human interaction in the store. Accordingly, in some embodiments, the system may be configured to allow an employee or user, sometimes referred to herein as a concierge, to interact with the system to help manage the shopping and sales process. For example, the concierge may have a portable electronic device, such as a smart phone or similar, that enables the concierge to manage the shopping and/or sales process. In some embodiments, the concierge's system can be configured to enable the concierge to help a customer to build a wardrobe and/or select items to try on. In some embodiments, the concierge's device may comprise a camera, NFC communication system, and/or the like that enables the concierge to scan a barcode or the like of an item shown on the showroom floor and causes the concierge's system to dynamically display what items related to the scanned item are available for the customer to try on and/or purchase. The concierge can then help the customer to build the wardrobe or dressing room using the electronic device.

In some embodiments, the electronic device used by the concierge may be configured to enable the concierge to monitor a list of people waiting to be assigned to dressing rooms, who is assigned to what dressing room, what state each dressing room is in, and/or the like. In some embodiments, the system can be configured to notify the concierge when a wardrobe or dressing room is ready, so that the concierge can direct a customer to the dressing room. In some embodiments, the system can be configured to notify the concierge when a customer already in a dressing room needs help. In some embodiments, the electronic device available for use by the customer in the dressing room can comprise functionality, such as a help button, that instructs the system to notify the concierge that the customer needs help. In some embodiments, a payment or checkout system can be incorporated into or used by the concierge's electronic device, the electronic device located in the dressing room, an electronic device located elsewhere in the customer accessible areas of the retail store, and/or the customer's own electronic device.

In some embodiments, the system can be configured to automatically determine when a dressing room is done being used by a customer and needs to be cleared out and/or cleaned for use by the next customer. In some embodiments, this automatic determination is based on, for example, a checkout process having been completed, a motion detector sensing no motion for a predetermined amount of time in the dressing room, a concierge notifying the system via the concierge's electronic device that the wardroom or dressing room is clear, and/or the like.

In some embodiments, once a dressing room is done being used by a customer, the system can be configured to notify an inventory employee and/or an automated system to retrieve any items from the dressing room and deliver them to a quality assurance or QA area (such as, for example, by generating one or more pull requests that an employee device can claim and/or process via, for example, an API). At the QA area, the items can be prepped for trying on by a new customer, such as by cleaning the items, folding the items, inspecting the items for any defects that may have been introduced in the dressing room, and/or the like.

In some embodiments, the system can be configured to track the efficiency of any employees using the system, to enable the system to operate more efficiently and/or incentivize the employees to operate more efficiently. For example, the system may be configured to monitor, for example, an amount of time it takes for an employee to stock a magic wardrobe, clean and/or prepare a dressing room for the next customer, prepare items that have been removed from a dressing room to be placed back into inventory for the next customer, an amount of time a pull request remains unclaimed and/or takes to be processed, and/or the like. In some embodiments, the system can be configured to rate employees on their efficiency and/or other metrics, such as to enable bonus pay, pay rates, and/or the like to be set at least partially based on such metrics.

In some embodiments, the systems disclosed herein enable a customer to walk into a retail store, have an enjoyable and efficient shopping experience, and walk out with the goods they tried on. In some embodiments, the systems disclosed herein can be configured to communicate with an online ordering system that, for example, enables orders to be placed for items that the user wishes to purchase but that are not currently available at the store. For example, a user may try on a pair of pants in a particular size and color, but wish to purchase the same pair of pants in a different color that is not currently stocked at the store. The system may be configured to dynamically order the pants for delivery to the customer's home. In some embodiments, the system can be configured to automatically direct someone to quickly deliver an out of stock item from an off-site warehouse or other retail store that has the item in stock to the current retail store. In some embodiments, depending on how long the user plans to spend at the retail store, the items may be delivered before the user leaves, enabling the user to leave the store with the item that was out of stock at the time the user arrived at the store.

In some embodiments, the system is configured to enable a user to access the system from their own device, such as a computer or smart phone, before they arrive at the store, to allow the user to browse the inventory and/or preconfigure a dressing room or wardrobe to be ready for them when they arrive. In some embodiments, such a system can tie in to the system described above, wherein a user may request to try on an item that is not currently in stock at the store the user plans to be at, but that could be delivered to that store before the user arrives at the store. For example, if a user indicates to the system that they would like to arrive at the store at 3 PM to try on their clothes, and it is currently 1 PM, the system may be configured to automatically display inventory to the user for selection that is not presently at the store but that the system would be able to have delivered to the store by or before the 3 PM time that the user wishes to be there.

In some embodiments, the system may be configured to cause audio and/or visual indicators to indicate to a user when the magic wardrobe is ready for them to open, or the like. For example, in some embodiments, the system can be configured to play a knocking sound when the wardrobe has been filled with clothes and is ready for the user to try the clothes on. As another example, the system may be configured to use voice commands to instruct to the customer on what they should do.

In some embodiments, a customer can shop from the showroom floor of a retail establishment as disclosed herein using, for example, his or her smart phone, tablet computer, a smart phone or tablet computer provided by the retail establishment to the user, an interactive computing device attached to a wall of the establishment, attached to a pedestal, and/or the like.

In some embodiments, a customer can reserve a dressing room prior to arriving at the retail establishment. For example, the system may be configured to enable a customer to reserve a dressing room via an app on their smart phone, via text messaging, by calling an automated system, by calling an employee of the retail establishment, and/or the like.

In some embodiments, the system can be configured to alert a customer and/or employee of the retail establishment that a dressing room is ready, that an order is ready, and/or the like, even if the user is not presently at the establishment. For example, the system may be configured to send notifications to users and/or employees via text messaging, email, notifications delivered to an app on a user's smart phone or other portable computing device, via a wireless portable device specifically designed to issue notifications, similar to those used in restaurants, a pager device, and/or the like.

Additional Features and Benefits of Some Embodiments

The disclosure relates to creating a dynamic customized retail experience and inventory management. In addition to the benefits described above, the present disclosure provides an improved user experience by, among other things, effectively responding to a customer's needs across various stages, allowing the process to remain relatively seamless, even though each customer's needs and desires may be different. The systems and methods can, for example, dynamically respond to a request for inventory in a showroom, to try on inventory in a dressing room, to purchase inventory at a checkout counter, quality assurance on an item, and/or the like, by implementing, for example, a flexible API-based system that can track inventory throughout an establishment and/or cause efficient movement of that inventory throughout the establishment.

In some embodiments, a system as disclosed herein is referred to as a retail experience management system, a retail concierge system, a physical retail establishment system, and/or the like. In some embodiments, a retail concierge system can be configured to create a session (sometimes referred to herein as a fitting session) for tracking and/or implementing a customer's retail experience in the retail store. The retail concierge system can enable the user to create a fitting session and/or add inventory items to the fitting session. In some embodiments, the fitting session is created and/or managed using an application on a user device, such as a user access point system.

The retail concierge system can enable a user to request one or more inventory items through the fitting session, and then automatically create one or more pull requests. A server of the retail concierge system can communicate with a computing device associated with the stock room to allow a stock room employee to claim the pull request for the fitting session and physically move the requested inventory to a wardrobe of a dressing room.

The retail concierge system can desirably be configured to track inventory throughout the retail store. For example, instead of just being able to track a number of items in inventory at the retail store, the system can be configured to track specific inventory items as they move throughout the store, such as from the stock room to a dressing room, to a QA area, and back to the stock room. In some embodiments, the retail concierge system can track inventory using an identifier, such as a UPC code. In some embodiments, the retail concierge system can track a type of inventory throughout the store. For example, the retail concierge system can track the availability of a number of inventory items of a particular size and color. The retail concierge system can communicate with a computing device associated with a stock room to request a particular inventory item to be delivered to a dressing room upon request.

In some embodiments, the tracking of specific pieces of inventory throughout the store can be implemented by each piece of inventory being associated with a unique identifier. For example each piece of inventory may comprise a QR code, barcode, or other machine-readable code that comprises a unique code. Whenever that machine-readable code is scanned by a user device, it can help the system, such as a central server of the system, to track that specific piece of inventory throughout the store as it moves from one inventory location or cabinet to another. In some embodiments, however, the system can be configured to track specific pieces of inventory throughout the store without requiring a unique identifier for each specific piece of inventory. For example, a single UPC code may be assigned to a plurality of inventory items that are substantially identical, such as, for example, a certain shirt in a certain color and size. To enable tracking of specific items out of this set of substantially identical items, however, the system may be configured to programmatically create virtual inventory cabinets in code and assign inventory items to those virtual inventory cabinets, thus keeping track of how many of that set of substantially identical items are located in each inventory cabinet.

For example, if there are five shirts of a certain type in the stockroom (e.g., all five shirts share the same UPC code), and a user requests to try on one of those shirts, the system can be configured to automatically generate a pull request that instructs a stockroom employee to pull one of those shirts and move it to a particular dressing room. The system can be configured to then automatically track that there are now only four of that type of shirt in the stockroom and there is one of that type of shirt in a virtual pass-through area or cabinet (before the pull request is completed), or in the wardrobe or dressing room (after the pull request is completed). By decrementing the item from the stockroom inventory even before the pull request is completed, this can help to ensure the true "available" inventory is shown when other customers are browsing the system. If there were a delay in decrementing the item from the stockroom inventory, a situation may arise in which a customer requests an item to try on, and then the system has to inform the customer that the item is no longer available, which would take away from the enjoyable, seamless retail experience.

Once the customer has tried on the item, the customer might decide to purchase the item, at which time the system can be configured to automatically indicate that the shirt has been sold, and thus the only remaining inventory in the system is the four shirts in the stockroom. Alternatively, if the customer decides not to purchase the item, the system may be configured to automatically generate a pull request that causes the shirt to be moved from the dressing room to a quality assurance area, similarly to how it caused the shirt to be moved from the stockroom to the dressing room. After quality assurance checks have been performed on the shirt, the system can generate another pull request to cause the shirt to be moved from the quality assurance area back to the stockroom. At this point, the system can add that shirt back into the main inventory in the stockroom, and thus five of that type of shirt will be shown again in the stockroom.

By using such an inventory management system, the system can dynamically adapt to movements of inventory items throughout a retail establishment to result in an efficient and seamless shopping experience. A traditional retail store does not implement such features, and thus could not result in such a seamless shopping experience. By implementing the various features disclosed herein, however, the systems disclosed herein can enable a retail establishment to present a user experience that is acceptable and enjoyable to consumers that are more and more trending toward doing online shopping instead of shopping in a retail establishment.

Although some embodiments disclosed herein describe inventory items as being scanned by a user device, such as a user device scanning a barcode, QR code, and/or the like, in some embodiments, tracking of inventory items may be even more automated than that. For example, inventory items may comprise an RFID or other type of wireless tag or device that enables the inventory item to be automatically tracked or detected by the system when that inventory item moves to different locations in the retail establishment. For example, if a user requests to try on a particular shirt, the system may generate a pull request that instructs a stockroom employee to move that shirt from the stockroom to the dressing room. In some embodiments, instead of the stockroom employee scanning that item and/or interacting with a user interface to tell the system that the item has been moved to the wardrobe, the system may comprise one or more wireless sensors that automatically detect when the shirt has left the stockroom and/or when the shirt has arrived in the dressing room.

In some embodiments, the retail concierge system can comprise a central server configured to communicate with a variety of computing devices placed throughout the retail store in order to track the status of dressing rooms, track and/or cause the movement of inventory among locations, and/or the like. For example, the retail concierge system can communicate with computing devices associated with the dressing rooms to identify whether dressing rooms are available for the consumer. The retail concierge system can create waiting lists for dressing room if none are available.

Traditional retail systems track inventory using an identifier for a particular type of inventory. For example, retail systems can track the quantities of a particular t-shirt according to size and color via a barcode, such as a UPC code. However, as mentioned above, a technical limitation of current retail systems is the lack of the ability to track individual inventory items as they move throughout the retail store to different locations and/or as they are claimed by the system in preparation to be moved to another location. Thus, traditional retail systems do not track how particular inventory items are currently being used, where the inventory item is currently located, and corresponding real-time status of the inventory. Thus, traditional retail systems are limited in their response to consumer's needs in real-time.

Traditional retail systems may have a centralized database for inventory. However, traditional retail systems simply provide a quantity of inventory items that should be available in the store. A technical limitation of traditional retail systems comprise the inability to communicate with various computing devices, or agents, that can perform or cause to perform certain functions, such as moving items from one intra-store location to another, restocking a showroom, providing quality assurance, and/or informing an agent of a customer's current location when in need of help.

In various embodiments disclosed herein a computing device may be referred to as an agent, user access point system, and/or the like. An agent can comprise an electronic device for use by a customer, a stock room or back of house employee, a concierge employee, a user-experience employee, a quality assurance employee, a checkout employee, and/or the like. The agents can comprise software that is displayed on an electronic device via an application. The agents can comprise a display such as a welcoming display and/or a dressing room display. The agents can comprise a graphical user interface.

The present disclosure presents various embodiments of systems, methods, and devices for providing a dynamic, automated, customizable, and/or more efficient retail shopping experience and/or management of inventory that addresses the shortcomings of traditional retail systems. A retail concierge system can communicate with various agents to initiate an action and/or prevent agents from performing certain actions. For example, one action that may be initiated is the movement of an inventory item from one location to another, such as the stockroom to a dressing room. An example of an action that may be prevented is the selection of an item for a customer to try on if that item is already in another dressing room and/or assigned to another pull request. The retail concierge system can track individual inventory items and/or inventory types throughout the retail store. The retail concierge system can identify inventory items that can be temporarily unavailable, such as an item currently being tried on or in repair. In some embodiments, the retail concierge system can provide real-time (or substantially real-time) tracking for each and every inventory item in the store and/or restock the showroom if all inventory items for a particular inventory item type become unavailable.

In some embodiments, the systems disclosed herein can be implemented in a retail setting, such as, for example, a retail clothing store. Although various examples given herein are given with respect to a retail clothing store, articles of clothing, dressing rooms, and the like, the various systems, methods, and devices disclosed herein can be used in other settings, too, such as retail stores selling other types of goods, warehouse environments, wholesale environments, testing rooms or areas, and/or the like.

Another technical limitation of traditional retail systems is the lack of status updates for inventory items that are temporarily unavailable, such as if a customer is currently trying on the last-available inventory item or if the last-available inventory item is currently in repair. Furthermore, traditional retail systems may not be able to identify which inventory items are in the showroom versus which items are elsewhere in the establishment. Thus, retail systems often need to provide a variety of sizes, colors, and variations in the showroom, and cannot provide any indication on whether inventory items need to be restocked in the showroom. Traditional retail systems also cannot prevent certain computing systems from performing actions on particular inventory items. Instead, traditional retail systems simply provide an expected available quantity of an inventory type.

Example Retail Concierge System

FIG. 1A illustrates an example embodiment of a schematic diagram of a retail concierge system as implemented in a retail establishment 100. It should be noted that, although this figure and other figures included herewith illustrate specific embodiments, the concepts and techniques disclosed herein may be applied in various other versions of retail establishments.

With reference to FIG. 1A, the retail establishment 100 is an example of a clothing store. The retail establishment 100 comprises a stockroom 144, a quality assurance area 146, and a plurality of dressing rooms 142A, 142B, 142C. The retail establishment 100 further comprises a showroom area 147, a back of house area 149, and a checkout counter and/or packing station 148. Other retail establishments may comprise more or less locations than shown in FIG. 1A. In the embodiment illustrated in FIG. 1A, a variety of agents (e.g., computing devices, user access point systems, and/or the like) are also illustrated. For example, FIG. 1A illustrates a plurality of showroom agents 162, dressing room agents 164A, 164B, 164C, a concierge agent 167, and a back of house agent 168. Each of these agents can comprise, for example, a computing device configured to be interacted with by customers and/or employees. Each of these agents can also be configured to be in communication, such as via a computer network, with one or more servers, such as the central server 102 of FIG. 1B or the main server system 202 illustrated in FIG. 2C. Not necessarily all of these agents need to be present in any particular system. For example, in a system that does not have a concierge to interact with customers, a concierge agent 167 may not be needed. As another example, some systems may be configured to have more human interaction in the showroom area 147, and thus may use the concierge agent 167 instead of the showroom agents 162 to set up customer sessions and select items for filling a wardrobe. As another example, some systems may comprise the dressing room agents but not the showroom agents 162 and/or concierge agent 167. FIG. 1A also illustrates an additional optional agent 170, representative of a customer's computing device, such as a smartphone. Such an optional agent can provide additional functionality in a retail concierge system as disclosed herein, but, as with others, is not required in every embodiment.

As shown in FIG. 1A, each of the dressing rooms comprises a wardrobe 139A, 139B, 139C. These wardrobes comprise two access points (one each into the dressing room 142 or the back of house area 149). The access point into the dressing room is labeled 143A, 143B, or 143C. The access point into the back of house area 149 is labeled 141A, 141B, or 141C. As discussed above, the system may be configured such that only one of those access points for each dressing room can be open at a time. This can help with privacy and the seamlessness of the experience. For example, each wardrobe 139 may comprise an electronic lock system 190. The electronic lock system 190 may comprise, for example, an electronic lock controller that is configured to control electronically controllable lock associated with each of the wardrobe doors 141, 143. For example, each of the wardrobe doors 141, 143 may comprise or be associate with an electromagnetic lock that is electronically lockable or unlockable by the electronic lock controller. In some embodiments, the electronic lock system 190 may be a part of and/or may be in electronic communication with a user access point system and/or central server, such as the user access point systems and central server illustrated in FIG. 1B. In some embodiments, however, the electronic lock system 190 may not be part of and/or in communication with such systems.

FIG. 1O illustrates additional details of an overhead view of an example embodiment of a wardrobe 139 similar to the wardrobes 139A, 139B, 139C of FIG. 1A. The wardrobe 139 comprises an interior space 195 for positioning therein of clothes or other items for a customer to try out. For example, the wardrobe 139 may comprise a rod 138 for hanging of clothes hangers thereon. The wardrobe 139 further comprises a front door or access point 143 that is configured to hingedly open at hinge joint 194 to allow access to the interior space 195 from the dressing room area 142. The wardrobe further comprises a back door or access point 141 configured to hingedly open using hinge joint 194 to allow access to the interior space 195 from the back of house area 149.

FIG. 1O additionally illustrates additional details of an example electronic lock system (such as the lock system 190 of FIG. 1A). The lock system comprises an electronic controller 191 that is in electronic communication with electronically controllable locks 192. In this embodiment, the locks 192 comprise electromagnetic locks that are configured to interact with magnetic portions 193 of the doors 141, 143 to selectively lock or unlock the doors. Further, the wardrobe 139 comprises a door sensor 196 for each of the doors 141, 143 to enable the electronic lock controller 191 to determine whether each of the doors is open or closed. The door sensors 196 may comprise magnetic sensors, optical sensors, mechanical switch sensors, and/or the like. In some embodiments, the door sensor 196 is integrated into the electronically controllable lock 192.

The embodiment illustrated in FIG. 1O is merely one example, and various other electronically controllable lock configurations may be utilized. Further, as mentioned above, the electronic lock controller 191 may be a stand-alone unit that does not communicate with the central server of the retail system in some embodiments. However, in some embodiments, the electronic lock controller 191 may communicate with the central server to manage locking and unlocking of the doors. For example, the electronic lock controller 191 may communicate with the central sever 102 of FIG. 1B via network 120. Further, some embodiments may comprise an individual electronic lock controller for each of the doors and/or electronic locks instead of having one electronic lock controller that communicates with multiple doors or locks. Further, although this embodiment illustrates two hinged doors, other wardrobes may comprise sliding doors, accordion style doors, and/or the like. Further, although this embodiment illustrates the two access points being at opposite sides of the wardrobe, other embodiments may position the access points differently. For example, the back of house access point 141 may be in the side walls instead of the back wall. Further, in some embodiments, more than two access points may be available, such as to enable multiple back of house access points.

Returning to FIG. 1A, in an example customer experience, a customer 171 may arrive at the retail establishment 100 intending to shop for a specific item, such as a pair of shoes. When the customer 171 arrives at the retail establishment 100, the customer 171 may, for example, interact with a showroom agent 162 (which may, for example, comprise a touchscreen display mounted on a wall, pedestal, and/or the like) to browse the available inventory of this retail establishment. The customer 171 may also browse sample items 150, 152, 154 that are shown in the showroom 147. Once the customer 171 has decided what he or she wants to try on, the customer 171 can select the items using the showroom agent 162 and indicate to the system that the customer is ready to try on the items. The system can be configured to then generate a pull request that is delivered to the stockroom agent 168, such as using API communications between the main server and the stockroom agent 168. The pull request can be configured to instruct a stockroom employee that is interacting with the stockroom agent 168 to pull one or more inventory items from the stockroom 144 and move them to, for example, wardrobe 139A of dressing room 142A.

Once the stockroom employee has moved the one or more inventory items from the stockroom 144 to the wardrobe 139A, the customer 171 can be notified that their items are ready to be tried on. For example, if the customer 171 is already in the dressing room 142A, a notification may be given to the customer 171 by, for example, the dressing room agent 164A playing a sound, issuing a visual notification, and/or the like. As another example, if the customer 171 is not already in the dressing room 142A, a notification may be sent to the concierge agent 167, enabling the concierge employee to notify the customer 171 that the dressing room is ready.

Once the back of house access point 141A has been closed, the system can be configured to enable the dressing room access point 143A to be openable by the customer 171. Accordingly, the customer 171 can open the access point 143A and retrieve and/or try on any items in the wardrobe 139A. After the customer 171 tries on the items, various things could occur. For example, if the user wishes to purchase the items, the system may enable the user to complete a purchase, such as using the dressing room agent 164A. As another example, the system may enable the user to complete a purchase with the help of the concierge employee, such as by using the concierge agent 167. As another example, the system may be configured to generate a pull request that causes an employee to move the items from the wardrobe 139A to a checkout counter or packing station area 148A for completion of the purchase.

If, after trying on the items, the user wishes to try on additional items, the dressing room agent 164A may enable the customer 171 to browse additional inventory and/or select additional items, similarly to how the showroom agent 162 enabled the customer 171 to do similar things. Based on these interactions, one or more additional pull requests may be generated by the system and delivered to the stockroom agent 168 to cause a stockroom employee to retrieve items from the wardrobe 139A, deliver additional items to the wardrobe 139A, and/or the like.

It should be noted that FIG. 1A illustrates only a single stockroom agent 168 and concierge agent 167, for simplicity of description. However, by using the techniques disclosed herein, such as pull requests for movement of inventory and dynamic real-time tracking of locations of specific items of inventory in the retail establishment, the system can scale to enable any number of agents to be simultaneously interacting with the system and thus efficiently serving any number of customers.

FIG. 1B illustrates an example block diagram of a system that may be used with, for example, the retail establishment 100 illustrated in FIG. 1A. The system illustrated in FIG. 1B comprises a plurality of showroom access point systems 162, dressing room access point systems 164, concierge user access point systems 167, and stockroom user access point systems 168. These various user access point systems can correspond to the various user access point systems or agents depicted in FIG. 1A using similar reference numbers.

FIG. 1B further illustrates that the various user access point systems can communicate through a network 120 with a central server 102. The central server 102 may in some embodiments be located at the retail establishment 100, or in other embodiments may be located remotely from the retail establishment 100, such as being located in a remote data center or at another retail establishment. The central server 102 comprises a retail experience management system 104 that can be configured to track and/or manage the inventory of the retail establishment, track and/or manage unique fitting sessions for customers shopping at the retail establishment, conduct checkout processes, generate alerts and/or notifications, track employee productivity, and/or the like.

The retail experience management system 104 can be configured to communicate with one or more databases, such as an inventory database 106 and/or a fitting sessions database 108 to manage the retail establishment's inventory and/or customer fitting sessions. The retail experience management system 104 can further be configured to present an API interface 110 that presents a plurality of API endpoints that allow the various user access point systems 162, 164, 167, 168 to communicate with the central server 102 to, among other things, generate new unique fitting sessions, manage existing fitting sessions, and/or complete fitting sessions. Although the embodiment illustrated in FIG. 1B illustrates a single central server 102, the functionality performed by the central server 102 may be performed by more than one computer system.

The various user access point systems depicted in FIG. 1B may comprise various types of computing devices that present an interactive graphical user interface 122 to a user, such as a customer or employee. In some embodiments, such a user access point system may comprise a portable device, such as a smart phone or tablet computer. In some embodiments, such a user access point system may comprise a computing device not intended to be so portable, such as a touch screen display mounted on a wall, pedestal, table, display case, and/or the like. In some embodiments, a mixture of different types of user access point systems may be used for any particular category of user access point system. For example, the stockroom user access point systems 168 may comprise one or more portable tablet computers that are configured to be carried around by a stockroom employee and/or strapped to the stockroom employee's arm (e.g., using a forearm band 181 that is configured to fit around an employee's forearm) to free both of the stockroom employees hands for other work. However, it may also be desirable to have other stockroom user access point systems 168, such as a non-portable touch screen display that is mounted on the wall in the stockroom 144, and/or the like.

Example Retail Concierge System Process

FIG. 1C illustrates an example embodiment of a process flow diagram showing an overview of a retail concierge system as disclosed herein managing a fitting session for a customer. The process flow illustrated in FIG. 1C may be implemented by, for example, the systems illustrated in the schematic diagram of FIG. 1A and the block diagram of FIG. 1B, or any of the other systems disclosed herein.

At block 101, the showroom system starts its process. For example, a showroom user access point systems 162 may be configured to display an interactive graphical user interface that is ready for a customer to interact with it. At block 103, the showroom system creates a new fitting session. For example, the showroom user access point system 162 may be configured to communicate with the central server 102 via the API interface 110 to request that a new fitting session be created and an identifier assigned thereto. In some embodiments, the showroom system 162 is configured to collect identifying information from the customer that can be associated with the new fitting session. For example, the showroom system 162 may be configured to receive a name, an email address, a user ID, and/or any other information that could be used to identify this new fitting session. In some embodiments, the central server 102 is configured to assign the new fitting session a unique identifier used to track that fitting session throughout the customer experience.

The showroom system 162 can be configured to then enable the customer to browse the inventory of the retail establishment using the graphical user interface of the showroom system 162. The showroom system 162 may be configured to communicate with the central server 102 via the API interface 110 to retrieve information about the current inventory in order to present such information to the customer. At block 105, the showroom system adds one or more hangers to the fitting session. For example, the showroom system 162 may receive an input from the customer via the graphical user interface that indicates the customer is interested in trying on one or more inventory items (which may be referred to herein as hangers). The showroom system 162 can be configured to communicate with the central server 102 via the API interface 110 to instruct the adding of the one or more hangers to the current fitting session. For example, the retail experience management system 104 may be configured to associate an identifier of the current fitting session with the one or more hangers or inventory items. In some embodiments, once a hangar has been added to a specific fitting session, the central server 102 can be configured to mark that inventory item in its inventory database as being assigned to a fitting session, and restrict other user access point systems from requesting assignment of that item to another fitting session.

At block 107, the showroom system receives an input from the user that indicates the user is ready to try on or buy the hangar or hangers that were added to the fitting session at block 105. For example, the user of the showroom system 162 may utilize the interactive graphical user interface to indicate that the user wishes to try on the selected items. The showroom system 162 can then be configured to communicate with the central server 102 via the API interface 110 to indicate to the central server 102 that the inventory items or hangers associated with the current fitting session should be moved to an appropriate area, such as a dressing room for the customer to try them on.

The stockroom system process flow starts at block 109. For example, stockroom user access point system 168 of FIGS. 1A and 1B may be configured to initialize its interactive graphical user interface and prepare for processing pull requests or other data. At block 111, the stockroom system communicates with the central server via the API interface to retrieve one or more open pull requests. For example, in response to the showroom system indicating to the central server at block 107 that the present fitting session is ready for the customer to try on the items, the retail experience management system 104 may be configured to generate a pull request that indicates the one or more hangers or inventory items assigned to the present fitting session should be moved from the stockroom 144 to a wardrobe 139 associated with a dressing room 142. At block 111, the stockroom system 168 may be configured to receive this pull request (and potentially any other open pull requests) from the central server 102 using the API interface 110.

At block 113, the stockroom system claims the pull request for the present fitting session. For example, the stockroom system 168 may be configured to display the available pull request to an employee via the graphical user interface and enable the employee to indicate to the system that he or she will handle the pull request for the present fitting session. The stockroom system 168 may then be configured to communicate with the central server 102 via the API interface 110 to indicate that the stockroom system 168 has claimed the present pull request.

At block 115, the stockroom system marks the pull request as complete. For example, after the stockroom employee has moved the one or more hangers or inventory items from the stockroom 144 to a wardrobe 139 associated with a dressing room 142, the employee may indicate to the stockroom system 168 using the graphical user interface 122 that the items have been moved to the dressing room. The stockroom system 168 can then be configured to communicate with the central server 102 via the API interface 110 to indicate to the central server that the present pull request has been completed. In some embodiments, the stockroom system 168 may be configured to automatically indicate to the central server that the pull request has been completed when, for example, the stockroom system 168 detects that the pull request has been completed, even if the employee does not specifically indicate to the stockroom system 160 that the pull request has been completed. For example, the system may be configured to utilize wireless tags or sensors, such as RFID tags or the like to automatically detect that one or more inventory items have moved from one location to another. As another example, the system may be configured to enable the employee to scan a barcode or other computer readable code associated with the device, with that scanning automatically indicating to the system that the pull request has been completed.

Now that the requested items have been moved to a dressing room for the customer to try on, the next portion of the flowchart of FIG. 1C involves getting the customer into the dressing room so that the customer can try on the items. Although this embodiment discloses utilizing a notification to a concierge system to accomplish this, various other embodiments may accomplish this in other ways. For example, the customer may receive a notification via his or her personal computing device, such as a smart phone, the showroom agent 162 may indicate to the customer that the dressing room is ready, the customer may already be in the dressing room and the dressing room system may notify the customer the items are in the wardrobe, and/or the like.

The concierge system process flow starts at block 117. At block 119, the concierge system receives a notification that the dressing room for the present fitting session is ready. For example, the concierge system 167 may communicate with the central server 102 via the API interface 110 to receive a notification that a dressing room 142 is ready for the customer to try on their clothes (e.g., the wardrobe 139 associated with that restaurant 142 has been stocked with the items requested in the present fitting session). In some embodiments, the concierge system 167 can be configured to then activate the dressing room at block 121. For example, the concierge system 167 may be configured to communicate with the central server 102 via the API interface 110 to indicate that the customer is being directed to the dressing room or is already in the dressing room, so that the system can coordinate with the dressing room system 164 of that dressing room 142 to continue the present fitting session with the customer.

The dressing room system starts at block 123. At block 125, the dressing room system can be configured to display fitting session details. For example, a dressing room system 164 as illustrated in FIG. 1A may be configured to communicate with the central server 102 via the API interface 110 to receive data related to the present fitting session, such as, for example, one or more items associated with the fitting session, data related to the customer, and/or the like.

In some embodiments, the customer may realize while trying the items on in the dressing room that the customer desires to try on additional items, such as different sizes, colors, styles, and/or the like. In such a case, the dressing room system 164 may be configured to enable the customer to interact with its interactive graphical user interface 122 to select such items. The dressing room system 164 can then be configured to communicate with the central server 102 via the API interface 110 at block 127 to coordinate adding of the one or more additional items or hangers to the present fitting session. The central server can then generate a new pull request to move the additional items from the stockroom 144 to the wardrobe 139. In such a case, the process flow may proceed back to block 111, where the stockroom system communicates with the central server via the API interface 110 to retrieve, claim, and mark as complete this new pull request. In some embodiments, the dressing room system 164 may be configured to alert or notify the customer that the new items have been placed in the wardrobe 139.

Once the customer is ready to check out, such as to purchase one or more of the items he or she tried on, the dressing room system can, at block 129, communicate with the central server 102 via the API interface 110 to indicate that the customer is ready for checkout. In some embodiments, the dressing room system 164 may coordinate the checkout process. In other embodiments, however, the concierge system 167 may be configured to coordinate the checkout process. For example, the process flow may proceed to block 131, where the concierge system is configured to communicate with the central server 102 via the API interface 110 to initiate the checkout process. After the checkout process is initiated, the concierge system 167 can, at block 133, initiate clearing of any remaining hangers (e.g., any items remaining in the wardrobe 139 that were not purchased by the customer). For example, the concierge system 167 may be configured to communicate with the central server 102 via the API interface 110 to indicate that there are remaining items in the wardrobe 139. The central server 102 may then be configured to generate another pull request for movement of those remaining items back to the stockroom 144 and/or the quality assurance room 146. The process flow can then proceed back to block 111 again, where the stockroom system 168 can retrieve the new pull request, claim the pull request, and mark the pull request as complete once the items have been moved. In some embodiments, if quality assurance checks are to be performed on the items before they are entered back into the general stockroom inventory, an additional pull request may be generated by the central server that is configured to indicate to the stockroom system that quality assurance checks should be performed on the items. Such a pull request can be acted on similarly to the other pull request, namely the process flow illustrated at blocks 111 through 115.

In some embodiments, a pull request is defined as request in the system for an action to occur with respect to one or more inventory items. For example, that action may be to move an inventory item from one location to another, to conduct quality checks on an item, to bag up an item for completion of a checkout process, and/or the like. For example, a user can cause the generation of a pull request by requesting an inventory item. The pull request can include a request to hold the item until the user is ready to try it on. The pull request can include a request for the item to be placed in a wardrobe of a dressing room, such as a request for an inventory item while the user is in the dressing room. The pull request can be viewed by a back of house employee. For example, the pull request can be displayed on a stock room agent. The back of house employee can claim a pull request and/or be automatically assigned a pull request. Once the back of house employee completes the pull request, the retail concierge system can mark the pull request as complete and/or remove the pull request from the list of pull requests and/or place the pull request with a list of completed pull requests, and/or the like.

Additional Example Retail Concierge System Process

With further reference to FIG. 1A-1C, following is a description of another example embodiment of a retail concierge system process. In response to certain actions and/or communications, the retail concierge system and/or agents can initiate communication among agents. In some embodiments, communication can occur via API calls to and from the central server. For example, a show room agent on the floor, a stock room agent in the back of house area, a concierge agent, a dressing room agent, and/or the like can communicate via API calls with the central server of the retail concierge system.

In this example, a customer 171 may arrive at the retail establishment 100 intending to shop for a specific item and/or to browse available inventory of the store. The customer 171 can begin by entering into the retail establishment 100. The customer can interface with a graphical user interface on the show room (such as a show room agent 162). The customer can log into his or her account on the show room agent 162 and/or otherwise create a fitting session for the retail experience, such as by entering a name, email address, and/or the like. In other embodiments, an employee of the retail establishment can create the fitting session on behalf of the customer (via the showroom agent 162, the concierge agent 167, and/or the like).

In some embodiments, a user and/or an employee of the retail establishment can add inventory items (sometimes referred to herein as a hanger) to the fitting session. A graphical user interface, such as the user interface of the show room agent 162, can display the list of items that the consumer selected. The consumer can select an option on the graphical user interface indicating that the consumer would like to try on the selected items.

Upon such a request, the central server of the retail concierge system can generate a pull request for each of the inventory items selected for the consumer. A back of house employee can interact with a user interface of the retail concierge system. The back of house employee can interact with the retail concierge system via a stock room agent 168. The stockroom agent 168 can display a list of open pull requests. For example, the stockroom agent 168 can view all pull requests that are open for the store. The stockroom agent 168 can claim the pull requests for the selected inventory items. Once the inventory items have been delivered to a wardrobe 139A, the stock room agent 168 can indicate that the pull requests is complete.

In some embodiments, the concierge agent can turn certain dressing rooms on and/or off. Turning a dressing room on or off (or activating or deactivating a dressing room) can mean indicating to the system whether the dressing room is ready for a customer to use it, whether a customer is presently using it, whether the dressing room needs attention prior to its next use by a customer, and/or the like. For example, the concierge agent 167 can get a list of dressing rooms from the central server via an API request (such as a list of virtual inventory cabinets for the retail establishments) and turn on a cabinet for the consumer. Upon turning on an available dressing room for the customer, the retail concierge system can cause the dressing room agent to display details of the fitting session. For example, the dressing room agent can display the currently selected items and/or alternative sizes available for the selected items. The dressing room agent can also display a checkout option for the consumer to initiate within the dressing room.

In response to a user selecting the checkout option on the dressing room agent, the concierge agent can receive the fitting session details and request via an API request that the inventory items from the fitting session be moved from the virtual inventory cabinet associated with the dressing room to a new virtual inventory cabinet associated with a checkout process, to begin checkout procedures. The user can indicate which items the user would like to purchase and the concierge agent can add the desired items to the checkout cabinet while clearing the remaining inventory items (e.g., requesting via an API request that a pull request be initiated to move the remaining inventory items back to the stock room and/or a quality assurance area).

The back of house employee can receive pull requests to pull inventory from a dressing room to another place, such as quality assurance 146 and/or back to the stock room 144. For example, the back of house employee can see a pull request for the items that the user decided not to purchase. The retail concierge system can initiate generation of a pull request for the back of house employee to place the inventory item back into the stock room. The back of house employee can claim the pull request for the fitting session, move the inventory item from the wardrobe 139 to the destination, and mark the pull requests as complete. For example, the inventory item can be sent to a quality assurance room 146 to determine whether the inventory item is ready to be placed back into the show room 147 and/or the stock room 144. If quality assurance is complete and products are ready to return to inventory, the retail concierge system can generate a pull request to send the inventory item from the quality assurance room 146 to the stock room 144. The back of house employee can see the pull request from the list of pull requests, claim the pull request, return the inventory item back to the stock room 144, mark the pull request as complete, and confirm that all pull requests are complete for the fitting session.

Graphical User Interfaces for Retail Concierge Systems for the Customer

FIGS. 1D-1N illustrate example embodiments of selected graphical user interface screenshots for a variety of customer-facing functionalities of the systems as described herein. These graphical user interface embodiments may be utilized with one or more touch-sensitive user access point systems that are intended to be interacted with by a customer, such as the showroom systems 162, dressing room systems 164, and/or user systems 170. These embodiments further illustrate some of the customer-facing screens that a customer may encounter and/or be able to interact with during example processes described above with reference to FIGS. 1A-1C.

Figure 1D:
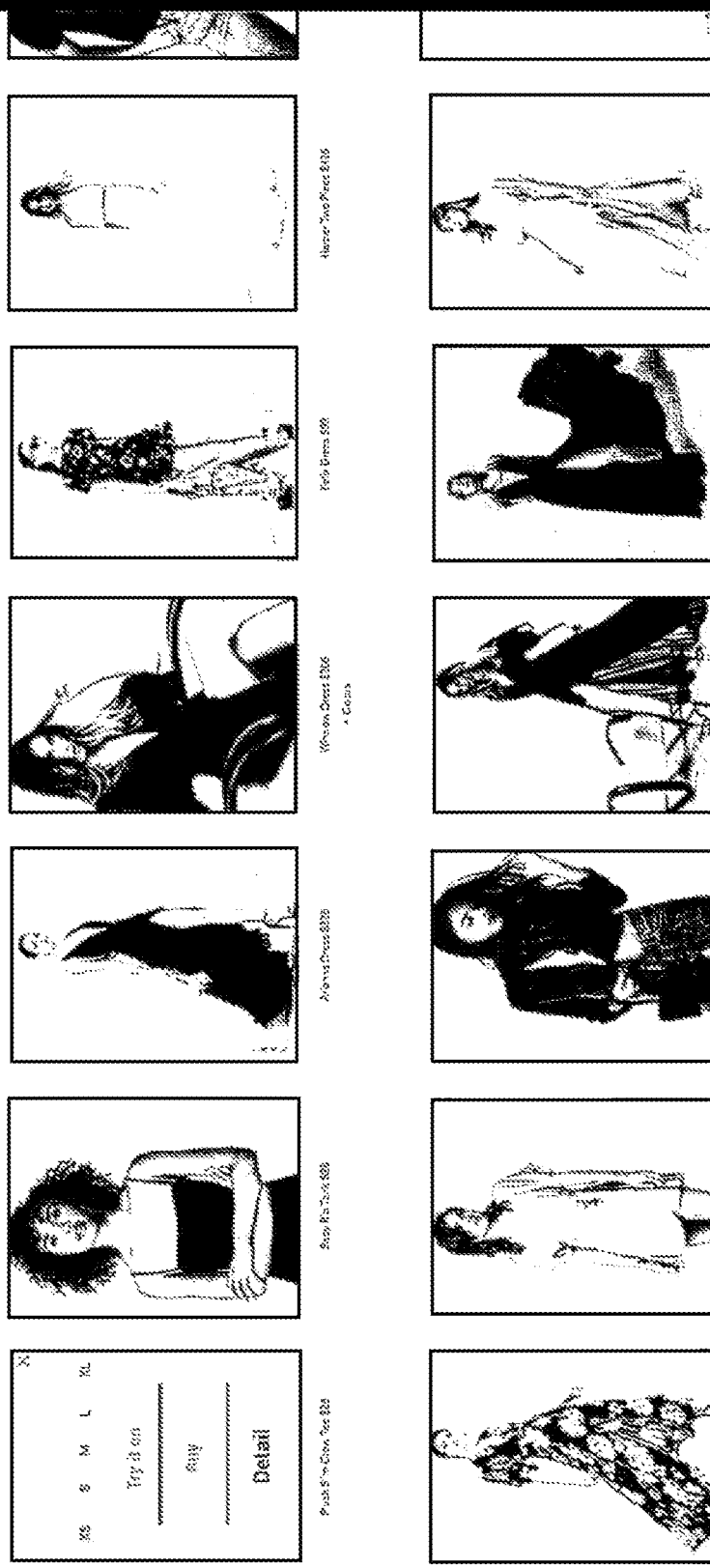

FIG. 1D is an example of a landing screen that a customer may encounter, for example, when they first approached and/or interact with a user access point system, such as a showroom system 162. The graphical user interface depicts a plurality of items that are available to browse and/or try on. In some embodiments, this interface is available for any customer to browse without having to enter any identifying information. Once a user wants to start building a wardrobe of clothes to try on, however, it can be desirable to obtain some sort of identifying information to associate with a unique fitting session that will be generated on the backend. Accordingly, FIG. 1E illustrates an example of a request for such information, such as after a user has clicked on the field shown in FIG. 1D that says "Try it on." Entering some identifying information and/or requesting to try on something may result in the central server creating a new fitting session, similar to as described above with reference to block 103 of FIG. 1C. In some embodiments, a fitting session is created as soon as a user begins interacting with the system, even if no identifying information has yet been received. In such an embodiment, the identifying information may be obtained and/or associated with the fitting session at a later stage in the retail experience process.

In some embodiments, the system can be configured to automatically filter the items being displayed on the user interface for the customer to select from if the system knows something about the customer that is currently shopping using the user interface. For example, if the user enters an identifier that enables the system to retrieve a profile of known preferences or other information about that user, the system can be configured to automatically filter items shown to that customer that the system determines would be relevant and/or most desirable to that customer.

Figure 1F:
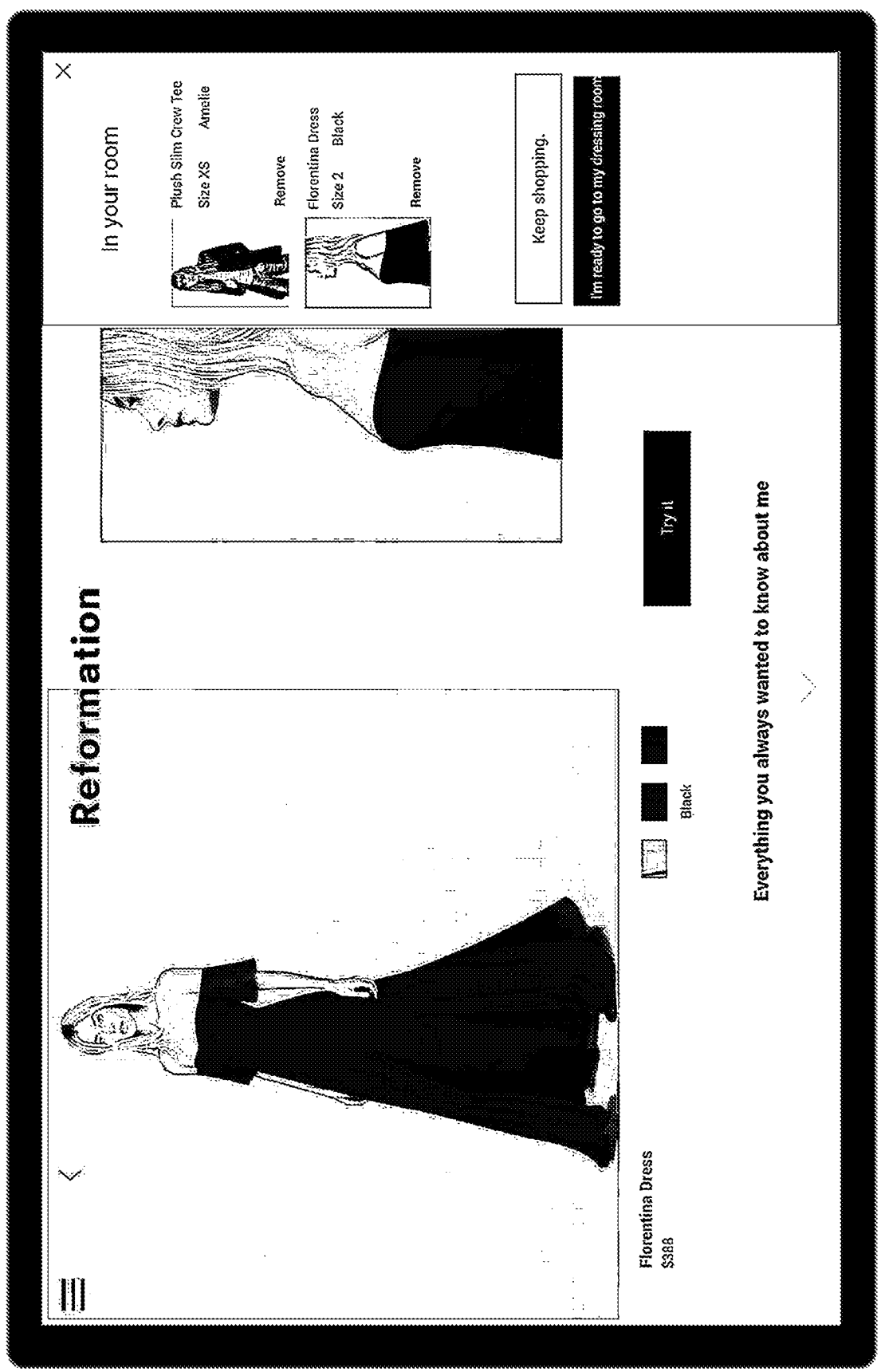
Figure 1G:
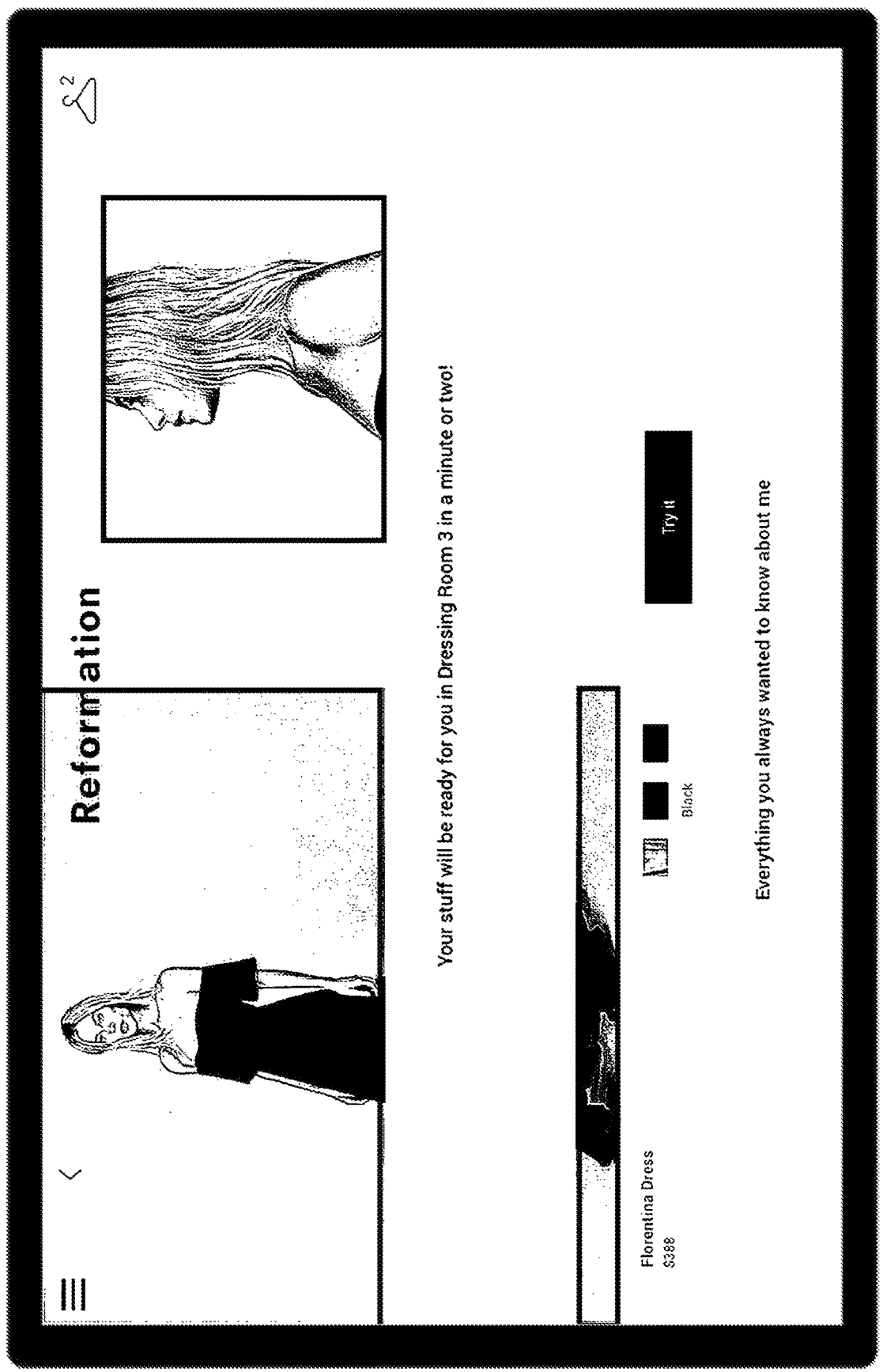

FIG. 1F illustrates a screen that may be shown by the graphical user interface after a user has requested that two different items be added to their fitting session. The screen also illustrates that the user can click on a button or other field that indicates to the system that the user is ready to go to their dressing room to try on the items (in this embodiment, the button that says "I'm ready to go to my dressing room"). Clicking on this button may, for example, invoke block 107 of FIG. 1C as described above. After the user requests to try the items on, a screen similar to FIG. 1G may be shown, which indicates the requested inventory items are being transferred to the dressing room and that the items will be ready in the dressing room shortly.

Once the requested items are ready for the customer to try on in the wardrobe of the dressing room, such as after the process described above with reference to blocks 109-115 of FIG. 1C has been completed, the customer may be notified that their dressing room is ready. For example, a concierge system 167 may receive a notification from the central server that the dressing room is ready, and a user of that concierge system may notify the customer. As another example, the customer may receive a notification via the showroom system 162 and/or the user's system 170.

Figure 1H:
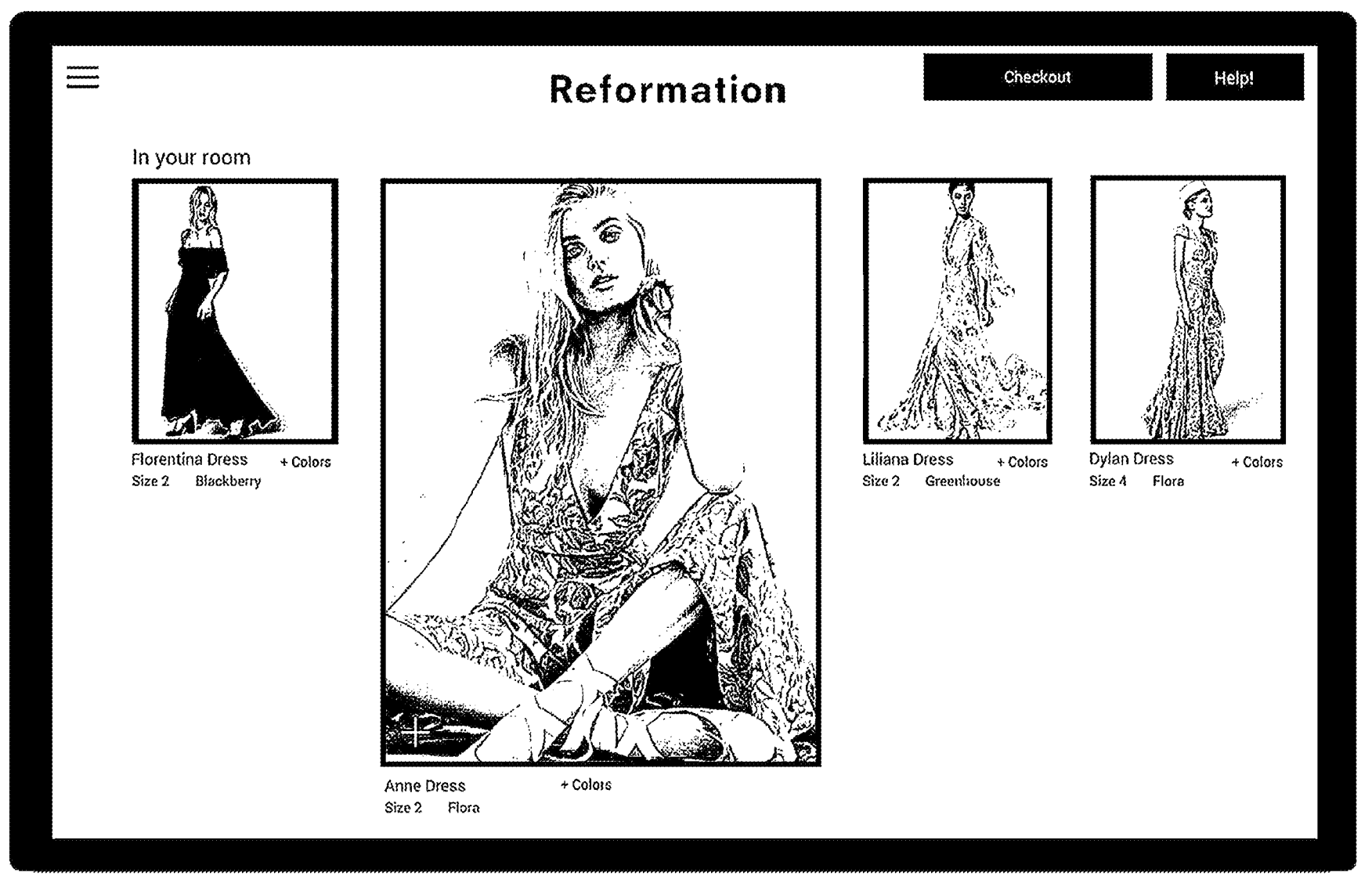

FIG. 1H illustrates an example of a landing or starting screen that may be displayed by the dressing room system 164 when the customer enters the dressing room. The graphical user interface may depict details of, for example, various inventory items that are currently in the wardrobe 139 of the dressing room 142 for the customer to try on.

Figure 1I:
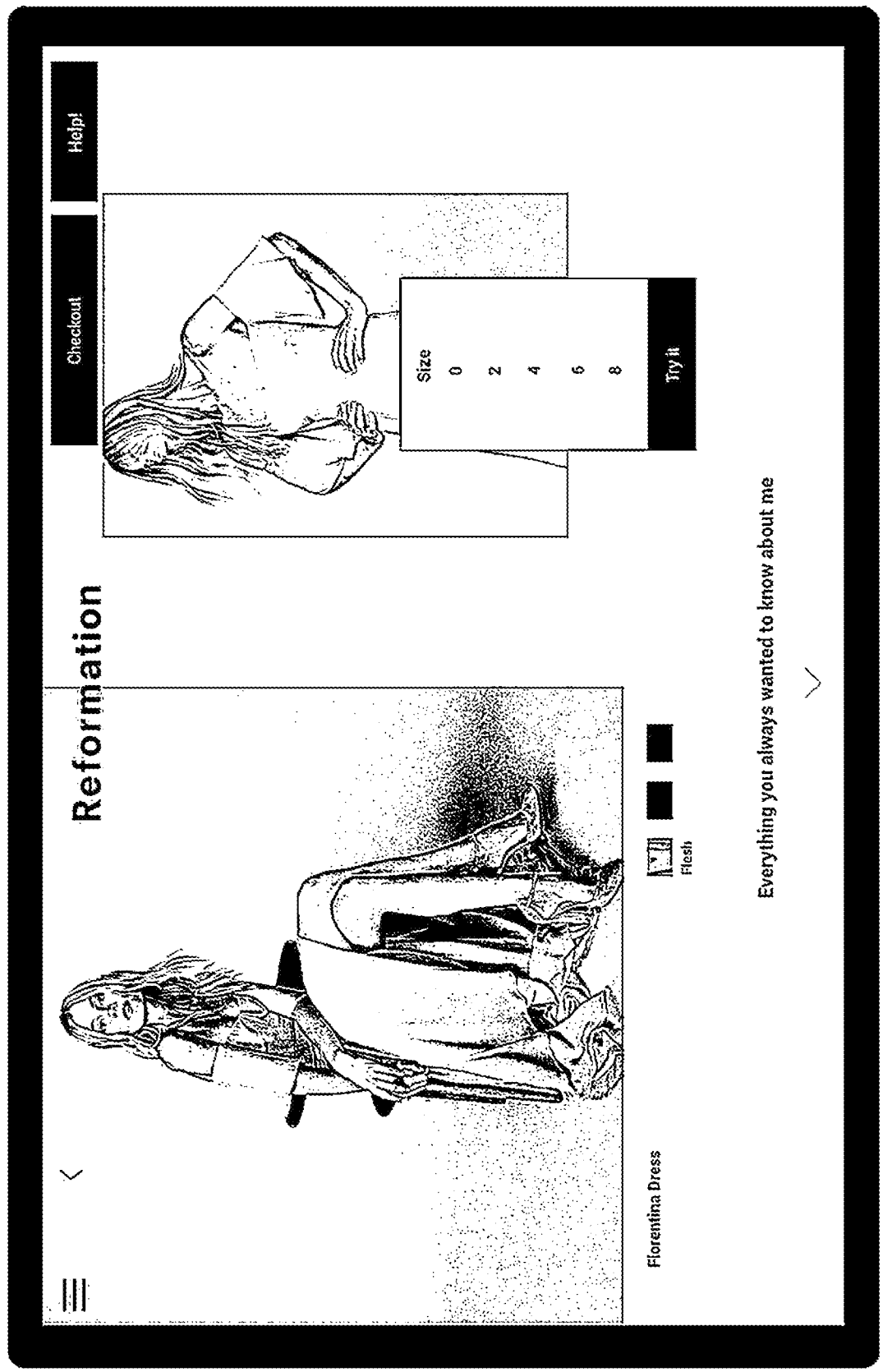
Figure 1J:
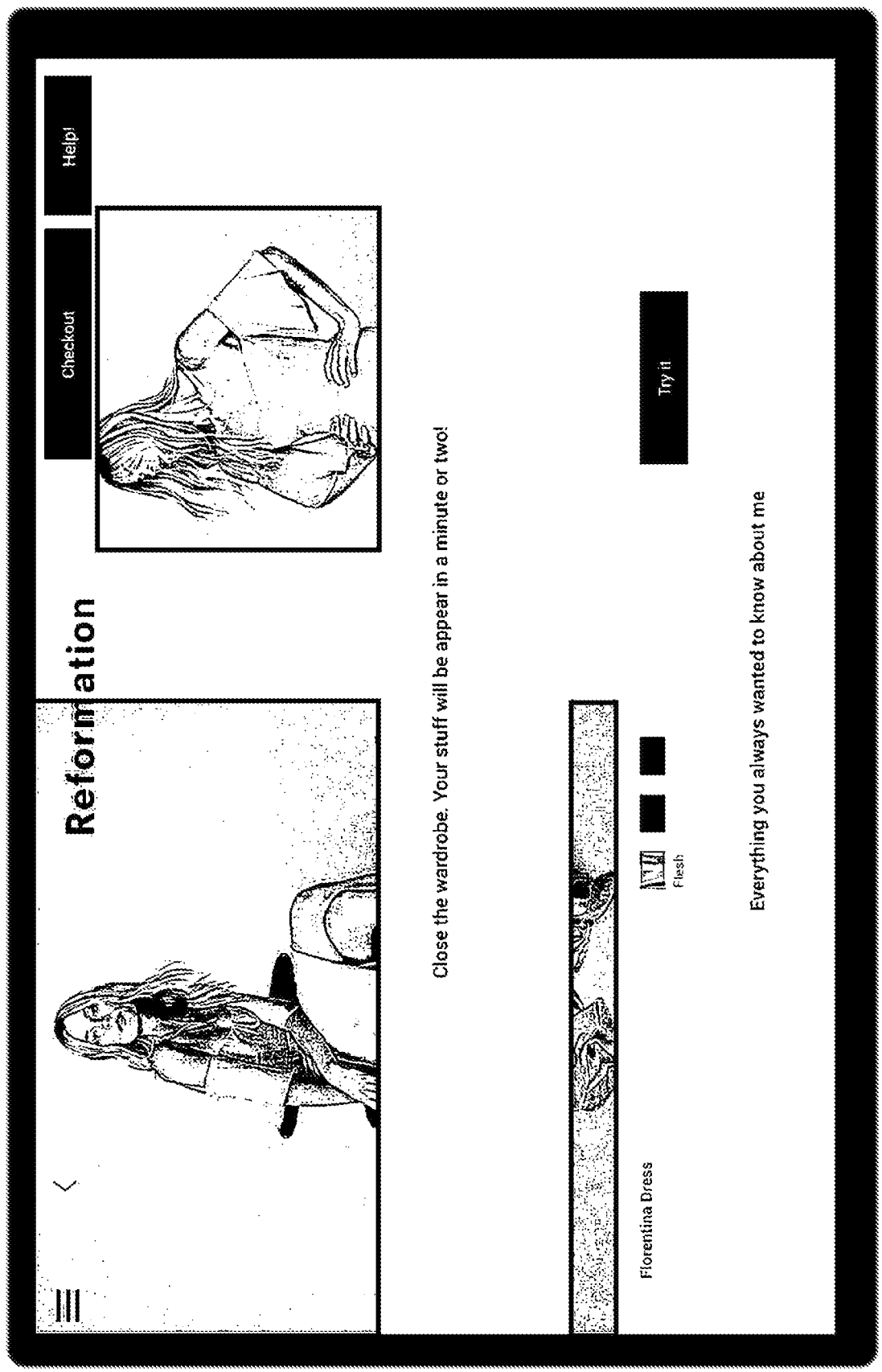

FIG. 1I illustrates another graphical user interface screen that may be displayed by, for example, the dressing room system 164. In this screenshot, the system is presenting functionality that enables the customer to request additional clothing to try on. In this case, a user is requesting to try on a size two dress. After clicking the "Try it" button, the screen illustrated in FIG. 1J may be displayed. In this embodiment, a notification is displayed that asks the customer to close their wardrobe. For example, the customer may need to close the first door 143 of the wardrobe 139 so that a back of house employee may open the second door 141 of the wardrobe 139 to place the new items in the wardrobe. The backend process involved with adding an additional inventory item to the fitting session and causing that item to be moved from the stockroom to the wardrobe may be performed as described above with reference to, for example, block 127 of FIG. 1C.

Figure 1K:
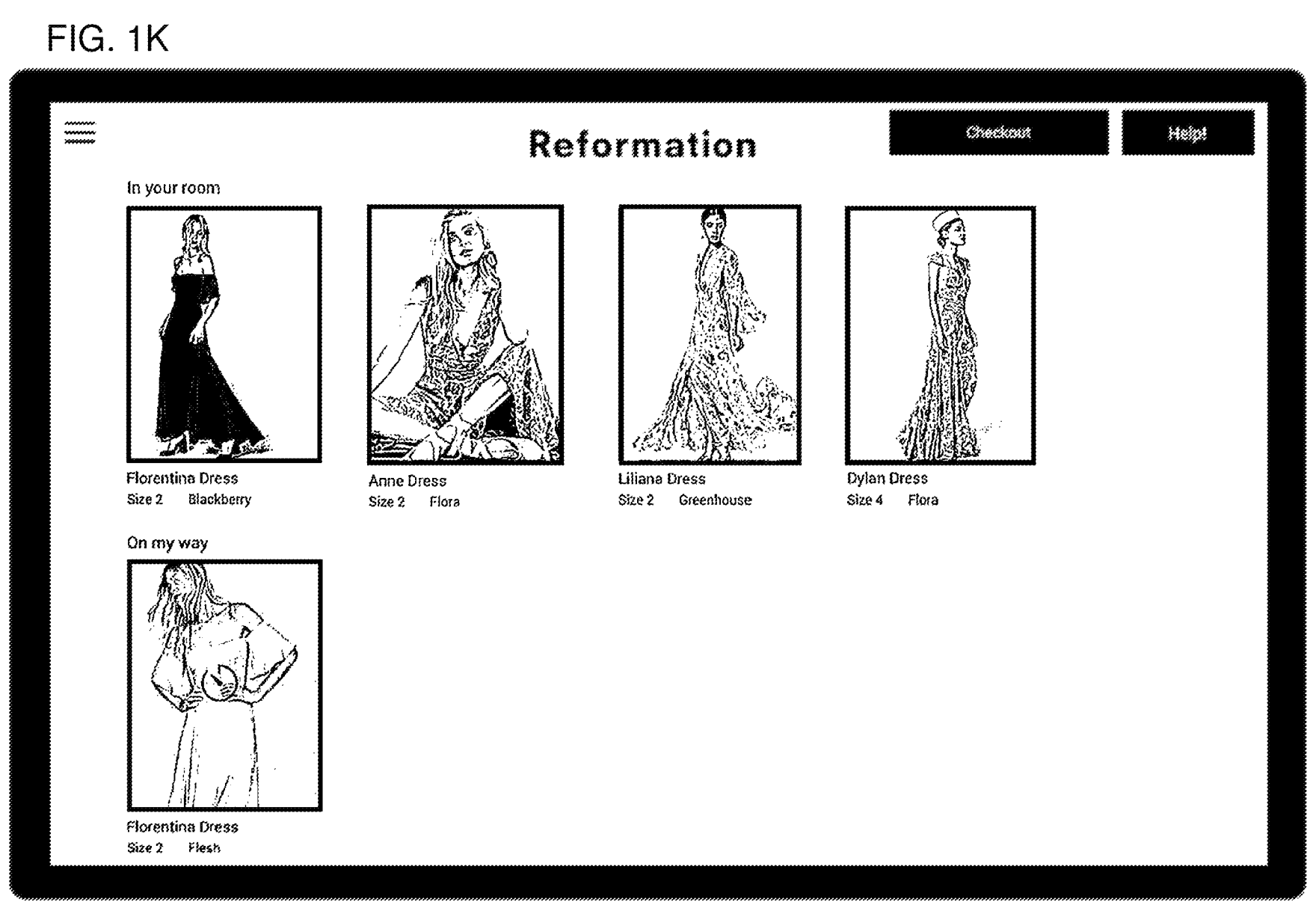
Figure 1L:
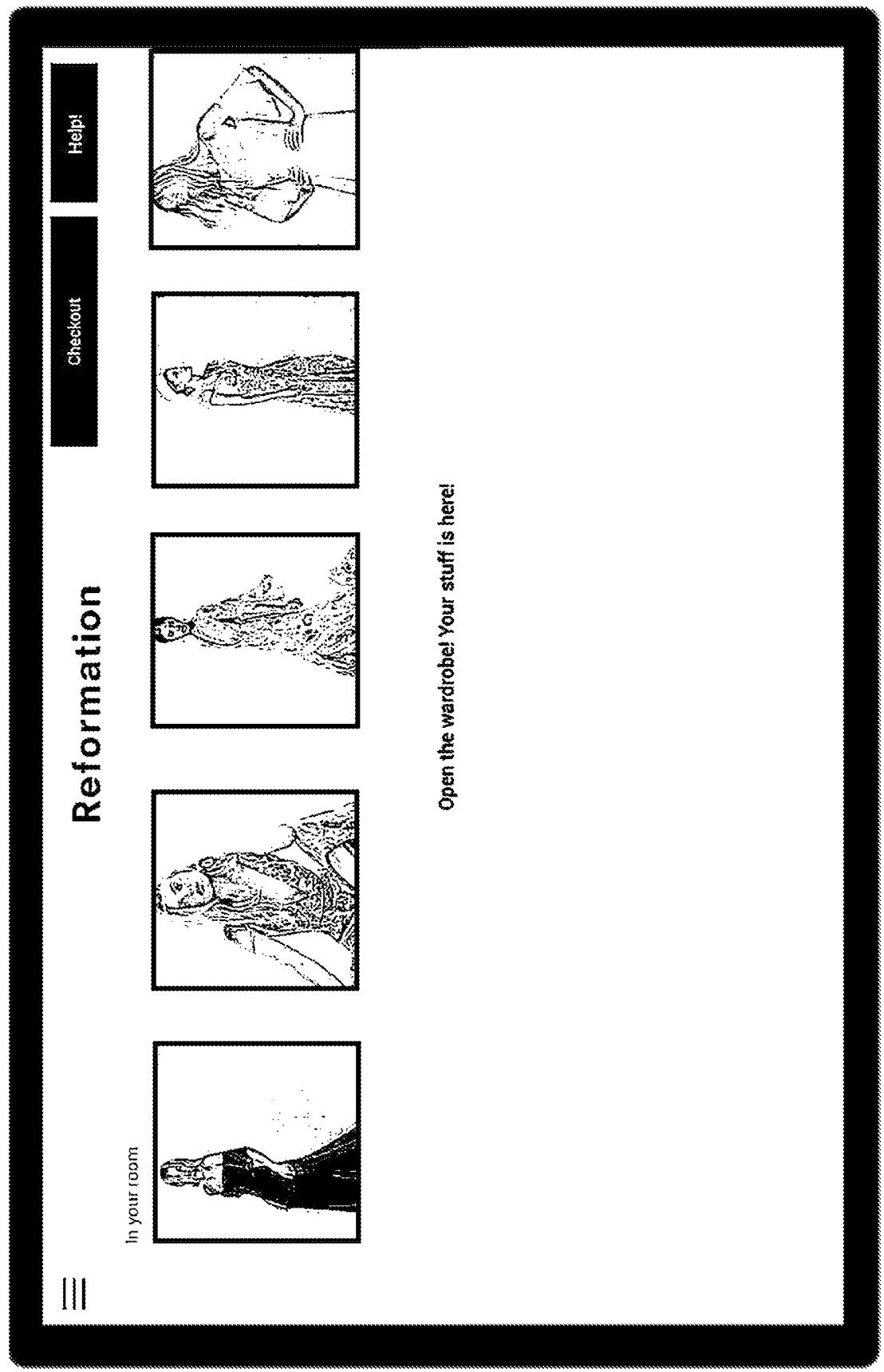
Figure 10:
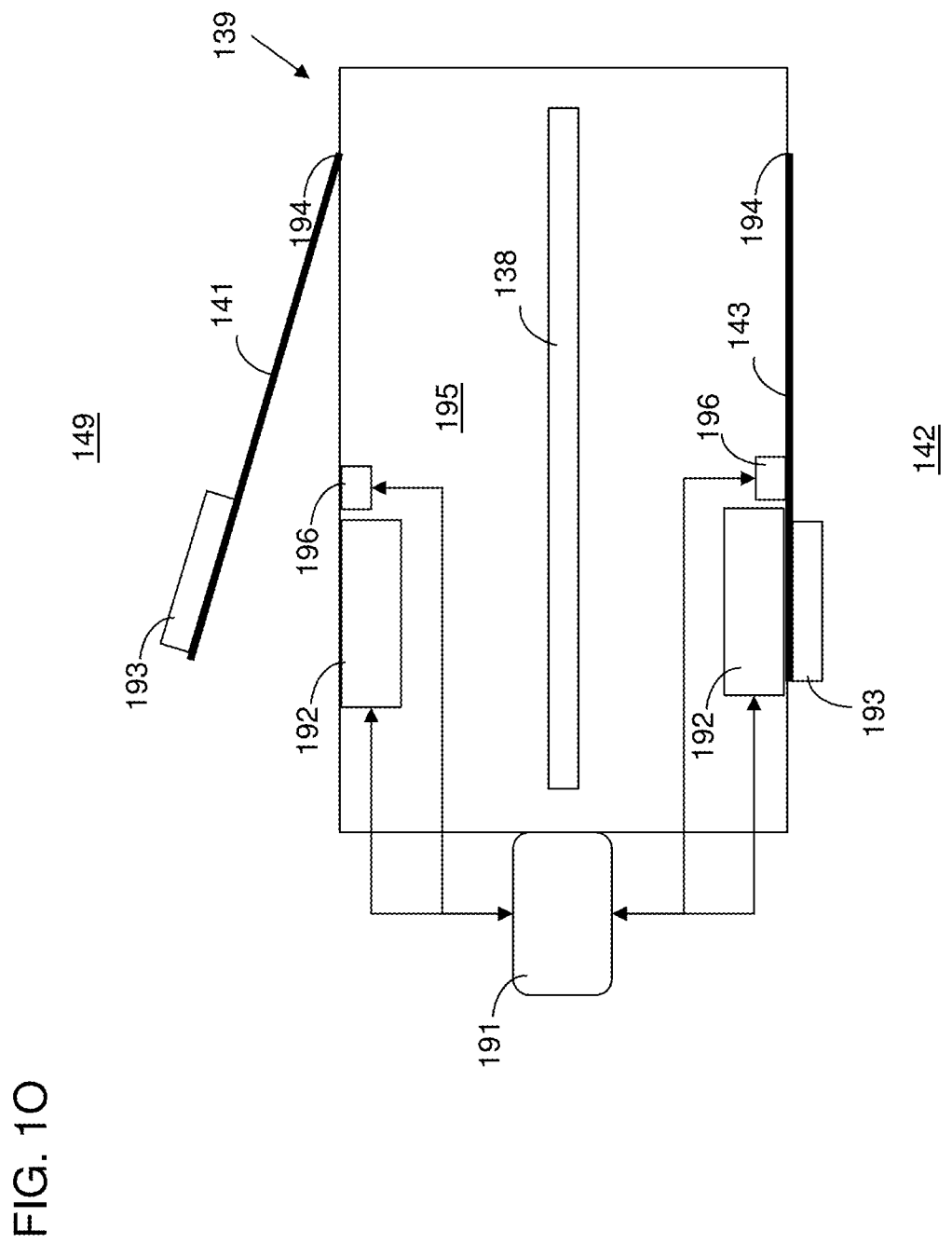
FIGS. 10A-10H are graphical user interfaces displaying detailed information for pull requests for a back of house employee according to some embodiments.

FIG. 1K illustrates an updated screen shown by the dressing room system 164 that indicates the new item is on its way to the wardrobe. Once the new item has been placed in the wardrobe, and the second door 141 of the wardrobe has been closed, the system may be configured to notify the customer that the new item is available in the wardrobe. FIG. 1L illustrates a screen shot of such a notification. This notification may take other forms, also. For example, the notification may comprise an audible sound, a notification sent to the user system 170, and/or the like.

FIG. 1M illustrates an updated screen shown by the dressing room system 164 that indicates the new item is now in the wardrobe instead of on its way to the wardrobe. This and other screens also illustrate that the graphical user interface may comprise other buttons, such as a checkout button and a help button. FIG. 1N illustrates an example screenshot of the graphical user interface after the checkout button has been pressed. In this case, the system is asking for confirmation that the customer is ready to check out. A notification can then be sent to the concierge system by the central server to allow the concierge system to initiate the checkout process. This may be similar to the process discussed above with reference to blocks 129 and 131 of FIG. 1C.

Example Inventory Item & Customer Flow Diagrams

In some embodiments, a system as disclosed herein comprises various components that work together to provide an enjoyable and efficient retail shopping experience for a customer. FIG. 2A is a block diagram illustrating an example inventory item flow from the back of house or system perspective. In the example illustrated in FIG. 2A, the retail concierge system can comprise at least six types of inventory locations (sometimes referred to as cabinets), comprising a stock room 256, a pass through area 254, a staging area 252, a dressing room 260, a checkout 262, and a quality assurance 258. Each of these types of locations can be a type of virtual inventory cabinet used in computer code to assign inventory items to. Although in some cases the types of inventory locations or cabinets depicted in FIG. 2A may be associated with a specific physical location (such as a physical stock room 144, dressing room 142, quality assurance room 146, pass through area, and/or the like), they may not all be associated with a specific physical location. For example, in some embodiments, pass through area 254 may be a virtual inventory location or cabinet that exists only in the computer system, and that may be used to, among other things, temporarily "contain" inventory items that are still physically located in the stock room 144 (or that are in transit from the stock room 144 to another area, but that have not been confirmed as being placed in the final location yet). This may be beneficial, because it can help the system to maintain a seamless customer experience, by, among other things, virtually "removing" items from the stock room 144 as soon as another user or system has claimed that item to try it on. This can help to reduce instances of a user access point system requesting an item to try on, and then being notified that the item is no longer available. In some embodiments, however, the pass through area is a physical area that can be used, for example, as an intermediate area for items to be placed in before being transported to their final destination. For example, if the originating stock room and the destination dressing room are on different floors of the building, the items may first be transported to a pass through area for transportation between floors, and then to the dressing room.

Figure 2B:
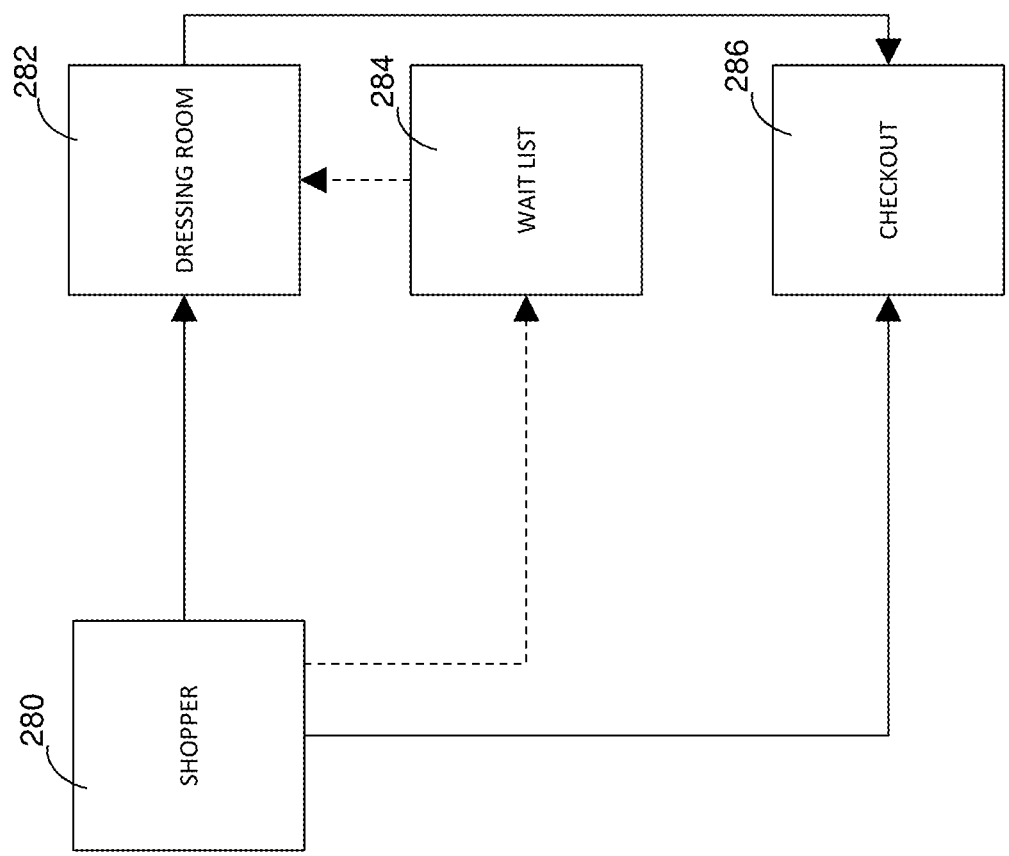
FIG. 2B is a block diagram illustrating an example customer flow according to some embodiments.

FIG. 2B is a block diagram illustrating an example customer flow from the concierge agent's perspective. In the example illustrated in FIG. 2B, the retail concierge system can comprise at least three types of locations for a customer or shopper 280 to be assigned: a dressing room 282, a wait list 284, and a checkout 286. As with the inventory locations of FIG. 2A, some of these various location types may not necessarily be associated with a specific physical location. For example, while a dressing room location type 282 may be associated with a physical dressing room (such as dressing room 142A, 142B, or 142C of FIG. 1A), the wait list and checkout area types 284, 286 may not necessarily be associated with a physical location. For example, a customer may be waiting for a dressing room or conducting a checkout process while the customer is physically located in the showroom 147 of FIG. 1A. It can be beneficial to assign the customer to one of these virtual locations, however, to help the system and/or the concierge agent to efficiently track and/or manage the retail experience of the customers.

In some embodiments, the system can be configured to dynamically track and/or coordinate assignment of inventory items to the various inventory locations shown in FIG. 2A, and assignment of customers to the various customer locations shown in FIG. 2B. As an example, in a specific fitting session, the system can be configured to assign a specific customer to that session and track that session throughout the shopping and checkout process. The system can be configured to assign one or more inventory items to that session, and to coordinate pull requests (e.g., to move inventory items from one location to another) with notifications (e.g., to move a customer from one location to another), to ensure that inventory items and customers are efficiently moved throughout the retail establishment to facilitate the shopping and purchasing experience. This can be desirable, because it can enable the system to create a more seamless customer experience that more efficiently utilizes the customer's time. For example, the system can be configured such that pull requests and notifications are coordinated such that a notification for a customer to proceed to a dressing room is not generated until any pull requests related to stocking of inventory in that dressing room have been completed (or at least until the system, by tracking those pull requests, has predicted that the pull requests will be completed soon, such as within a threshold timeframe, such as 30 seconds, 1 minute, 2 minutes, 3 minutes, 4 minutes, or 5 minutes. This can help to eliminate a customer waiting for an extended period of time in a dressing room, which may be less enjoyable than waiting in the showroom or other area.

In some embodiments, inventory can be placed from the stock room 256 to a pass through area 254 to indicate that an inventory item is to be stored at the pass through until the staging area 252 is ready to receive the inventory item. The staging area 252 can prepare the inventory item for the dressing room 260 and/or communicate to an agent of the dressing room 260 about the delivery of the inventory item. The staging area 252 can hold the inventory item until the item is ready for the dressing room. In some embodiments, an agent of the dressing room 260 can communicate with an agent for checkout 262 to indicate that the user desires to purchase the item and the inventory can move from the dressing room 260 to check out 262.

In some embodiments, the dressing room system 260 and/or the checkout system 262 can return the inventory item to the pass through system 254, such as if the inventory item was not desired by the customer. The inventory item can be placed in the staging area 252 and/or the quality assurance system 258 to be restocked in the stock room system 256.

In some embodiments, if at the staging area 252, the dressing room system 260, and/or the checkout system 262, the inventory item is discovered to have defects, the staging area 252, the dressing room system 260, and/or the checkout system 262 can communicate with the quality assurance system 258 to notify the delivery of a defective inventory item for repair.

In some embodiments, a shopper 280 can be assigned to a dressing room location 282, wait list location 284, or checkout location 286. In some embodiments, the system can be configured to utilize electronic notifications to assign a shopper to one of these locations. For example, the system can be configured to transmit notifications to a concierge agent, shopper agent, and/or the like, that tells the customer the customer is on the waitlist, that a dressing room is available, and/or the like. In some embodiments, the system can coordinate these notifications with pull requests for movement of inventory, for example, so that inventory for a specific shopping session is only moved into the wardrobe of a specific dressing room when that dressing room is ready for the customer associated with that specific session to move from the waitlist location to the dressing room location.

In some embodiments, a retail concierge system as disclosed herein can be configured to allow a user or customer to have an efficient enjoyable retail shopping experience. For example, in a retail clothing store setting, the retail clothing store may be setup to have samples of clothing for sale in a showroom that a customer can browse. A separate area, sometimes referred to herein as a back of house (BOH), stockroom, inventory area, warehouse, and/or the like, may be used to store inventory that is available for the customer to try on and/or purchase. In some embodiments, the back of house area is in the same building, but in some embodiments the back of house area may be located off-site and/or serve more than one retail store. In some embodiments, the samples on display in the showroom that the customer can browse are only a subset of the items actually available for sale/try-on.

Additional Retail Concierge System Embodiment

Figure 2C:
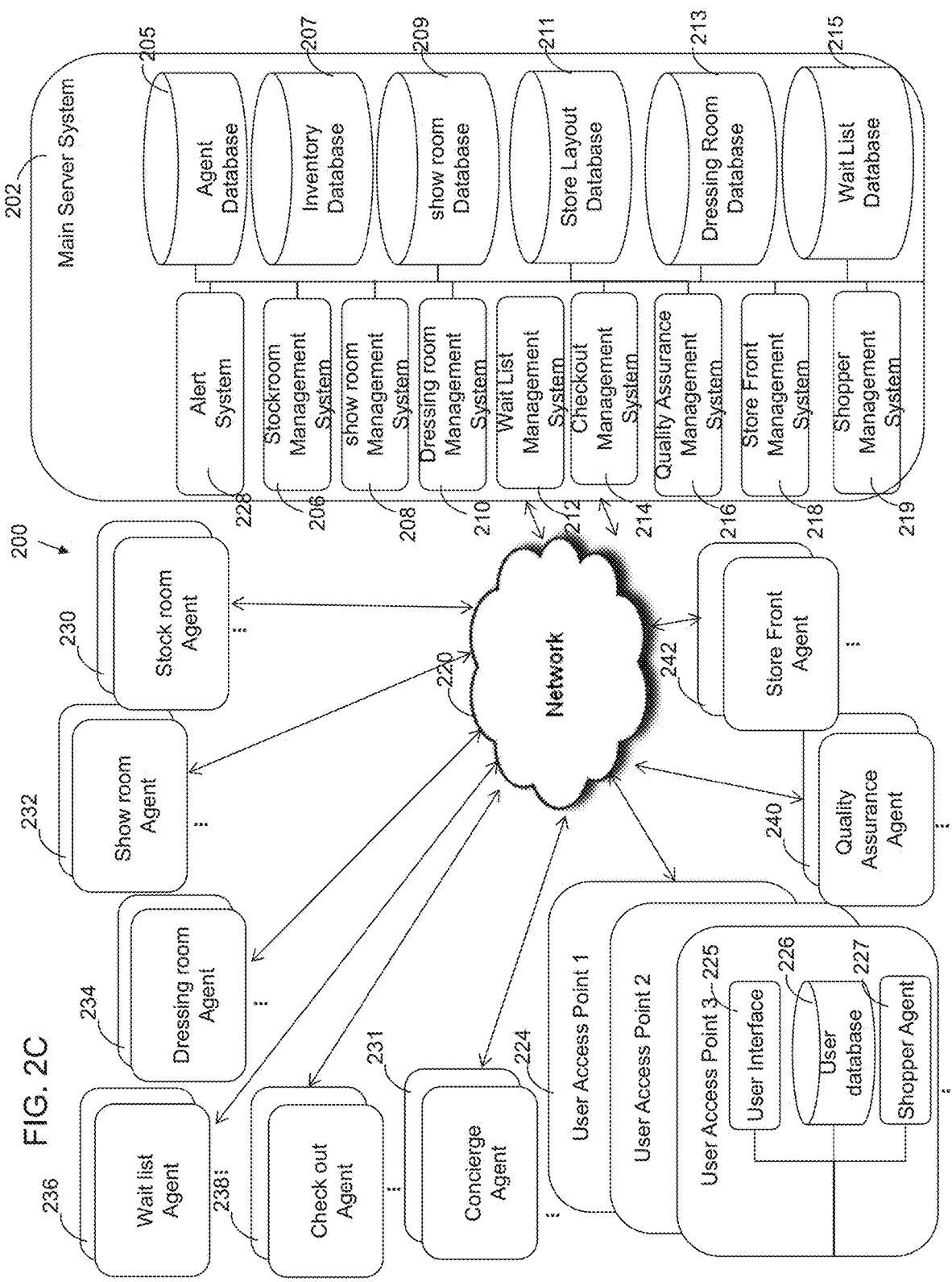
FIG. 2C is a block diagram illustrating another example embodiment of a retail concierge system.

FIG. 2C is a block diagram illustrating another embodiment of a retail concierge system 200. This embodiment is similar to the embodiment illustrated in FIG. 1B, with some differences. For example, the retail concierge system 200 comprises additional optional agents that are not shown in FIG. 1B, but that could be used with the embodiment shown in FIG. 1B. Any of the items called out as an agent in the retail concierge system 200 may also be referred to as a user access point system and comprise various components to enable a user to interact with the agent via a graphical user interface. Further, the main server system 202 illustrates additional subsystems and databases as compared to the central server 102 of FIG. 1B. This is one example of how the main server or central server may be configured, and any of these subsystems may be combined and/or any of these databases may be combined. Further, some embodiments may not comprise each of the databases and/or subsystems shown in the main server system 202.

In some embodiments, a main server system 202 can comprise a stockroom management system 206, a show room management system 208, a dressing room management system 210, a waiting list management system 212, a checkout management system 214, a quality assurance management system 216, a storefront management system 218, a shopper management system 219, an alert system 228, and/or the like. The main server system can be connected to a network 220. The network can be configured to connect the main server to a user access point 224, a storefront agent 242, a quality assurance agent 240, a checkout agent 238, a waitlist agent 236, a dressing room agent 235, a show room agent 232, a stock room agent 230, a concierge agent 231, and/or the like. In some embodiments, the systems described herein can refer to logical modules and/or software modules that may be combined with other modules or divided into sub-modules despite their physical organization or storage. Each of the processes, methods, and algorithms associated with the system may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

In some embodiments, the main server system 202 can be configured to identify, deploy, configure, communicate, disable, enable, and otherwise control a user access point 224, a storefront agent 242, a quality assurance agent 240, a checkout agent 238, a waitlist agent 236, a dressing room agent 235, a show room agent 232, a stock room agent 230, and/or the like. Each of these agents can also comprise a user interface, database, etc., although for simplicity, only the user access points 224 are explicitly shown comprising such features in the figure. These agents and/or user access point systems can be configured to communicate with the main server system 202 over the network 220, such as via API requests, HTTP requests, and/or the like, to implement the various functions and techniques disclosed herein.

In some embodiments, at least a portion of the processes of the main server system 202 can be offloaded to a user access point 224, a storefront agent 242, a quality assurance agent 240, a checkout agent 238, a waitlist agent 236, a dressing room agent 235, a show room agent 232, a stock room agent 230, and/or the like. In some embodiments, the agent can be configured to process and/or store computations, results, and input of the main server system and vice versa. In some embodiments, offloading certain processing to a user access point 224, a storefront agent 242, a quality assurance agent 240, a checkout agent 238, a waitlist agent 236, a dressing room agent 235, a show room agent 232, a stock room agent 230, and the like can reduce network traffic to the main server system and/or speed up response of a user access point 224, a storefront agent 242, a quality assurance agent 240, a checkout agent 238, a waitlist agent 236, a dressing room agent 235, a show room agent 232, a stock room agent 230, a concierge agent 231, and the like.

In some embodiments, the stockroom management system 206 can communicate with an inventory database 207 and/or a stockroom agent 230. The stockroom management system 206 can initiate transfer of articles of clothing by a stockroom agent 230. The stockroom management system 206 can be configured to initiate a check of inventory in a stockroom. The stockroom management system 206 can determine access restrictions of dressing rooms for stockroom agents 230. The stockroom management system 206 can transport articles of clothing to and from quality assurance rooms.

In some embodiments, the show room management system 206 can communicate with the show room database 209 to identify store size, map of store, location of certain articles of clothing in the show room, inventory of show room, and the like. In some embodiments, the show room management system 206 can locate a consumer and send the location to the show room agent 232. In some embodiments, the show room management system 206 can identify articles of clothing that are associated with a user profile and/or check for availability in the show room area. In some embodiments, the show room management system 206 can initiate a show room agent 232 to help a consumer.

In some embodiments, the dressing room management system 210 can communicate with the store layout database 211 and dressing room database 213. The dressing room management system 210 can identify the location of the dressing rooms via the store layout database 211. The dressing room management system 210 can identify status of all dressing rooms and/or users associated with each dressing room. The dressing room management system 210 can identify which articles of clothing are currently in a dressing room and/or future articles of clothing for a particular dressing room.

In some embodiments, the wait list management system 212 can communicate with a wait list database 215. The wait list management system 212 can be configured to identify current consumers in a wait list. The wait list management system 212 can place consumers onto the waitlist. The wait list management system 212 can communicate with the dressing room agent 234 to assign a particular consumer to a dressing room.

In some embodiments, the checkout management system 214 is configured to perform the checkout process for a consumer. The checkout management system 214 can receive payment information, promotional information, apply discounts, and perform a transaction for an article of clothing. The checkout management system 214 can perform returns and issue refunds and/or store credits.

In some embodiments, the quality assurance management system 216 is configured to communicate with a quality assurance agent 240 to repair articles of clothing. In some embodiments, the quality assurance management system 216 can communicate with a stockroom agent 230 to know when an article of clothing is on its way for repair and/or tailoring. In some embodiments, the quality assurance management system 216 can communicate with a dressing room agent 234 to notify a consumer that a repaired article of clothing is on its way.

In some embodiments, the store front management system 218 is configured to identify the location of a consumer and/or display an advertisement for a consumer when the consumer is approaching the store. In some embodiments, the storefront management system 218 can generate and transmit a customized advertisement to the storefront agent 242 to display.

In some embodiments, the shopper management system 219 is configured to communicate with a shopper agent on the user access point 224 to display available options to the consumer. In some embodiments, the shopper management system 219 can allow the user to select a dressing room, select an article of clothing, request for help, check out and pay for an article of clothing, send consumer location data to the main server system 200, and the like. The user access point system 224 can comprise a user interface 225, a user database 226, and a shopper agent 227.

In some embodiments, the alert system 228 is configured to send alerts. In some embodiments, the alerts can be sent to a consumer. For example, an alert can notify the consumer that too many products are requested by the user. In some embodiments, an alert can be sent to a shopper agent to indicate to the consumer that the wardrobe is open for too long. An alert can be sent to a shopper agent to alert the consumer that a wardrobe and/or a dressing room is ready for the consumer. Alerts can be sent to other agents. For example, an alert can be sent to a back of house agent if the back of the dressing room is open and/or to a dressing room agent if the dressing room door is open. The alert can comprise a text, a sound, a video and the like. For example, the alert can comprise a "knock knock" sound in the dressing room.

Computing System

Figure 3:
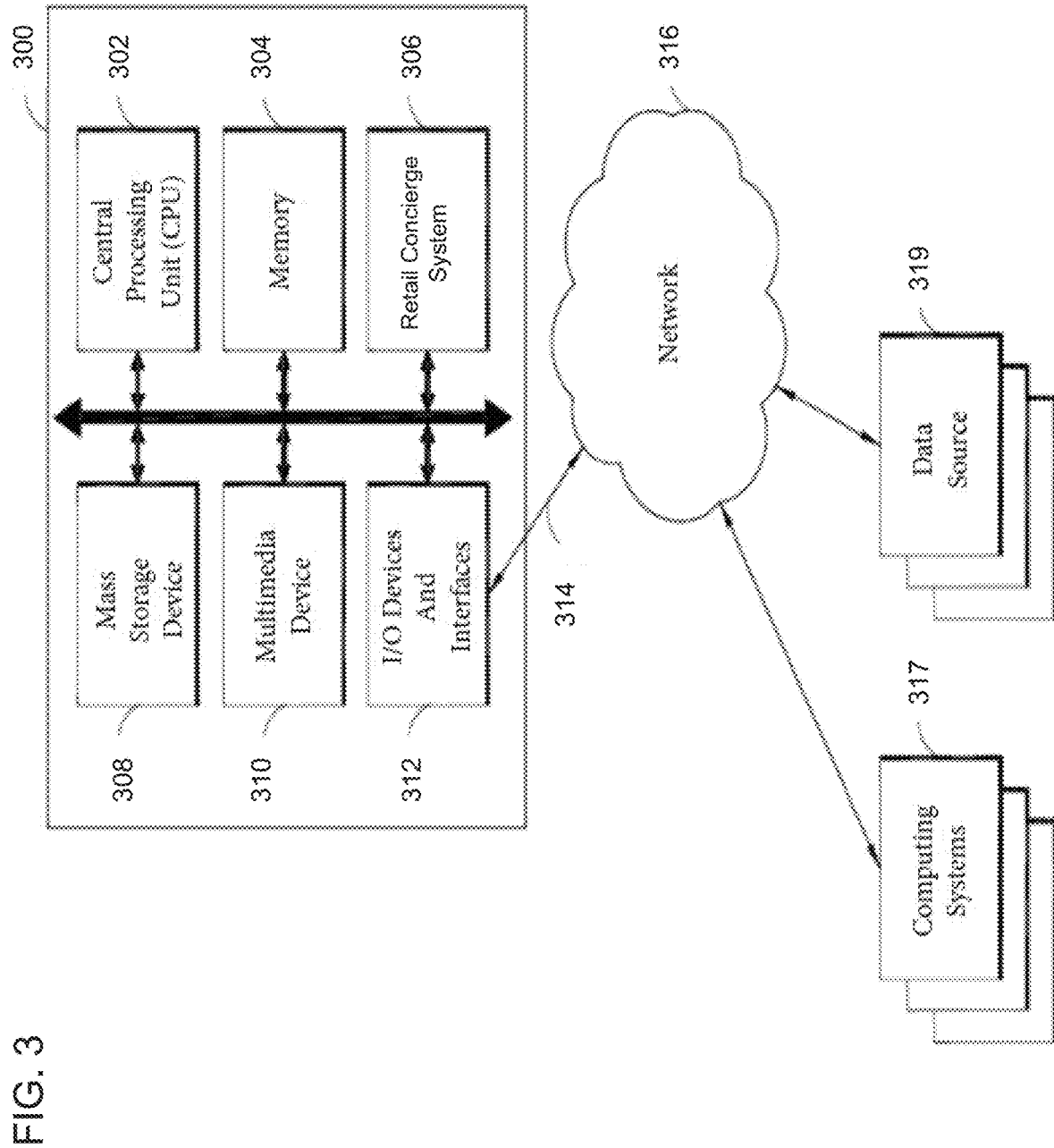
FIG. 3 is a block diagram illustrating a computer hardware system configured to run software for implementing one or more embodiments of a retail concierge system according to some embodiments.

FIG. 3 is a block diagram depicting an embodiment of a computer hardware system configured to run software for implementing one or more embodiments of the systems described herein.

In some embodiments, the computer clients and/or servers described above take the form of a computing system 300 illustrated in FIG. 3, which is a block diagram of one embodiment of a computing system that is in communication with one or more computing systems 317 and/or one or more data sources 319 via one or more networks 316. The computing system 300 may be used to implement one or more of the systems and methods described herein. In addition, in one embodiment, the computing system 300 may be configured to manage access or administer a software application. While FIG. 3 illustrates one embodiment of a computing system 300, it is recognized that the functionality provided for in the components and modules of computing system 300 may be combined into fewer components and modules or further separated into additional components and modules.

Retail Experience and Inventory Management System Module

In one embodiment, the computing system 300 comprises a retail experience and inventory management system module 306 that carries out the functions described herein, including any one of techniques described above. The retail experience and inventory management system module 306 and/or other modules may be executed on the computing system 300 by a central processing unit 302 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In one embodiment, the computing system 300 also comprises a mainframe computer suitable for controlling and/or communicating with large databases, performing high volume transaction processing, and generating reports from large databases. The computing system 300 also comprises a central processing unit ("CPU") 302, which may comprise a conventional microprocessor. The computing system 300 further comprises a memory 304, such as random access memory ("RAM") for temporary storage of information and/or a read only memory ("ROM") for permanent storage of information, and a mass storage device 308, such as a hard drive, diskette, or optical media storage device. Typically, the modules of the computing system 300 are connected to the computer using a standards based bus system. In different embodiments, the standards based bus system could be Peripheral Component Interconnect (PCI), Microchannel, SCSI, Industrial Standard Architecture (ISA) and Extended ISA (EISA) architectures, for example.

The computing system 300 comprises one or more commonly available input/output (I/O) devices and interfaces 312, such as a keyboard, mouse, touchpad, and printer. In one embodiment, the I/O devices and interfaces 312 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 312 comprise a microphone and/or motion sensor that allow a user to generate input to the computing system 300 using sounds, voice, motion, gestures, or the like. In the embodiment of FIG. 1, the I/O devices and interfaces 312 also provide a communications interface to various external devices. The computing system 300 may also comprise one or more multimedia devices 310, such as speakers, video cards, graphics accelerators, and microphones, for example.

Computing System Device/Operating System

The computing system 300 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 300 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 300 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 3, the computing system 300 is coupled to a network 316, such as a LAN, WAN, or the Internet, for example, via a wired, wireless, or combination of wired and wireless, communication link 314. The network 316 communicates with various computing devices and/or other electronic devices via wired or wireless communication links. In the embodiment of FIG. 3, the network 316 is communicating with one or more computing systems 317 and/or one or more data sources 319.

Access to the retail experience and inventory management system module 306 of the computer system 300 by computing systems 317 and/or by data sources 319 may be through a web-enabled user access point such as the computing systems' 317 or data source's 319 personal computer, cellular phone, smartphone, laptop, tablet computer, e-reader device, audio player, or other device capable of connecting to the network 316. Such a device may have a browser module that is implemented as a module that uses text, graphics, audio, video, and other media to present data and to allow interaction with data via the network 316.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 312 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 300 may comprise a physical or logical connection established between a remote microprocessor and a mainframe host computer for the express purpose of uploading, downloading, or viewing interactive data and databases online in real time. The remote microprocessor may be operated by an entity operating the computer system 300, including the client server systems or the main server system, an/or may be operated by one or more of the data sources 319 and/or one or more of the computing systems 317. In some embodiments, terminal emulation software may be used on the microprocessor for participating in the micro-mainframe link.

In some embodiments, computing systems 317 who are internal to an entity operating the computer system 300 may access the retail experience and inventory management system module 306 internally as an application or process run by the CPU 302.

URLs and Cookies

In some embodiments, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Doman Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the consumer. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

Other Systems

In addition to the systems that are illustrated in FIG. 3, the network 116 may communicate with other data sources or other computing devices. The computing system 300 may also comprise one or more internal and/or external data sources. In some embodiments, one or more of the data repositories and the data sources may be implemented using a relational database, such as DB2, Sybase, Oracle, Code-Base and Microsoft® SQL Server as well as other types of databases such as, for example, a flat file database, an entity-relationship database, and object-oriented database, and/or a record-based database.

Example Flowchart for Retail Concierge System

Figure 4:
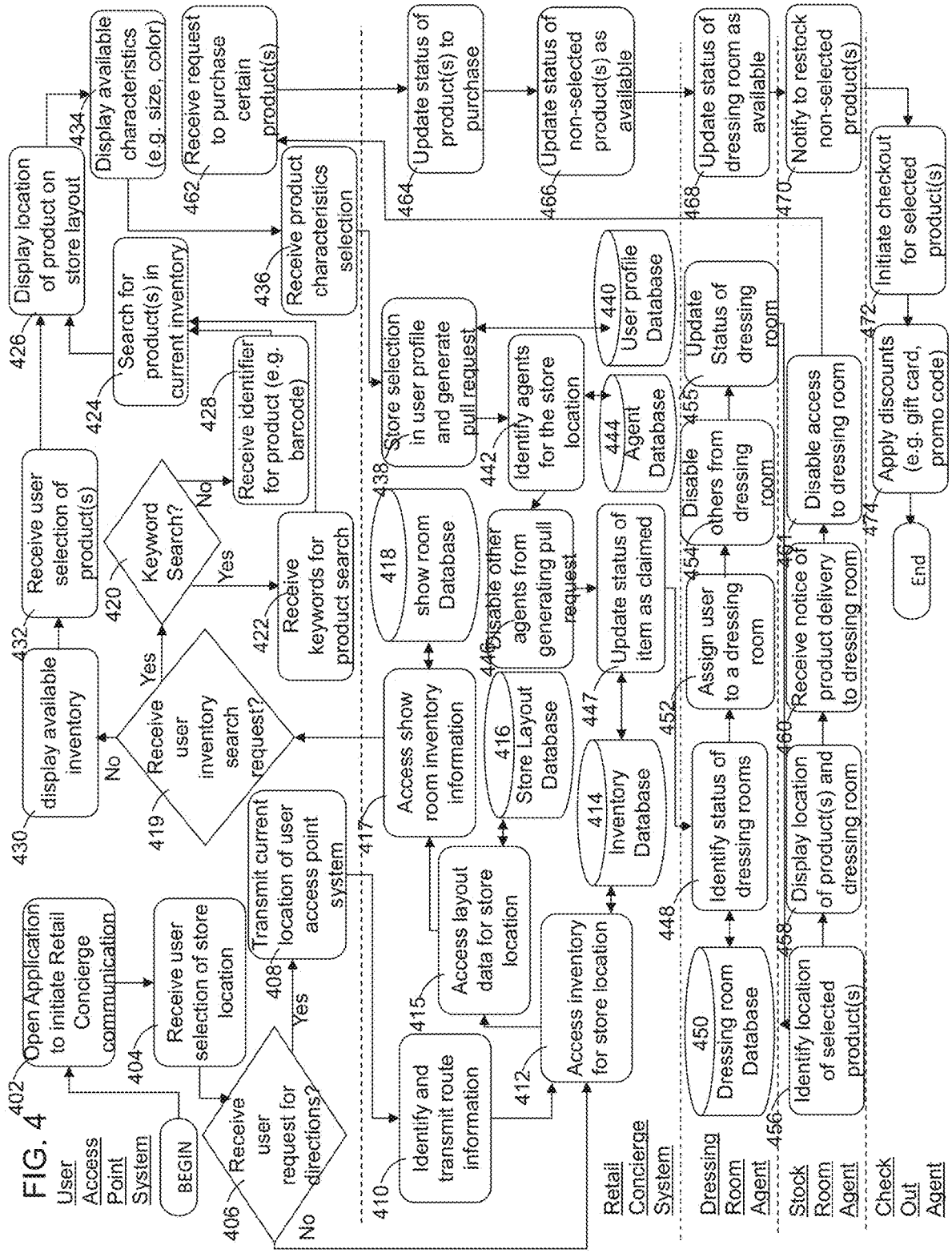
FIG. 4 is a flow diagram illustrating a retail concierge system comprising various agents according to some embodiments.

In some embodiments, a retail concierge system is configured to communicate with a dressing room agent, a stock room agent, a checkout agent, a shopper agent, and/or other user access point systems. FIG. 4 is another embodiment of a flow diagram illustrating an example process performed by a retail concierge system comprising various agents according to some embodiments, such as the retail concierge system 200 of FIG. 2C. It should be noted that the flow diagram of FIG. 4 is only one example, and includes a variety of features that are optional and not required in some embodiments (including, but not limited to blocks 402, 404, 406, 408, 410, 412, 415, 417, 426, 474, and other blocks).

At block 402, the user access point system can open an application to initiate the retail concierge communication. The application can be a mobile phone application, a computer program, a process integrated with the operating system, and the like. In some embodiments, the user access point system can communicate with the retail concierge without having to open an application.

At block 404, the user access point system can receive a user selection of a store location. For example, the user access point system can display several store locations, and the employee can select out of the list. The user access point system can identify store locations that are close to the current location of the user access point system. The processes of the user access point system can be performed by the stockroom agent, concierge agent, and/or other agent.

At block 406, the user access point system can request whether to display directions to the store location. If at block 406, the user access point system can receive a request for directions, at block 408, the user access point system can transmit current location data for the user access point system and transmit the current location to the retail concierge system. At block 410, the retail concierge system can identify and transmit route information from the current location of the retail concierge system to the selected store location. At block 412, the retail concierge system can access inventory for the store location.

At block 406, if the user access point system does not receive a user request for directions, the retail concierge system can access inventory for the selected store location.

At block 412, the retail concierge identifies inventory by accessing an inventory database 414. The inventory data can comprise data on inventory type, size, quantity, availability, name, identifier, and the like.

At block 415, the retail concierge system can access layout data for the store location by accessing the store layout database 416. The store layout information can comprise the location of certain rooms such as the show room, dressing rooms, stock room, quality assurance room, and/or the checkout room. The store layout information can comprise quantity and size of the rooms, such as four medium dressing rooms and 2 small dressing rooms.

At block 417, the retail concierge system can access show room inventory information by accessing the show room database 418. The show room database can comprise information on inventory in the staging room, the show room, or other rooms.

At block 419, the user access point system can determine whether it received a user inventory search request. If yes, the user access point system can determine whether a keyword search was requested at block 422. If so, then the user access point system can receive keywords for a product search. At block 424, the user access point system can be configured to access a third party search engine to search for the products in its current inventory.

At block 420, if a keyword search request was not received, the user access point system can receive an identifier for the product. The user access point system can receive an identifier such as a barcode, a QR code, an alphanumeric code, and the like. At block 424, the user access point system can search for the product in its current inventory using the identifiers.

At block 419, if the user access point system does not receive a user inventory search request, at block 430, the user access point system can display available inventory to allow a user to view and select inventory. At block 432, the user access point system can receive a user selection for a product out of the list of displayed inventory items.

At block 426, the user access point system can display the location of the product and/or provide a route to the location of the product. The user access point system can display a store layout from the layout data accessed by the retail concierge system.

At block 434, the user access point system can display available characteristics for the selected inventory item, such as various size, colors, styles, form, related items, recommended items such as matching items, similar items from different brands, and the like.

At block 436, the user access point system can receive product characteristic selection from the user. The user access point system can retrieve default values for a user. In some embodiments, the default values are tied to a user profile, such as a particular size for t-shirts. In some embodiments, the system can filter the available inventory based on information associated with a user profile.

At block 438, the retail concierge system can store the user selection into a user profile database 440 and cause generation of a pull request for the back of house employee. At block 442, the retail concierge system can identify agents for the store location via an agent database 444, such as a storefront agent 242, a quality assurance agent 240, a checkout agent 238, a waitlist agent 236, a dressing room agent 235, a show room agent 232, a stock room agent 230, and the like.

At block 446, the retail concierge system can disable other agents from causing generation of a pull request for the selected inventory item, and at block 447, the retail concierge system can update the status of selected products as claimed in the inventory database 414.

At block 448, the dressing room agent can identify the status of the dressing rooms by accessing a dressing room database 450. The dressing room agent can assign a user to the dressing room at block 452. At block 454, a dressing room agent can disable other dressing room agents from assigning the dressing room to other consumers. At block 455, the dressing room agent can update the status of the dressing room in the dressing room database 450 as reserved.

At block 456, the stock room agent can identify the location of the selected product. At block 458, the stockroom agent can display the location of the product and the dressing room for delivery. At block 460, the stockroom agent can receive a notification of product delivery to the dressing room. In some embodiments, the stockroom agent can automatically pick up and drop off the product at the dressing room. At block 458, the stockroom agent can receive access the dressing room. Upon delivery of the product, the stockroom agent can be disabled access to the dressing room.

At block 462, the user can request to purchase one or more products. At block 464, the retail concierge system can update the status of the product as purchased and/or to be purchased. At block 406, the retail concierge system can update the status of non-selected products as available or soon to be available.

At block 468, the dressing room agent can update the status of the dressing room as available in the dressing room database 450.

At block 470, the stockroom agent can initiate restocking of the non-selected product. In some embodiments, the stockroom agent sends the non-selected inventory items for QA before restocking in the stockroom and/or in the show room.

At block 472, the checkout agent can initiate checkout for the selected product. At block 474, the checkout agent can apply discounts, such as a gif card and/or a promo code.

Example Flowchart for Dressing Room Reservation

Figure 5:
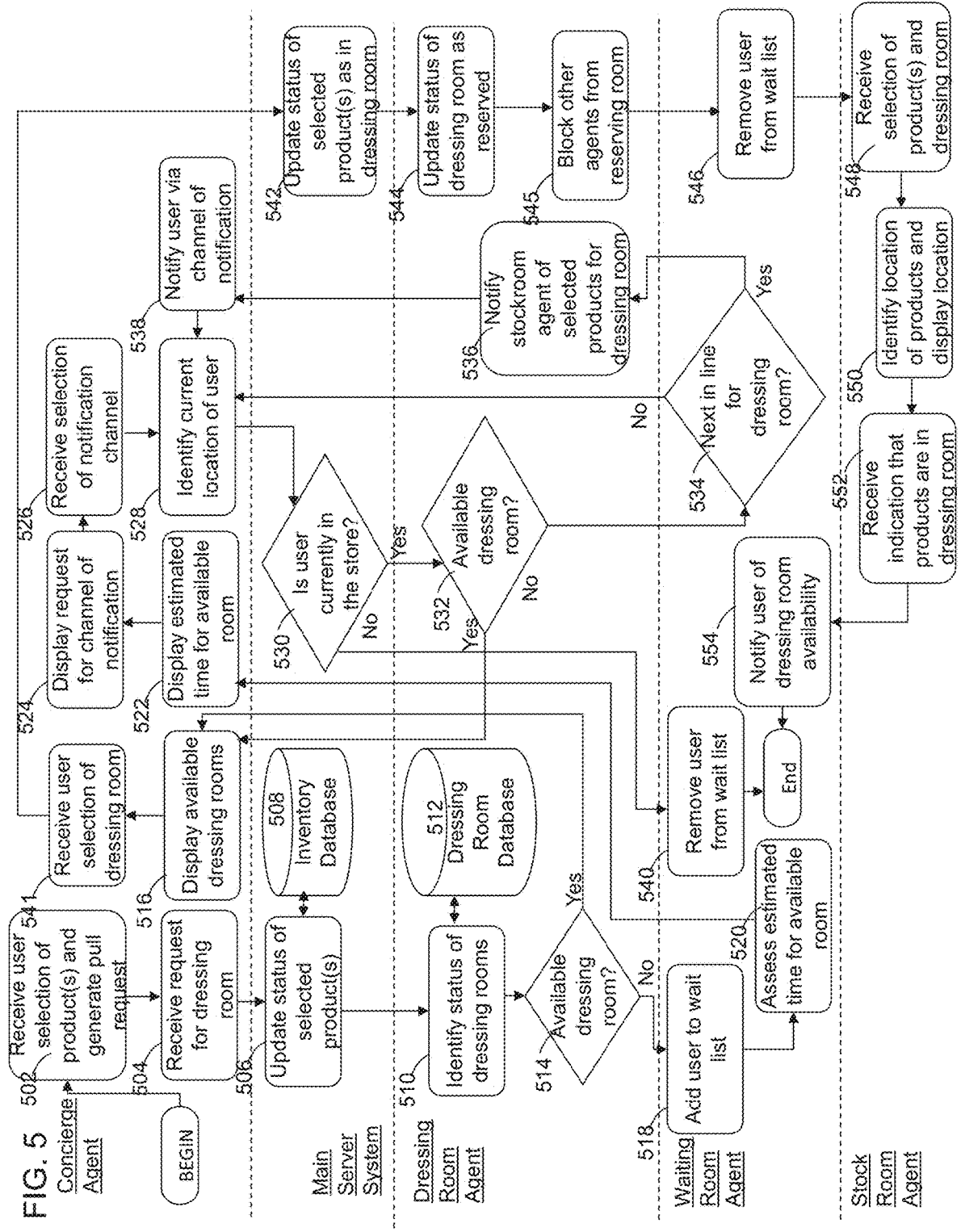
FIG. 5 is a flow chart of a retail concierge system for dressing room reservation according to some embodiments.

In some embodiments, a retail concierge system communicates with various user access point systems to reserve a dressing room for the consumer. FIG. 5 is an example embodiment of a flow chart of a retail concierge system for dressing room reservation. This example process flow is merely one example, and dressing room reservation may be performed different ways in other embodiments (and some systems may not include dressing room reservation functionality). Further, although this process flow illustrates specific user access point systems (e.g., concierge agent, dressing room agent, waiting list agent, and stock room agent) as performing specific functions, this is merely one example, and various functions may be performed by other user access point systems, such as a different agent illustrated in this figure and/or a showroom system, a user system, a central server, and/or the like. The process flow described herein may be performed by, for example, the system 200 illustrated in FIG. 2C.

At block 502, the concierge agent can receive a user selection of one or more products and cause generation of a pull request. In this embodiment, the concierge agent is being used to assist a customer in selecting items. In other embodiments, however, some or all of these functions shown as being performed by the concierge agent could be performed by a showroom agent, a user agent, and/or the like. At block 504, the concierge agent can receive a request for a dressing room and/or an indication that the user has completed selection of the inventory. In some embodiments, the shopper agent, the dressing room agent, the showroom agent, and/or other agents can initiate an API call for trying on items that can initiate a procedure to assign a dressing room for the user and/or create pull requests for stockroom agents to transport desired hangers, or articles of clothing.

At block 506, the main server system can be configured to update the status of the selected products at the inventory database 508. The main server system can update the status of the selected products as temporarily unavailable, indicating that the item may become available at a later time.

At block 510, the dressing room agent can identify the status of dressing rooms by accessing a dressing room database 512. The dressing room agent can determine whether there is a dressing room available at block 514.

If there is a dressing room available 514, then at block 516, the concierge agent can display available dressing rooms for user selection. At block 541, the concierge agent can receive user selection of the dressing room. In some embodiments, the dressing room agent can automatically select and/or assign a dressing room for the consumer.

At block 514, if a dressing room is unavailable, the waiting list agent can add the user to a wait list at block 518.

At block 520, the waiting list agent can estimate the amount of time remaining for an available dressing room. The waiting list agent can transmit this estimated time to the concierge agent to be displayed at block 522. In some embodiments, the waiting list agent can estimate and transmit the time before the customer requests a dressing room (such as while shopping and/or upon arrival of the store).

At block 526, the concierge agent can receive a selection of a notification channel. For example, the concierge agent can request the user to select from several channels for notification for dressing room status, such as a text message, a phone call, and/or a message on the shopper agent.

At block 528, the concierge agent can identify the current location of the user. At block 530, if the user is still in the store, then at block 532, the dressing room agent can check whether a dressing room is available again. If so, then at block 516, the available dressing rooms can be displayed at the concierge agent.

If there are no available dressing rooms, then the waiting list agent can check whether the consumer is next in line for a dressing room at block 534. If so, then the dressing room agent can notify the stock room agent of the selected products for the dressing room at block 536. At block 538, the concierge agent (or main server system) can notify the user via the channel of notification selected at block 524. At block 528, the concierge agent can check again the current location of the user.

If the user is not in the store at block 530, then the user can be removed from the waitlist at block 540.

At block 542, the retail concierge system can update the status of the selected products as located in a particular dressing room. At block 544, the dressing room agent can update the status of the dressing room as reserved and at block 545 denies reservation of the dressing room from other dressing room agents. At block 546, the waiting room agent can remove the user from the wait list.

At block 548, the stock room agent can receive the selection of products and the assigned dressing room. At block 550, the stock room agent can identify the location of the products and display that location. The stock room agent can receive an indication that the products are delivered to the dressing room. In some embodiments, the stock room agent can automatically retrieve the products and transport the products to the dressing room. At block 554, the waiting room agent can notify the user of the dressing room availability.

Example Flowchart for Dressing Room Functionality

Figure 6:
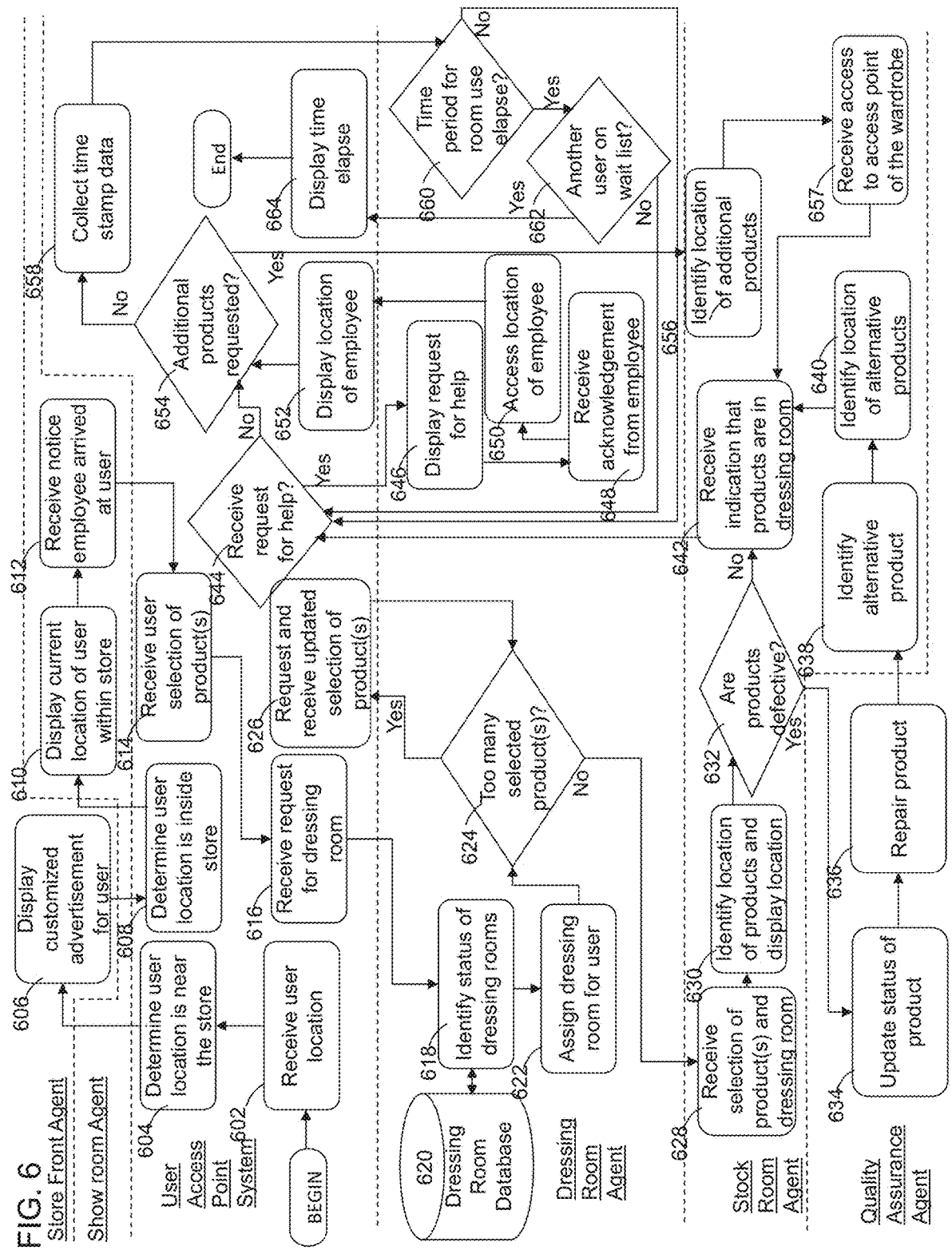
FIG. 6 is a flow chart of a retail concierge system for dressing room functionality according to some embodiments.

In some embodiments, a retail concierge system communicates with various user access point systems to enable various dressing room functionalities. FIG. 6 is an example embodiment of a flow chart of a retail concierge system for dressing room functionality. This example process flow is merely one example, and dressing room functionality may be performed different ways in other embodiments (and some systems may not include one or more of the features disclosed herein). Further, although this process flow illustrates specific user access point systems (e.g., store front agent, showroom agent, user access point system or shopper agent, dressing room agent, stock room agent, and quality assurance agent) as performing specific functions, this is merely one example, and various functions may be performed by other user access point systems, such as a different agent illustrated in this figure, other user access point systems, and/or a central server system. The process flow described herein may be performed by, for example, the system 200 illustrated in FIG. 2C

At block 602, the user access point system can receive a user location. At block 604, the user access point can determine that the user location is near the store and/or moving towards the store. At block 606, a store front agent can receive notification that the user is approaching the store. The store front agent can retrieve information regarding the user and display a customized advertisement to the user. For example, the store front display can display items on a user wish list.

At block 608, the user access point system can determine that the user is located inside of the store. At block 610, the show room agent, concierge agent, and/or the like can display the current location of the user within the store to enable an employee to find the consumer. The show room agent can receive notification that the employee arrived at the user at block 612.

At block 614, the user access point system can receive a user selection of products for the session.

At block 616, the user can request a dressing room. At block 618, the dressing room agent can identify the status of the dressing rooms by accessing the dressing room database 620. The dressing room agent can assign a dressing room for a user at block 622.

At block 624, the dressing room agent or other system can determine if too many products were selected for the session. If so, the user access point system can request a smaller selection of products and update the selection of products.

If the dressing room agent determines there are not too many products selected for the dressing room, at block 628, the stock room agent can retrieve the selected products and identify the assigned dressing room. At block 630, the stock room agent can identify the location of the products and display the location.

At block 632, the stock room agent can determine whether the products are defective. If so, then at block 634, the status of the product is marked as defective and at block 636, the quality assurance agent can initiate a repair on the product. At block 638, the stock room agent can identify an alternative product, and at block 640 can identify the location of the alternative products. At block 642, the stock room agent can receive an indication that the products are in the dressing room.

At block 632, if the products are not defective, at block 642, the stock room agent can wait to receive an indication that the products are in the dressing room. At block 642, the stock room agent can automatically move the products to the dressing room and provide an indication that the task is complete.

At block 644, the user access point system can receive a request for help while the consumer is in the dressing room. For example, the user can request a different sized product or a different color. At block 646 if a request for help was received, the dressing room agent can display the request for help and receive acknowledgement from an employee that the help is coming. At block 650, the location of the employee can be accessed, and at block 652, the location of the employee can be displayed on the user access point system.

At block 654, the user access point system can determine whether additional or different products are requested as a result of the help request. At block 644 if a request for help is not received, at block 654, the user access point system can determine whether additional or different products are requested as a result of the help request.

At block 656, if a request for additional products is requested, the stock room agent can identify the location of the additional products, at block 657 the stock room agent can be allowed access to the access point of the wardrobe, and at block 642, the stock room agent can receive an indication that the products are in the dressing room.

At block 654 if additional products are not requested, the user access point system can collect time stamp data at block 658.

At block 660, the dressing room agent can determine whether a time period for the room use has elapsed. If so, then the dressing room agent can determine whether another user is waiting for a dressing room on the wait list at block 622. If yes, then the user access point system can display that the time has elapsed at block 644. If no users are on the wait list, then the user access point system can determine whether the user requested for help at block 644. If the time period has not elapsed for the room use, the user access point system can determine whether the user requested for help at block 644.

Figure 7:
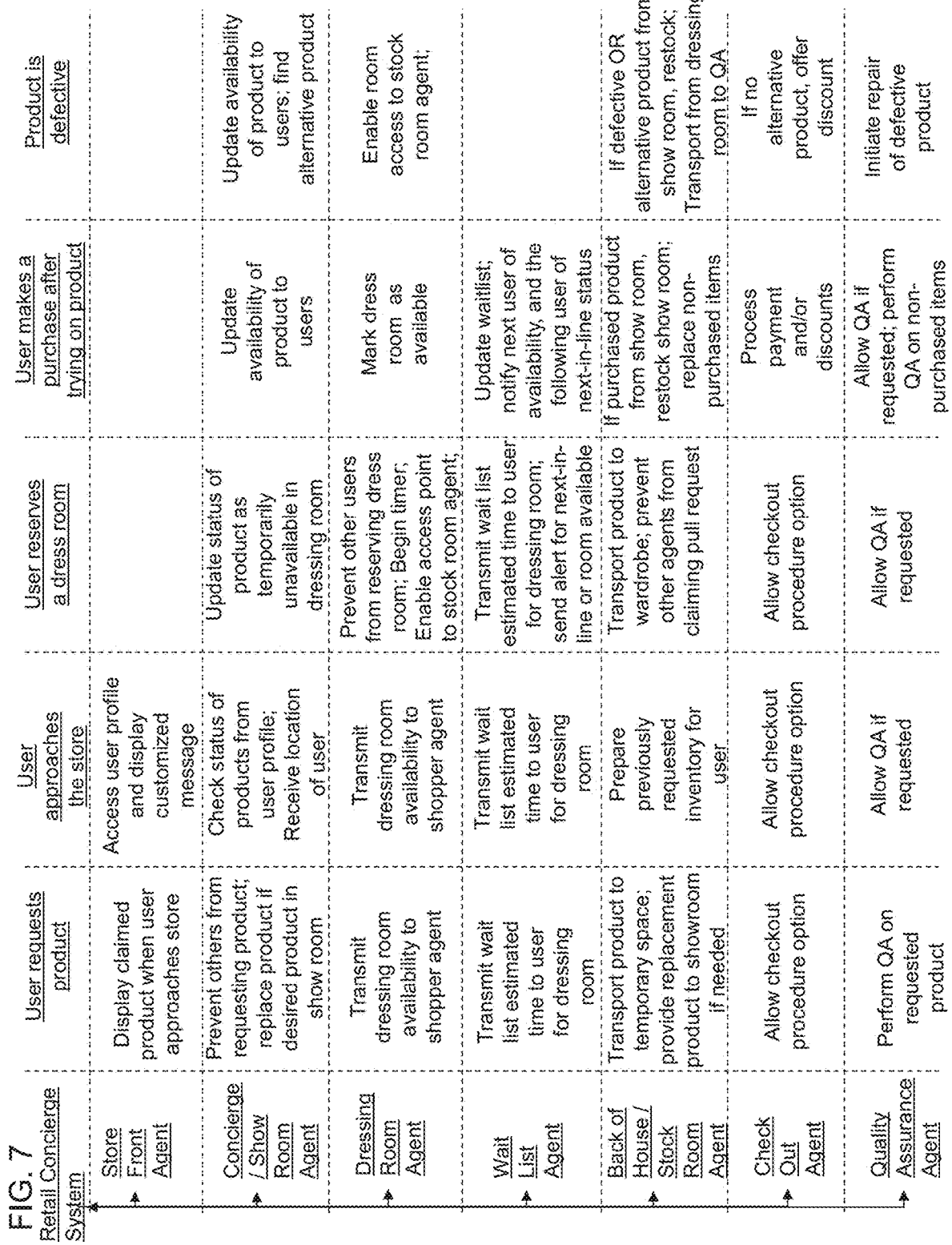
FIG. 7 is a table illustrating agent action in response to a user request according to some embodiments.

Table Illustrating Agent and/or Central Server Actions in Response to User Actions In some embodiments, a retail concierge system can initiate and/or block actions among or by the various user access point systems, such as the dressing room agent, the back of house and/or the stock room agent, the quality assurance agent, the wait list agent, the checkout agent, the show room and/or the concierge agent, and/or the store front agent. By dynamically enabling and/or blocking actions being performable by one or more user access point systems, the central server can enhance the experience and efficiency of a shopping experience. FIG. 7 is a table illustrating examples of user access point systems being dynamically allowed to perform certain actions and/or blocked from performing certain actions in response to a user request or action according to some embodiments. The actions illustrated in this table may be performed by, for example, the systems illustrated in FIG. 1B or 2C.

In some embodiments, a user can access a user access point system that is local to the store (such as a showroom system) or remote from the store (such as the user's smartphone or the like). The consumer can view inventory and request a product to be purchased, to try on at a later time, to be on hold, for pick up in store, for delivery, and/or the like. An optional store front agent can identify the requested product and/or generate an advertisement for the user as the user approaches the store. A show room agent, a shopper agent, and/or the central server of the retail concierge system can prevent other show room agents or shopper agents from requesting the product. If that is the only type of product in the showroom (such as size or color), the show room agent can initiate action (e.g., a pull request) to place the requested product on the side and replace the product with a similar item from the stock room. The dressing room agent (or other system) can identify whether the user wants to try on the item soon and can allow a shopper agent (or other system) to display and select available dressing rooms. If the dressing rooms are all unavailable, the wait list agent (or other system) can transmit a wait list estimated time to the user for the dressing room. The stock room agent can claim a pull request to initiate transportation of the requested product to a temporary space. The checkout agent (or other system) can allow the shopper agent (or other system) to proceed with a checkout procedure if the consumer desires to purchase the product from home (or locally in the retail establishment). The quality assurance agent (or other system) can coordinate performance of quality assurance on the requested product to see if a repair needs to be done before the consumer tries on the product and/or purchases the product. In some embodiments, the stock room agent and/or the quality assurance agent can receive a list of inventory items that need QA via an API call. In some embodiments, the retail concierge system can push the list of inventory items to the stock room agents and/or the quality assurance agents.

In some embodiments, a user can approach the store. The optional store front agent (or other system) can access a user profile and display a customized advertisement. The show room agent (or other system) can access the user profile and check the status of desired items in the show room. If the items are not in the show room, then the show room agent (or other system) can send a message to the stock room agent (or other system) to prepare such inventory. The show room agent (or other system) can receive a current location of the consumer such that the show room agent (or other system) can provide customer care to the user. The dressing room agent (or other system) can identify available dressing rooms and send to the shopper agent (or other system) for display and selection. The waitlist agent (or other system) can transmit an estimated wait time to the user for a dressing room if all of the dressing rooms are unavailable. The checkout agent (or other system) can allow a checkout procedure option for the user. The checkout agent (or other system) can allow the checkout procedure if the user selects products by hand, by the shopper agent, in the dressing room, and/or a combination. In some embodiments, the dressing room agent can initiate a checkout procedure via an API call with the checkout agent and/or the retail concierge system. The quality assurance agent (or other system) can allow quality assurance, such as repairs or tailoring, if requested by the consumer.

In some embodiments, a user can reserve a dressing room. The show room agent (or other system) can update the status of the products in the dressing room as temporarily unavailable, which can indicate that the product may become available later on. The dressing room agent (or other system) can prevent other users from reserving the dressing room. The dressing room agent (or other system) can begin a timer to alert the consumer if the consumer uses the dressing room beyond a specified period of time. If there are no dressing rooms available, the wait list agent (or other system) can place the user on a wait list and transmit estimated times for the user to reserve a dressing room. The wait list agent (or other system) can send an alert if the consumer is next-in-line for a dressing room or if there is a dressing room available. The stock room agent (or other system) can claim a pull request to initiate transportation of the product to the dressing room. The stock room agent (or other system) can receive access to the dressing room. The stock room agent (or other system) can prevent other stock room agents from claiming a pull on the product. The checkout agent (or other system) can allow a checkout procedure option from the dressing room. The user can request quality assurance to come and repair and/or tailor a particular piece of clothing.

In some embodiments, the dressing room agent can display functionality for a consumer while in the dressing room. For example, the dressing room can comprise an option to call for help, request a different size, request a different color, request a different brand, request a different variant, request a duplicate of the same article of clothing, provide information on the retail store, provide checkout procedures, and the like.

In some embodiments, a user can make a purchase after trying on a product. The show room agent (or other system) can update the availability of the product as permanently unavailable, update the quantity count, mark as likely unavailable or in-purchase, or the like. The dressing room agent (or other system) can mark the dressing room as available or soon-to-be available. The wait list agent (or other system) can update the wait list, notify the next consumer in the wait list of the availability of the dressing room, and/or send an alert to the next-in-line consumer to be ready for a dressing room. The stock room agent (or other system) can restock the stock room and/or the show room of the unpurchased item. If a purchased item was taken from the showroom, the stock room agent (or other system) can replace the item in the show room. The checkout agent (or other system) can process the checkout procedure, such as receiving payment information, receipt information, discounts, e-gift cards, promo codes, and the like. The quality assurance agent (or other system) can perform quality assurance on the to-be-purchased products before checkout. The quality assurance agent (or other system) can perform quality assurance on non-purchased items that can be restocked into the show room or the stock room.

In some embodiments, the store can comprise a show room, a dressing room, a stock room, a quality assurance room, a checkout counter, a lounge, a packing station, a toilet room, and the like. In some embodiments, an agent can be assigned to each room to perform certain actions. For example, the lounge can comprise an agent that has a subset of functions for the show room agent.

In some embodiments, a user can notify the shopper agent and/or other agent that the product is defective and/or would like to have it tailored. The show room agent (or other system) can update the availability of the product as unavailable, update the quantity, and the like. The show room agent (or other system) can identify alternative products to present to the user, such as an identical item in the show room or in the stock room. If the user is in a dressing room, the dressing room agent (or other system) can allow the stock room agent access to the dressing room. The stock room agent (or other system) can cause restocking of the show room with another product if the defective product or the alternative product was taken from the show room. The stock room agent (or other system) can enable access to the dressing room and cause transportation of the product to the QA room. The checkout agent (or other system) can offer a discount if no alternative product can be found. The quality assurance agent (or other system) can initiate repair of the product.

In some embodiments, a retail concierge system is substantially or entirely automated from the customer's perspective. For example, in some embodiments, the system may be configured to enable a customer to shop the showroom floor, build a wardrobe, try clothes on, complete the purchase, and leave the store without ever having to interact with a human. In some embodiments, however, it may be desirable for there to be at least some human interaction in the store. Accordingly, in some embodiments, the system may be configured to allow an employee or user, sometimes referred to herein as a concierge, to interact with the system to help manage the shopping and sales process. For example, the concierge may have a portable electronic device, such as a smart phone or similar, that enables the concierge to manage the shopping and/or sales process. In some embodiments, the concierge's system can be configured to enable the concierge to help a customer to build a wardrobe and/or select items to try on. In some embodiments, the concierge's device may comprise a camera, NFC communication system, and/or the like that enables the concierge to scan a barcode or the like of an item shown on the showroom floor and causes the concierge's system to dynamically display what items related to the scanned item are available for the customer to try on and/or purchase. The concierge can then help the customer to build the wardrobe or dressing room using the electronic device.

In some embodiments, the agents can communicate directly with another agent. In some embodiments, the retail concierge system can receive communication from one agent and initiate action on another agent. In some embodiments, the agents can communicate directly with another agent and report to the retail concierge system for further processing and/or storage.

In some embodiments, the system can be configured to track the efficiency of any employees using the system, to enable the system to operate more efficiently and/or incentivize the employees to operate more efficiently. For example, the system may be configured to monitor, for example, an amount of time it takes for an employee to stock a magic wardrobe, clean and prepare a dressing room for the next customer, prepare items that have been removed from a dressing room to be placed back into inventory for the next customer, and/or the like. In some embodiments, the system can be configured to rate employees on their efficiency and/or other metrics, such as to enable bonus pay, pay rates, and/or the like to be set at least partially based on such metrics.

In some embodiments, the systems disclosed herein enable a customer to walk into a retail store, have an enjoyable and efficient shopping experience, and walk out with the goods they tried on. In some embodiments, the systems disclosed herein can be configured to communicate with an online ordering system that, for example, enables orders to be placed for items that the user wishes to purchase but that are not currently available at the store. For example, a user may try on a pair of pants in a particular size and color, but wish to purchase the same pair of pants in a different color that is not currently stocked at the store. The system may be configured to dynamically order the pants for delivery to the customer's home. In some embodiments, the system can be configured to automatically direct someone to quickly deliver an out of stock item from an off-site warehouse or other retail store that has the item in stock to the current retail store. In some embodiments, depending on how long the user plans to spend at the retail store, the items may be delivered before the user leaves, enabling the user to leave the store with the item that was out of stock at the time the user arrived at the store.

In some embodiments, the retail concierge system tracks activities throughout the store. The retail concierge system can track the amount of time a consumer is in a store and/or a particular area, such as the dressing room and/or the show room. In some embodiments, the retail concierge system can track items that have been tried on and/or items purchased by consumers. In some embodiments, the retail concierge system can track items that have been tried on but not purchased. In some embodiments, the retail concierge system can track how long a consumer spends on selecting items. In some embodiments, the retail concierge system can analyze the tracked information for big data analysis.

Graphical User Interface Examples for Back of House Employees

FIGS. 8A-10H illustrate a variety of example graphical user interface screenshots that may be displayed on, for example, a stockroom user access point system, to enable a stockroom or back of house employee to manage pull requests, among other things. These graphical user interfaces may be presented by, for example, stockroom systems 168 illustrated in FIGS. 1A and 1B, and may be used to facilitate, among other things, the process flow illustrated in FIG. 1C.

Figure 8B:
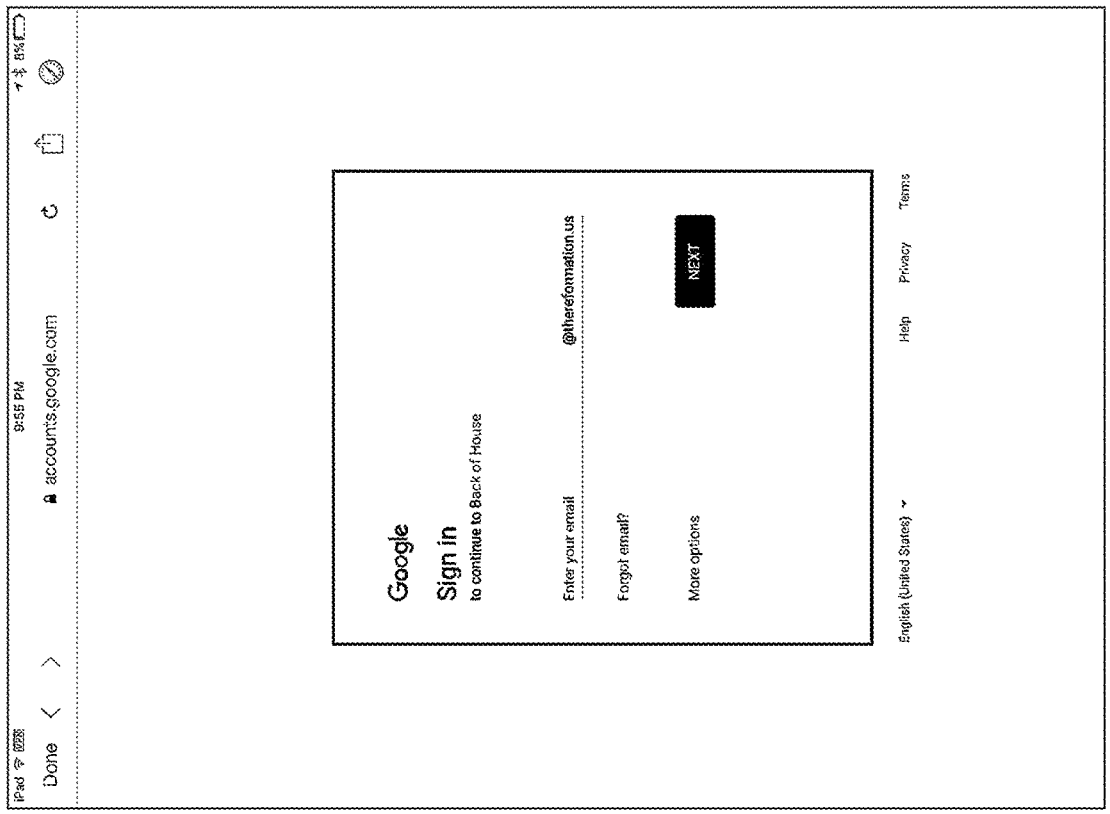
FIGS. 8A-8C are graphical user interfaces for a back of house employee signing into the retail concierge system according to some embodiments.
Figure 8A:
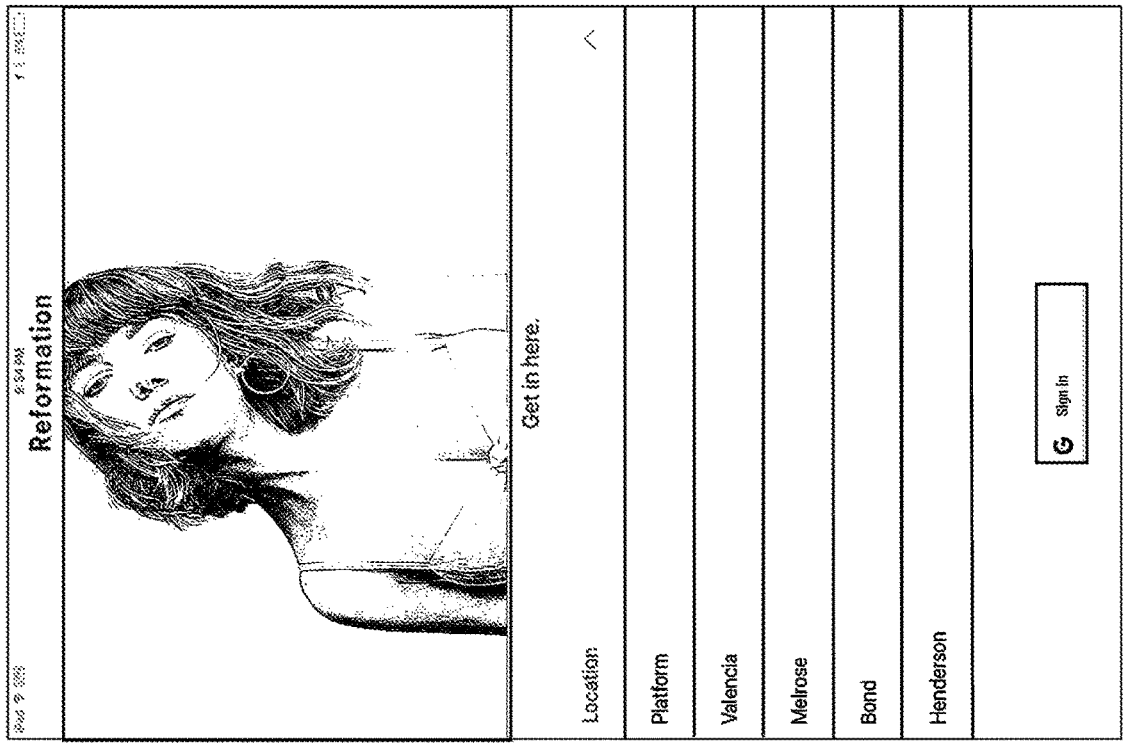
Figure 8C:
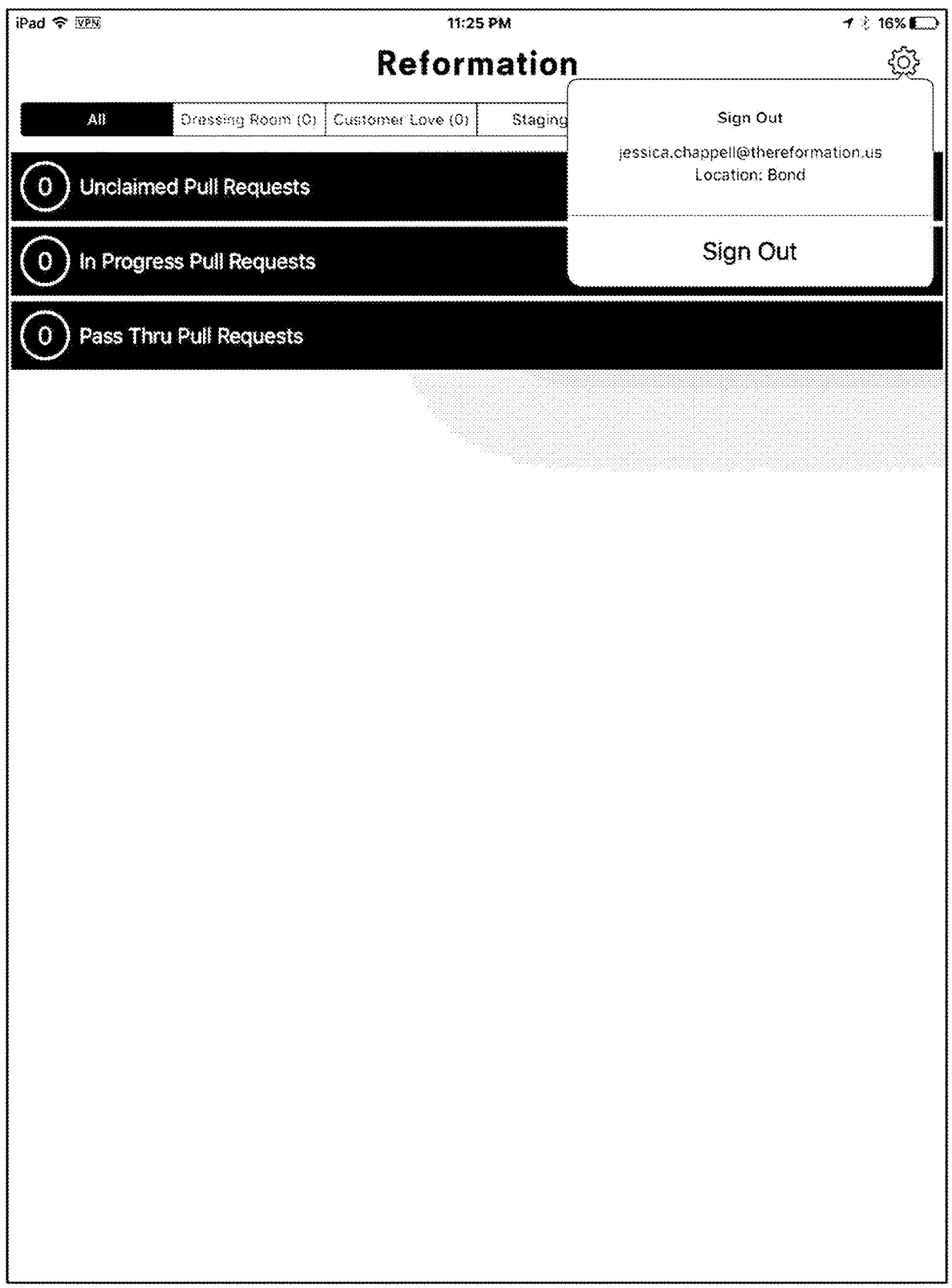

FIGS. 8A-8C are graphical user interfaces for a back of house employee signing into the retail concierge system according to some embodiments. FIG. 8A is a graphical user interface illustrating a store location selection interface according to some embodiments. The stockroom agent can display to the back of house employee to select a store location. The agent can display the user interface via a mobile application installed on a mobile device. The agent can identify stores nearby and list the locations for the back of house employee to select. Once the back of house employee selects the location, the retail concierge system can determine inventory, communicate with stockroom agents, update the stockroom agents of pull requests, communicates the number of dressing rooms, and/or the like.

FIG. 8B is a graphical user interface of a login page according to some embodiments. A back of house employee can log in to the retail concierge system by using an email address and a password. The retail concierge system can adapt to a back of house employee logging into a plurality of shopper agents via different devices, such as a mobile application and a laptop. The retail concierge system can require various agents to sign out after a certain period of time, such as after a shift.

FIG. 8C is graphical user interface illustrating the location and a signed-in identifier according to some embodiments. The graphical user interface is configured to allow a user to click on settings to display the reference number for a back of house employee and the location of the back of house employee. The graphical user interface allows the user to sign out of the retail concierge system.

Figure 9B:
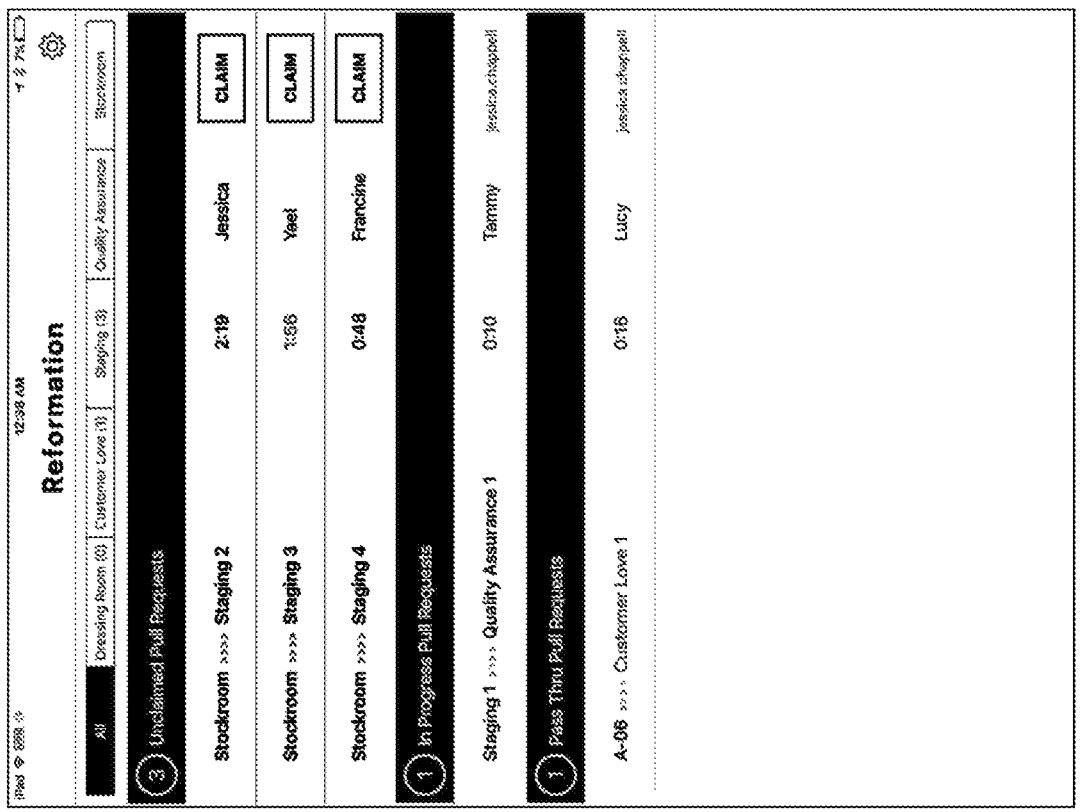
Figure 9A:
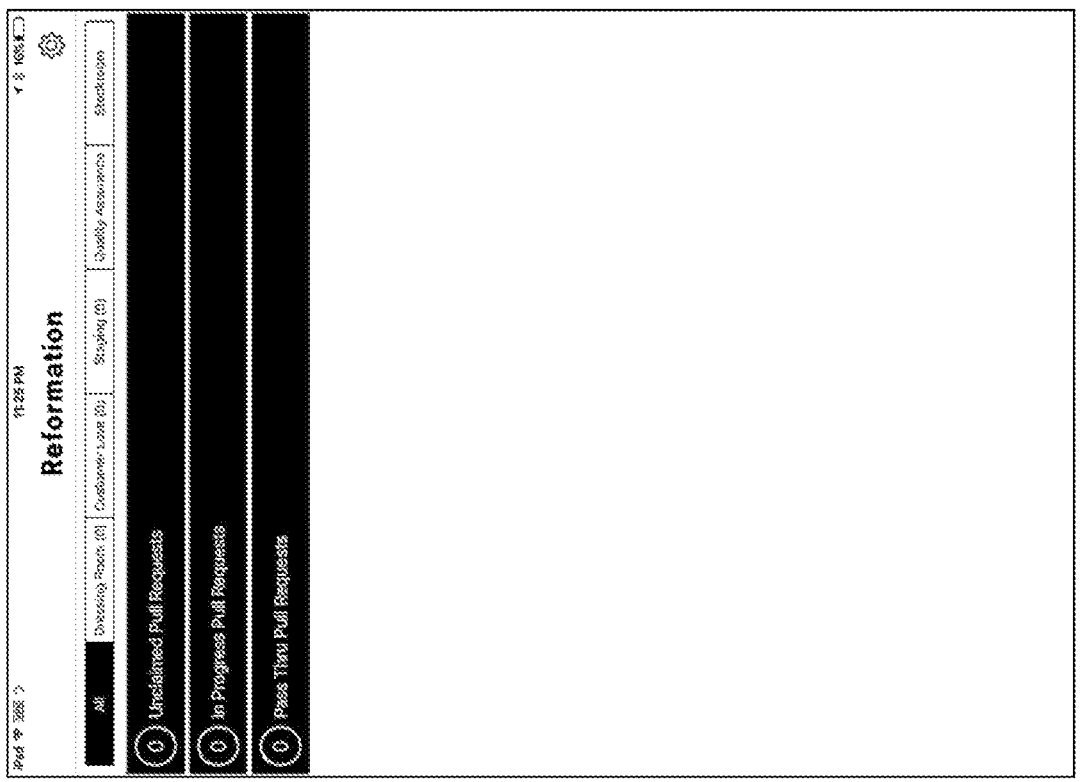
Figures 9C, 9D:
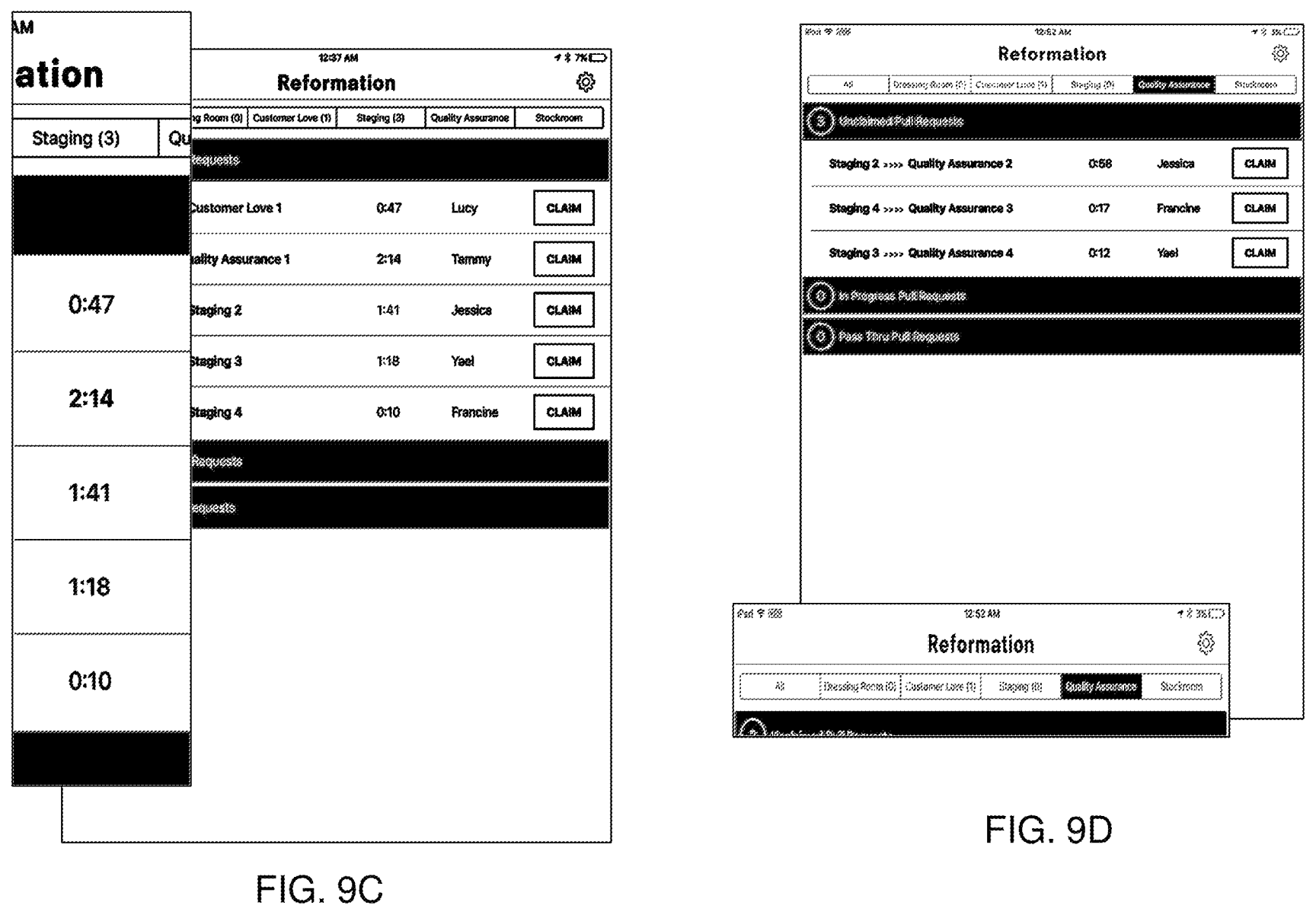

FIGS. 9A-9E are example graphical user interfaces for managing pull requests according to some embodiments. For example, FIG. 9A illustrates a landing page that lists a number of unclaimed pull requests, in progress pull requests, and pass through pull requests. FIG. 9A illustrates a situation where there are no pull requests, and FIG. 9B illustrates a situation where there are three unclaimed pull requests, one in progress pull request, and one pass through pull requests. A pass through pull request may be a pull request that, instead of instructing delivery of an inventory item from a stockroom area directly to a dressing room area, may instruct delivery of an inventory item from the stockroom area to a pass through area, such as a temporary storage area before an item is delivered to a different location of the retail establishment, such as another floor of the retail establishment. With reference to FIG. 9B, each pull request can be configured to list the locations a product needs to be moved between, such as from the stockroom to staging area 2, 3, or 4, from staging area 1 to quality assurance area 1, or from pass-through location A-06 to customer love 1. In some embodiments, customer love may refer to a checkout area. With further reference to FIGS. 9B and 9C, the graphical user interface may indicate an amount of time that any particular pull request has been open, has been claimed, and/or has been in the pull-through status. In some embodiments, these timers may be color-coded to, for example, make sure a pull request that has been waiting for an extended period of time is drawn to the attention of a user of the user access point system. In some embodiments, the graphical user interface presented by the system can be a dynamic interface that expands and/or contracts various fields of the interface based on user interactions. For example, with reference to FIG. 9B, the system can be configured to dynamically expand and/or collapse the Unclaimed Pull Requests section, the In Progress Pull Requests section, and/or the Pass Thru Pull Requests section in response to, for example, a user selecting the title bar for one of those sections. Further, the system can dynamically filter what is displayed by, for example, a user selecting from the filtering buttons shown across the top of the screen in FIG. 9B, such as All, Dressing Room, Customer Love, Staging, Quality Assurance, or Stockroom. Selecting one of these buttons may, for example, filter the displayed pull requests to only show pull requests associated with that area. Such dynamic filtering and/or adaptation of the display can help to make the user interface more efficient and easier for a user to interact with.

FIG. 9A is a graphical user interface of opening pull requests according to some embodiments. A pull request can be a request to transport a product (or a request to perform some other action on one or more inventory items). For example, a consumer can request a product to the dressing room that can cause the generation of a pull request. In some embodiments, an unclaimed pull requests field can indicate a pull request that has not yet been claimed. An in-progress pull request field can indicate pull requests that have been claimed by a back of house employee. A pass through pull request field can indicate a pull request that is in the pass through stage and, for example, needs to be delivered to or from the stock room.

FIG. 9B is a graphical user interface of pull request statuses according to some embodiments. The information displayed regarding these pull requests can be obtained via an API call to a central server, such as via the process described with respect to block 111 of FIG. 1C. In some embodiments, the graphical user interface can display a number of pull requests in each category, such as the unclaimed pull requests, the in progress pull requests, and/or the pass through pull requests. The current location and/or the destination location for the product can be displayed. The amount of time since the pull request was created can be displayed to notify the stock room agent of the pendency of the request. The graphical user display can display an indicator of the urgency of the pull request, such as by color. The interface can include a button for the user to press to "claim" the pull request. This can initiate an API call to the central server that indicates the stockroom agent has claimed the pull request, similar to the process described above with respect to block 113 of FIG. 1C. In some embodiments, the urgency can be based on a time, a type of request, number of articles, value of the consumer, and the like. The consumer who requested the pull request can be displayed and/or the employee that claims the pull request can be displayed. In some embodiments, the retail concierge system can keep track of the speed of clearing pull requests for the back of house agents, or the stockroom agents. In some embodiments, the speed of clearing pull requests can be used to provide incentives and bonuses to employees. In some embodiments, the stock room agent can receive a list of dressing rooms, or cabinets, with open pull requests via an API call once the stock room agent is ready to complete a pull request. The stock room agent can receive the list of pull requests and claim to perform the pull request via an API call. Upon completion, the stock room agent can mark the pull request as complete via an API call (such as by the process described above with reference to block 115 of FIG. 1C). This may result from the user pressing the "COMPLETE" button illustrated in FIG. 10F. The stock room agent and/or other agent can set and/or change pull request statuses, such as marking as complete or changing from "stocking" to "stocked." The dressing room agent and/or other agent can set and/or change the statuses of a dressing room, such as marking as "clearing" or "in use."

FIG. 9C is a graphical user interface illustrating and example pull request sort order according to some embodiments. In some embodiments, the pull requests can be sorted. For example, the pull requests can be sorted by the amount of time since the pull request was generated. The pull request can be sorted by source and/or destination location, by user, by user profile status, by the number and/or type of products requested, and the like. In some embodiments, a timer can be displayed next to each pull request and turn yellow if the request is over 1 minute and red if the request is over 2 minutes. Other embodiments may use different time ranges and/or colors.

FIG. 9D is a graphical user interface of a filter according to some embodiments. Filters at the top of the graphical user interface can be used to display pull requests for a particular area. For example, pull requests for quality assurance can be selected and displayed.

Figure 9E:
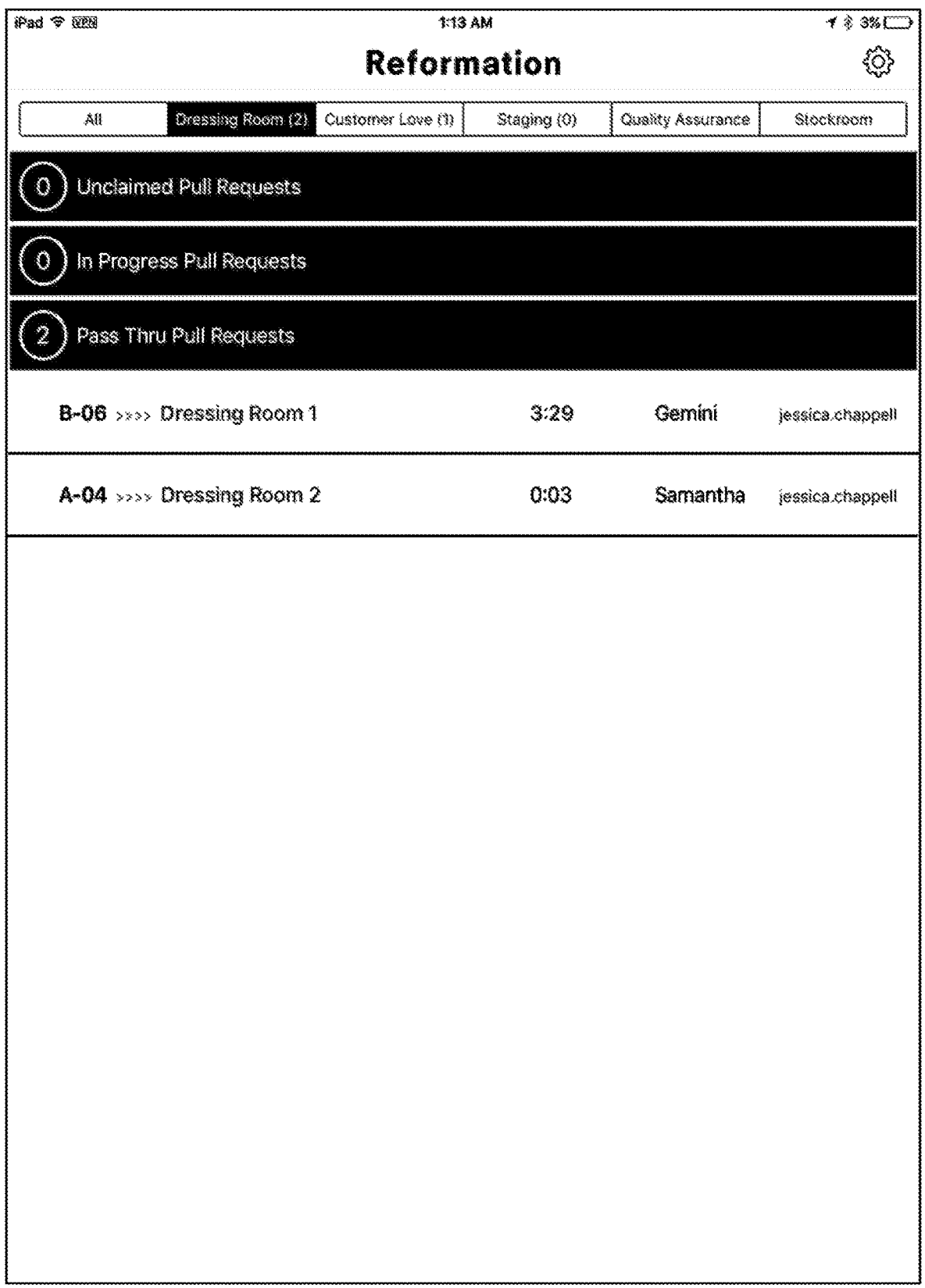

FIG. 9E is graphical user interface of products in a pass through area according to some embodiments. If the product is to be passed to and from a dressing room, a staging area, a show room, a checkout counter, a quality assurance room, and the like, the product can be placed in a pass through pull request tab. Once the stock room agent completes the physical transport of the product, the pass through pull request can be marked as completed. A pass through button can be displayed such that a back of house employee can click the pass through button to display a plurality of pass through locations, such as A-01, A-02, etc.

Graphical User Interface Displaying Detailed Information for Pull Requests

Figure 10A:
Figure 10B:
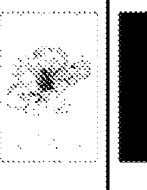

FIGS. 10A-10H are graphical user interfaces displaying detailed information for pull requests according to some embodiments. For example, FIG. 10B illustrates details of a pull request that comprises instructions to move five inventory items from the stockroom to staging area 4. The user interface can indicate an identifier of the customer that is trying on these items, in this case "Ivanka." The user interface can further indicate the employee or stockroom agent system that has claimed the pull request. In some embodiments, the user interface can include one or more timers that illustrate, for example, an amount of time that has elapsed since the pull request was created and/or since the pull request was claimed. In some embodiments, the graphical user interface can enable the user to indicate to the system that various actions have taken place with respect to the specific items, such as the item having been pulled, the item having an issue, such as a tear or rip, and/or the like. In some embodiments, the graphical user interface enables the user to indicate these actions via taps, swipes, other gestures, and/or the like.

FIGS. 10A-10B are a graphical user interfaces illustrating a listing of pull requests according to some embodiments. The stockroom agent can display a status of certain items. The graphical user interfaces in the examples of FIGS. 10A-10B displays pull requests for inventory items of different sizes (such as a bikini top and an afternoon dress). The graphical user interface can display the number of products with pending pull requests, the time the pull request was submitted, the time it has taken so far to fulfill the pull request, an abort option, a complete and/or pass through button, and/or the like. When a pull request is claimed by a stockroom agent, the stockroom agent that claimed it can be displayed at the top, as shown in FIG. 10B. FIG. 10A illustrate an example of a graphical interface for unclaimed pull requests where no claimed stockroom agent is displayed at the top.

FIG. 10C is graphical user interface for a back of house employee acting on a pull request according to some embodiments. The graphical user interface can display locations of products and where the products are being moved to (such as from the stockroom to the staging 1). The graphical user interface can display the identifier of the employee associated with the stockroom agent that claimed the pull request. The graphical user interface can display the number of items to pull. The graphical user interface can sort the products in alphabetical order, in order of quantity, in order of type, and the like. At the bottom left, the graphical user interface can comprise an alert status for various agents of the retail concierge system. The graphical user interface can display the total number of products in the claimed pull request. The graphical user interface can display the time that the pull request was submitted. The graphical user interface can display the time it has taken so far since the request to pull. The graphical user interface can provide an option to abort the pull request. The graphical user interface can enable a user to indicate each individual item has been pulled by, for example, swiping left or right. The graphical user interface can provide a "complete" option for the stockroom agent to indicate the completion of the pull request. In some embodiments, the "complete" option is disabled until all inventory items have been dealt with (such as marked as pulled, missing, damaged, and/or the like). In some embodiments, the show room agent can add an article of clothing, or a hanger, to a fitting session, or a shopping cart via an API call. If a fitting session is already assigned to a dressing room, then a pull request can be initiated. On the show room agent and/or the shopper agent, the hangers added to the fitting session can be displayed via an API call specific to adding hangers to the fitting session.

FIG. 10D is a graphical user interface of marking a product as missing or damaged according to some embodiments. In some embodiments, the product can be marked missing or damaged in a stockroom agent by a back of house employee. In some embodiments, the product can be marked missing or damaged by another agent, such as a concierge agent that identifies a damaged item or a show room agent that cannot identify the location of a product. FIG. 10D, and other figures, illustrate that the graphical user interfaces presented by the systems described herein can in some embodiments enable a user to efficiently interact with particular inventory items displayed by the graphical user interface. For example, the graphical user interface can enable a user to swipe left or swipe right to perform an action with respect to the item, and such swiping gestures may cause dynamic changes in the graphical user interface. For example, as shown in FIG. 10D, the user is swiping left on the third of the four inventory items depicted by the graphical user interface. This causes the graphical user interface to move that item's depiction to the left and to display a plurality of buttons, in this case a "Missing" button and a "Damaged" button. Other buttons may be available in other embodiments.

Figure 10F:
Figure 10E:

FIG. 10E is a graphical user interface of various statuses of items in a pull request for a back of house employee according to some embodiments. Color coding, icons, identifiers, and/or the like can indicate the status of a product. For example, white can indicate that the product is not yet pulled, orange can indicate a missing product, red can indicate a damaged product, and blue can indicate a pulled product. FIG. 10F is a graphical user interface for completing a pull request according to some embodiments.

Figures 10G, 10H:

FIG. 10G is graphical user interface of products in a pass through zone added according to some embodiments. If the product is to be passed through a pass through zone, the interface may be configured to enable the user to select from a list of pass through locations, instead of pressing a "complete" button. A pass through button can be displayed such that a user can click the pass through button to display a plurality of pass through locations, such as A-01, A-02, etc.

In some cases, a new product may be added to a pull request after that pull request has already been claimed by a stockroom agent. In such a case, the graphical user interface can be configured to communicate with the central server via an API request and receive information regarding the newly added item. FIG. 10H is a graphical user interface of such a new product added according to some embodiments. In some embodiments, a stockroom agent can display new products. The new products can be displayed in a separate interface and/or have an indicator that they are a new product, such as coloring the product listing in white and/or an icon next to a picture. The stockroom agent can indicate a product already pulled such as coloring the product listing in grey and/or an icon next to the name.

Graphical User Interface Examples for Concierge Systems

FIGS. 11A-15L illustrate various embodiments of graphical user interface screenshots from software that may be used by, for example, a concierge system and/or other user access point system to help manage a shopping experience and/or pull requests. These graphical user interfaces may be displayed by, for example, the concierge user access point systems 167 illustrated in FIGS. 1A and 1B. They may, among other things, help facilitate functionalities associated with, for example, blocks 117 through 121, 131, and 133 of the flowchart illustrated in FIG. 1C.

Figure 11C:
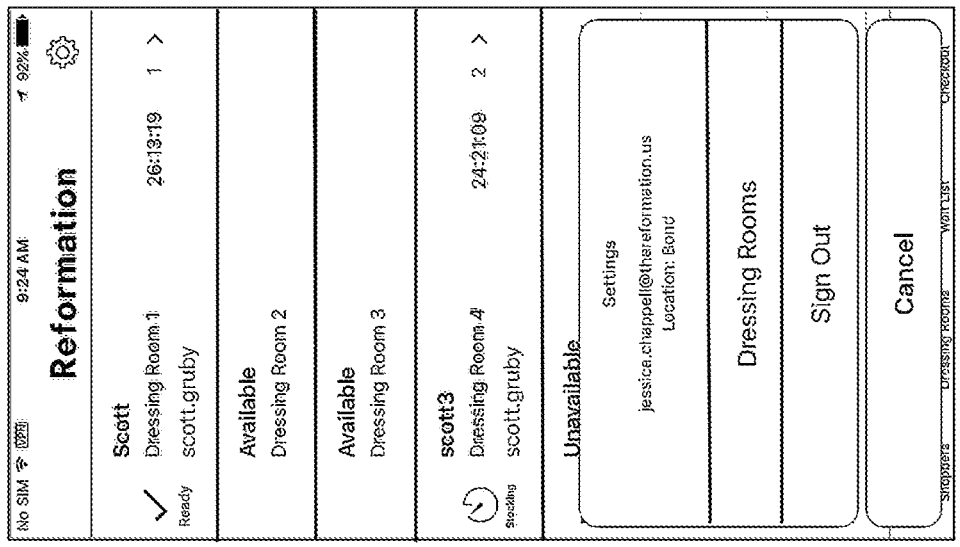
FIGS. 11A-11C are graphical user interfaces for a concierge employee signing into the retail concierge system according to some embodiments.
Figure 11B:
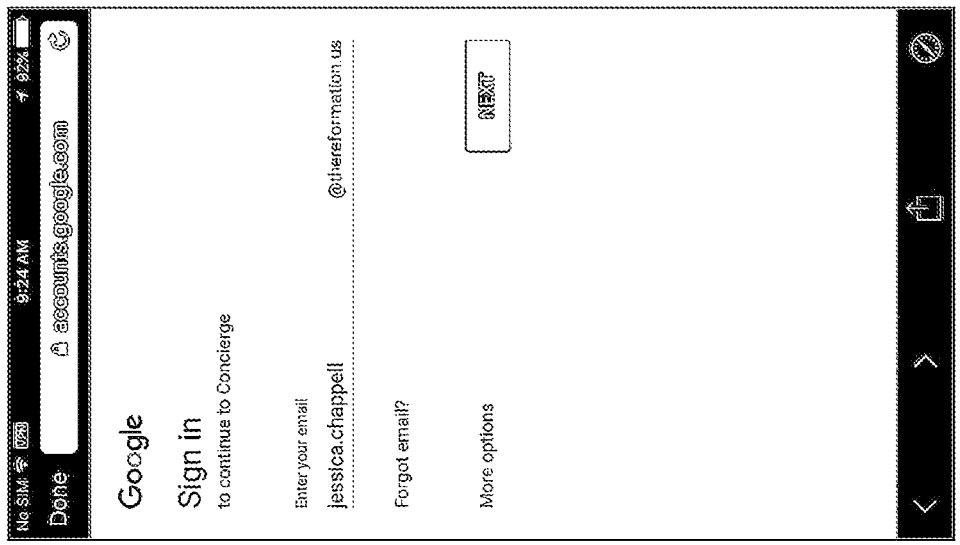
Figure 11A:
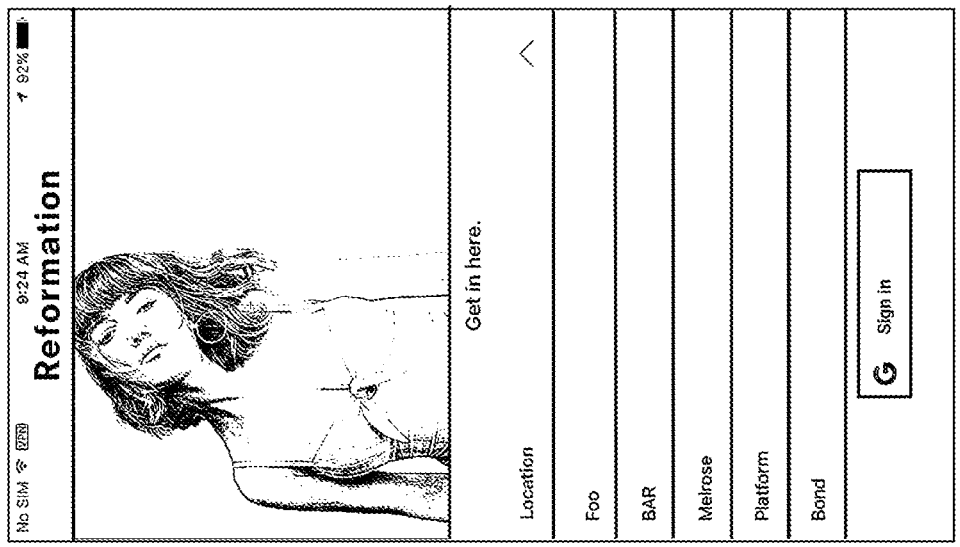

FIGS. 11A-11C are graphical user interfaces for a concierge employee signing into the retail concierge system according to some embodiments. FIG. 11A is a graphical user interface illustrating a store location selection interface according to some embodiments. The concierge agent can display to the concierge employee to select a store location. The agent can display the user interface via a mobile application installed on a mobile device. The agent can identify stores nearby and list the locations for the concierge employee to select. Once the concierge employee selects the location, the retail concierge system can determine inventory, communicate with concierge agents, update the stockroom agents of pull requests, communicates the number of dressing rooms, and/or the like.

FIG. 11B is a graphical user interface of a login page according to some embodiments. A concierge employee can log in to the retail concierge system by using an email address and a password. The retail concierge system can adapt to a back of house employee logging into a plurality of shopper agents via different devices, such as a mobile application and a laptop. The retail concierge system can require various agents to sign out after a certain period of time, such as after a shift.

Figures 12A, 12B, 12C:

FIG. 11C is graphical user interface illustrating the location and a signed-in identifier according to some embodiments. The graphical user interface is configured to allow a concierge employee to click on settings to display the reference number for a concierge employee and the location of the concierge employee. The graphical user interface allows the user to sign out of the retail concierge system.
Graphical User Interface Examples for Managing Shoppers FIGS. 12A-2H are graphical user interfaces for enabling a concierge system to manage and/or provide services to customers or shoppers according to some embodiments. FIG. 12A is a graphical user interface illustrating a shoppers tab according to some embodiments. In some embodiments, this screen can, for example, display a dynamically updated list of current shoppers that are shopping in the establishment. In some embodiments, the system can be configured to, for example, cause a shopper to be displayed on the concierge system graphical user interface as soon as a fitting session is created for that shopper (e.g., responsive to the fitting session being created, within 10, 20, or 30 seconds, and/or the like), such as described above with reference to block 103 of FIG. 1C. In some embodiments, the concierge system can be configured to communicate over the network with the central server via an API to receive updates with respect to current shoppers and/or to provide updates to the central server with respect to current shoppers. The shoppers tab can be the first tab for the concierge agent application. Customers can begin as a "shopper" status. If there is a wait list, the estimated time for the waitlist can be displayed at the top of the page. Icons next to the customer's name can be displayed enabling access to other information on the customer, such as where the customer started shopping (such as via a showroom user access point system or with the help of an employee via a concierge user access point system). If the customer started on the concierge application, the name of assigned agents and/or employees can be displayed under the customer's name. The number of products the customer has in their session, cart, wish list, and the like can be displayed next to their name. The concierge agent can be configured to allow the user to create and/or add a new shopper. In some embodiments, shoppers can be configured to disappear from the list after a certain period of inactivity, such as after 20 minutes, 30 minutes, 1 hour, and the like.

FIG. 12B is a graphical user interface of creating a new shopper according to some embodiments. For example, if a customer wishes to have an employee help him or her in requesting product to try on (as opposed to helping himself or herself via a showroom system) the concierge system can enable an employee to setup the customer as a new shopper in the system. In some embodiments, the consumer and/or the concierge employee can create a new shopper profile and/or session. The concierge employee can select the add new shopper option on the concierge agent. The shopper name can be unique. The shopper name can be temporary and/or disappear after a time period of inactivity, such as inactivity for 10 minutes, 20 minutes, 30 minutes, 1 hour, 1 day, 1 week, 1 month, 1 year, and the like.

In some embodiments, a customer's session can be assigned an identifier. Various agents can communicate with one another and/or track the customer's session via the identifier. The identifier can expire after a certain period of time and/or a completion action, such as a purchase. The identifier can be perpetually tied to a customer account and/or be a subset of characters associated with a customer account (such as Kimberly544). In some embodiments, the identifier is a unique identifier.

FIG. 12C is a graphical user interface of inventory in a consumer's dressing room according to some embodiments. For example, if a shopper name in FIG. 12A is clicked on, the application may take the user to the screen illustrated in FIG. 12C, to show details of that shopper's fitting session.

The inventory in a consumer's dressing room can be displayed to see what products are in a consumer's session, view, claim, dressing room, and the like. In some embodiments, the concierge system can enable the user to generate pull requests for additional items to try on, or to remove unneeded items, such as by swiping left to see other available sizes and/or remove the product from the dressing room. The stock room agent can identify available sizes and/or styles to identify which item to use for restocking purposes. In some embodiments, the concierge employee can limit the amount of products that the customer can add to the dressing room and/or the session. The number of products that the customer can add can differ while in the dressing room, while in the show room, while remote, and the like. The retail concierge system can add products to a consumer's session. The retail concierge system can add duplicate sizes once the consumer is assigned to a dressing room agent, a waitlist agent, a checkout agent, and the like.

Figures 12D, 12E, 12F:
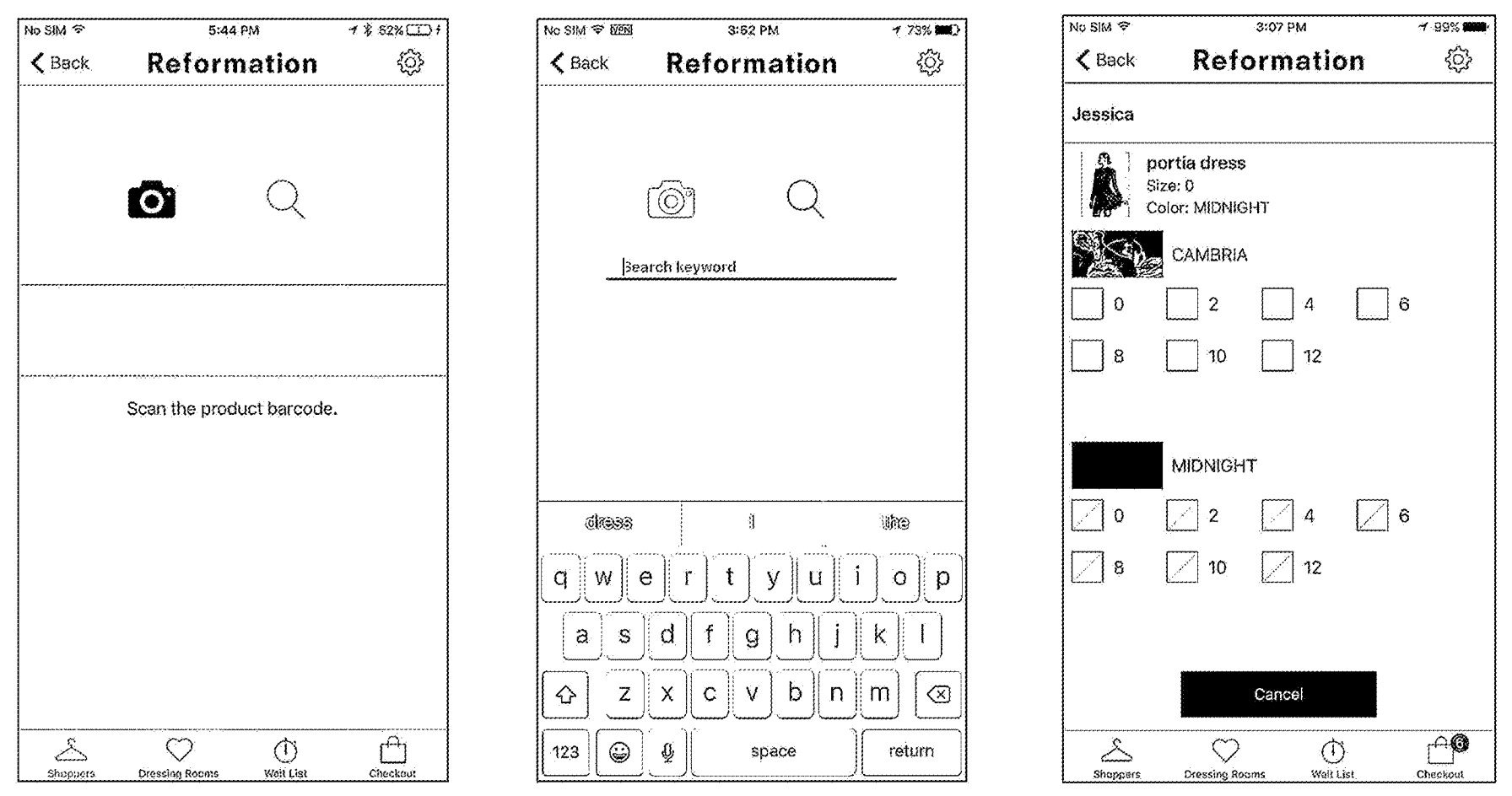

FIGS. 12D and 12E are graphical user interfaces illustrating options for a concierge employee to add inventory items to a shopper's fitting session, such as by scanning a product barcode and/or entering in an identifier according to some embodiments. A concierge employee can select to shop samples off the show room and/or want to keep track of certain items the consumer likes on the show room. The concierge employee can scan a product by clicking the camera button. The concierge agent can be used to take a picture or use the camera to line up a product barcode. Upon identification of the item, available sizes and colors can be displayed. The concierge employee can click as many sizes and colors as desired and can be sent to the stockroom for temporary storage and/or transport to a dressing room. A graphical user interface can allow a user to enter in a product identifier, keywords, name of a product, size, color, and the like. The graphical user interface can display search results and/or the consumer can select a product on the product page.

FIG. 12F is a graphical user interface for available product inventory according to some embodiments. The concierge agent can display a product that is searched for and/or selected. The display illustrates available sizes for two particular styles/colors (such as cambria and midnight). The product image can be selected to see a product image that can be zoomed in. The concierge agent can be used to zoom into a product image by pinching the screen. The products that are unavailable can have a gray slash through the box as an indicator. An unavailable product can indicate that a product is completely unavailable and/or in another customer's current session. The concierge employee can select one or more products and/or product sizes from the available product inventory screen. In some embodiments, the graphical user interface can provide an option for an item that is not in stock to be purchased and/or shipped to a customer's home.

Figures 12G, 12H:
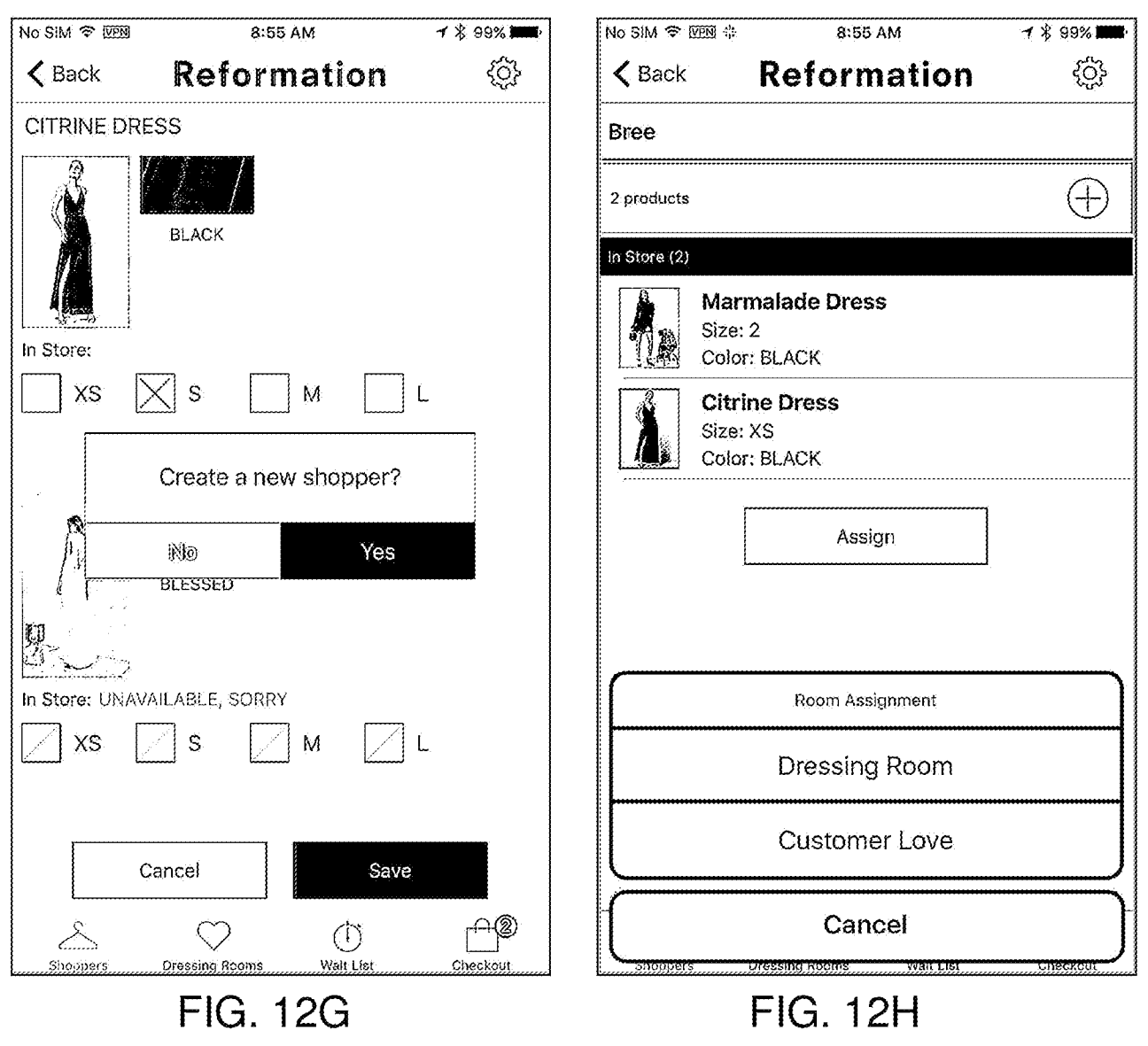

FIG. 12G is a graphical user interface of finding a product according to some embodiments. In some embodiments, a concierge employee can request a specific product and/or characteristics such as size or color. In some embodiments, the concierge employee can enter desired product information before creating a profile and/or session. This can be desirable, for example, because it may be more efficient to search for a product a customer is asking for prior to asking the customer his or her name to start a fitting session. Once an item is found and requested to be added to a fitting session, however, the system can request an identifier (such as a customer name) to create a new shopper and/or fitting session to assign the requested inventory item to. The concierge employee can request that a new shopper profile be created on the concierge agent.

If a shopper is working directly with a showroom system to request inventory items, the showroom system may enable the shopper to request a dressing room and/or to request to checkout. A concierge system, however, may also be used to enable a concierge employee to request a dressing room for the session or to send the session to checkout. FIG. 12H is a graphical user interface for assigning a consumer to a dressing room by a concierge system according to some embodiments. When the consumer is done with the show room, the user (e.g., the concierge employee associated with the concierge system) can request a dressing room and/or go to checkout to make a purchase (such as via the customer love option). When the consumer is ready to try on the items in his or her session, the dressing room agent can assign a consumer to a dressing room. The user can be shown available dressing rooms, and the user can select from the available dressing rooms. If the dressing rooms are unavailable, the system can place the consumer on a waiting list. When the user is assigned to a dressing room, a wait list, or for checkout, the consumer will be removed from the show room list. The concierge agent can create a fitting session via an API call with the retail concierge system.

Graphical User Interface Examples for Managing Dressing Rooms

Figures 13A, 13B, 13C:
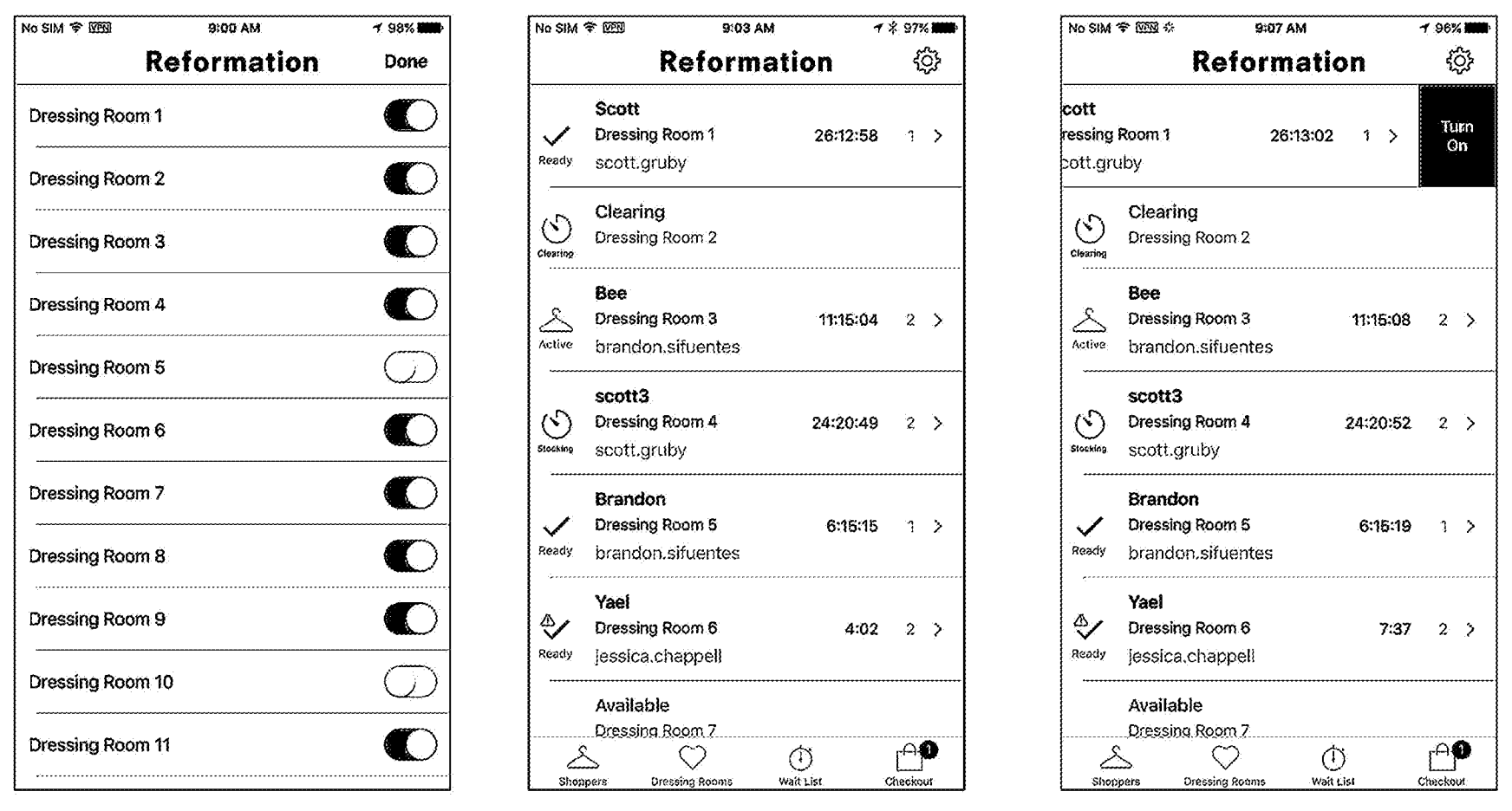

FIGS. 13A-13M are graphical user interfaces for managing dressing rooms according to some embodiments. FIG. 13A is a graphical user interface of on and off states for dressing rooms according to some embodiments. In some embodiments, the dressing rooms can be set to a default status, such as an available status. In some embodiments, the dressing rooms can be toggled in a settings tab to enable and/or disable dressing room reservation availability.

FIG. 13B is a graphical user interface of various states for dressing rooms according to some embodiments. For example, stocking can indicate that a stocking room agent or a back of house agent is in progress of stocking the dressing room. A ready indicator can mean that all products have been stocked by the stocking room agent or the back of house agent. A ready with a red alert can indicate that all products have been stocked by the back of house agent, but one or more of the products is missing or damaged so it can't be added to the room. This can set customer expectations before the customer enters the dressing room. In some embodiments, active status can indicate that the dressing room has been turned on and/or a customer is currently in the dressing room. A clearing status can indicate that the back of house agent is in progress clearing the dressing room. The checkout ready status can indicate that the customer clicked the Checkout button from the dressing room. In some embodiments, the retail concierge system can receive the status of the dressing rooms via an API call to the dressing room agents. The retail concierge system can turn a dressing room on and/or off via an API call to the dressing room, and vice versa. The retail concierge system can receive dressing room details, such as the inventory requested for the dressing room, via an API call to the dressing room agent.

FIG. 13C is a graphical user interface for a concierge agent displaying customers assigned to dressing rooms according to some embodiments. In some embodiments, when a dressing room becomes available, a concierge agent can enable swiping on the graphical user interface to turn on a dressing room (e.g., to put the dressing room into a ready state). In some embodiments, a dressing room can be assigned based on the first concierge agent to request the dressing room. In some embodiments, the dressing room can be assigned based on an ordered list, such as the longest time waited, a higher priority customer, the number of articles of clothing reserved, a combination of various characteristics, and the like.

Figures 13D, 13E, 13F:
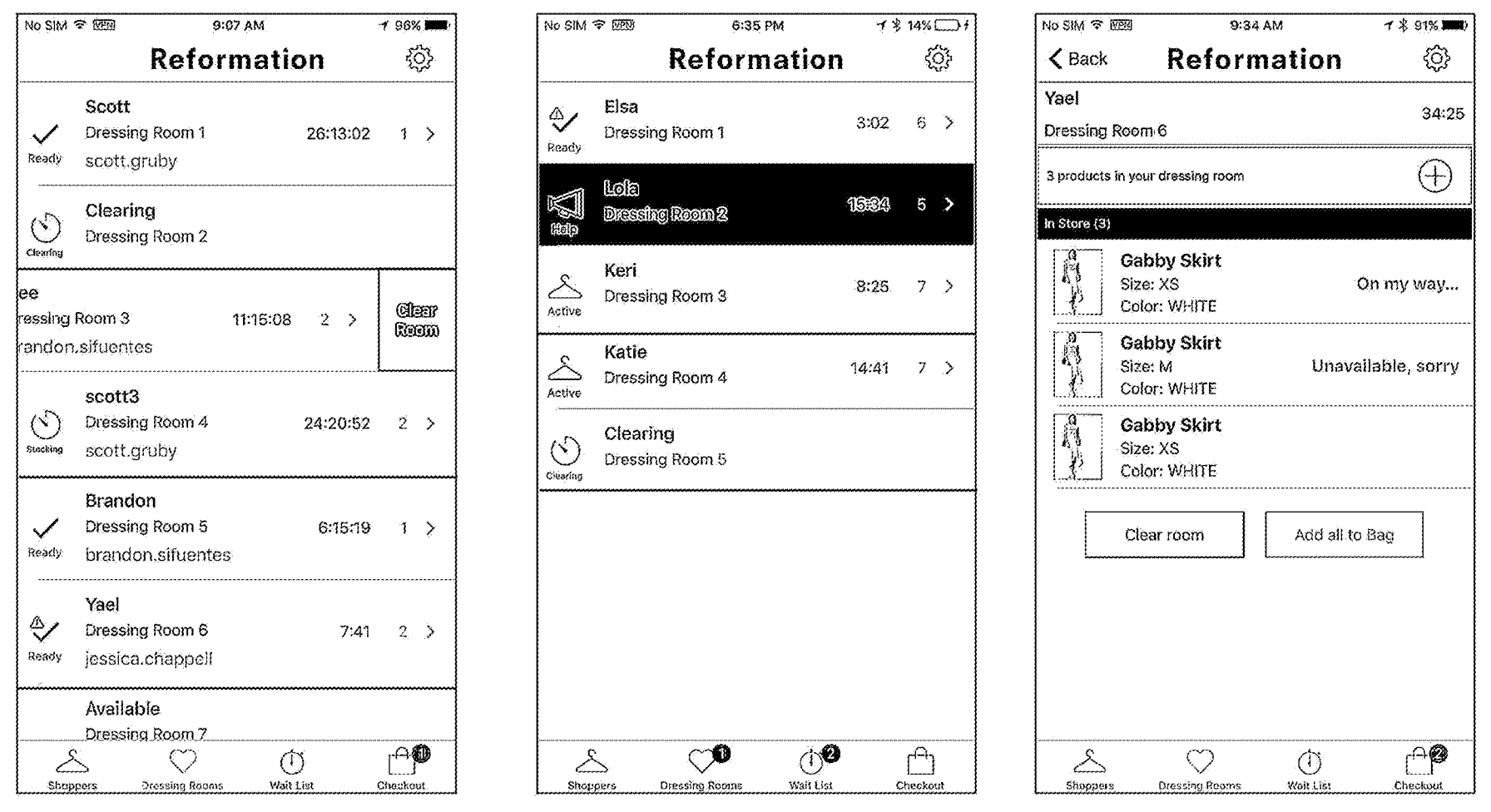

FIG. 13D is a graphical user interface of an active status for dressing rooms according to some embodiments. In some embodiments, when the dressing room is in the Active state, the concierge agent enables the swipe option to clear the room. If a consumer does not want to make a purchase of an inventory item they tried on in the dressing room, the customer can clear the entire dressing room and/or a subset of their selection via a dressing room agent and/or concierge agent. In some embodiments, the concierge agent can enable selection or swiping to clear the dressing room upon indication that the customer is done with the dressing room. When the clear room option is selected, the stock room agent and/or the back of house agent can receive a request to clear the dressing room. When a stock room agent is assigned to the dressing room, the status of the dressing room can be changed to a clearing state. If a consumer accidentally clears a room with products a customer wants to purchase, a user can create a new session with the same products and request direct checkout without requesting a dressing room.

FIG. 13E is a graphical user interface of a help status for dressing rooms according to some embodiments. In some embodiments, customers can click the help button from the shopper agent and/or the dressing room agent from the dressing room. The shopper agent and/or the dressing room agent can transmit an alert to a stock room agent, a quality assurance agent, a checkout agent, a showroom agent, or the like. A stock room agent, a quality assurance agent, a checkout agent, a showroom agent, or the like can be notified of a need for help and can initiate the help for the consumer. After a consumer is helped and/or a consumer does not need help anymore, a user can clear the help request, such as by swiping on the help tab to clear help. In some embodiments, a stock room agent, a quality assurance agent, a checkout agent, a showroom agent, or the like can clear the help request after completing the help. After a clear help request is initiated, the other agents that received the help request also has the help request cleared.

FIG. 13F is a graphical user interface of an inventory status for dressing rooms according to some embodiments. In some embodiments, the concierge agent can display a status that the inventory that is added to a dressing room is on its way to the dressing room. In some embodiments, the concierge agent can display an unavailable status when a product is missing, damaged, currently in repair, in a session of another user, in another dressing room, and the like. In some embodiments, if the on my way status or the unavailable status is not displayed, the product is currently in the magic wardrobe and/or the dressing room, in other words, the stockroom agent completed transport of the inventory to the dressing room.

Figures 13G, 13H, 13I:
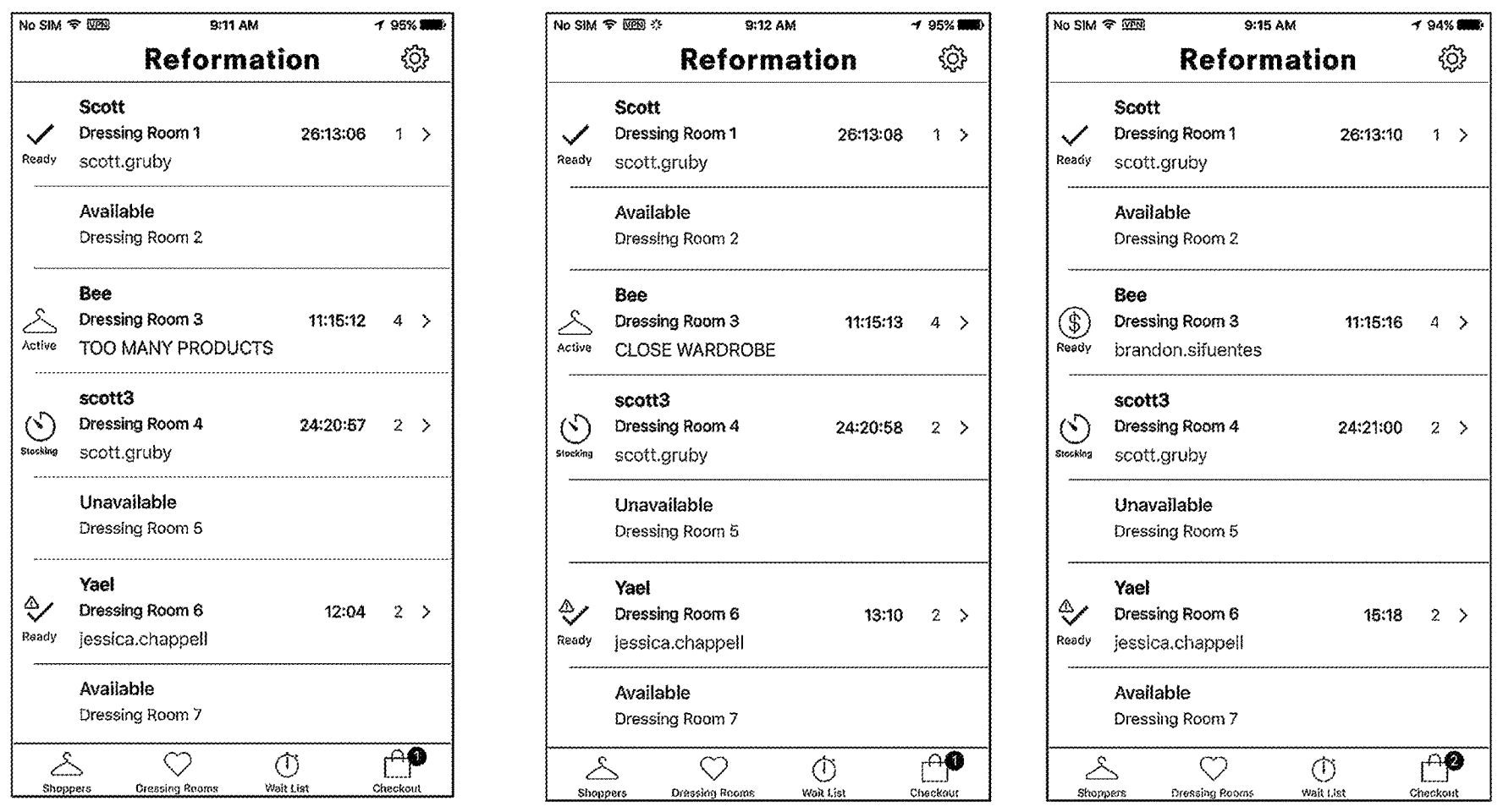

FIG. 13G is a graphical user interface of an inventory quantity status for dressing rooms according to some embodiments. In some embodiments, when a customer adds more products to their dressing room than the back of house agent or the stock room agent can handle (or that exceeds a set threshold), the stock room agent and/or central server can trigger an alert to the shopping agent that there are too many products in the session. If the shopping agent displays this alert, the dressing room agent can display an alert regarding the number of items in the session. The consumer can select a subset of the items. In some embodiments, once a subset of items is selected that is of a quantity that the stock room agent can handle, the alert can clear.

FIG. 13H is a graphical user interface of a close wardrobe status or alert for dressing rooms according to some embodiments. The back of house agent can transmit an alert to the concierge and/or dressing room agent to indicate that the wardrobe door within the dressing room needs to be closed. For example, the alert may show up on the concierge agent user interface, triggering the concierge employee to request that the shopper close the wardrobe door. Once the door has been closed, the concierge system may enable clearing of the alert (and/or the system may automatically detect that the door has been closed and automatically clear the alert).

FIG. 13I is a graphical user interface of a checkout ready status for dressing rooms according to some embodiments. In some embodiments, when a customer clicks the 'Checkout' button on the dressing room agent and/or the shopper agent, the status of the room can update to be 'Checkout Ready." In the dressing room, the shopper agent and/or the dressing room agent can display direction from the screen to leave behind what she doesn't want.

Figures 13J, 13K, 13L:
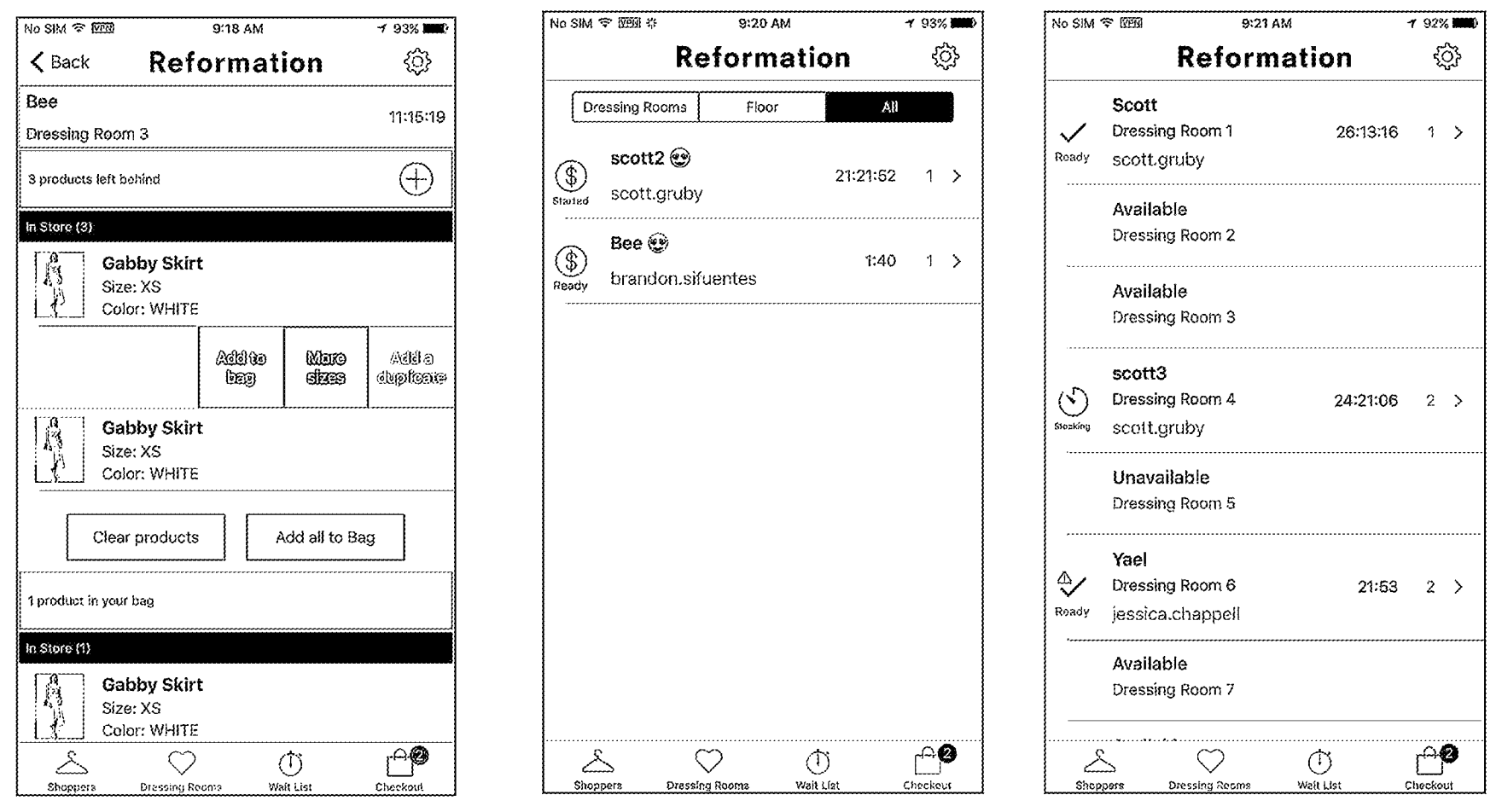

FIG. 13J illustrates functionality that can enable a concierge employee to utilize the concierge system to begin a checkout process for the shopper in a dressing room. For example, if the shopper wants to purchase some of the items the shopper tried on but does not wish to purchase some of them, the system can enable the concierge employee to indicate that an item for purchase is being added to a bag, such as by swiping left and clicking the "add to bag" button. For items that the shopper does not wish to purchase, the concierge employee can click on, for example, the clear products button. This can, for example, initiate, via an API request to the central server, generation of a pull request that would cause the remaining items to be removed from the dressing room by, for example, a stockroom system. In some embodiments, the dressing room agent and/or the retail concierge system can initiate clearing of the dressing room via an API call with a back of house agent once the consumer completes use of the dressing room. The back of house agent can receive a list of cabinets with open pull requests and claim a pull request. The back of house agent can mark the pull requests upon completion.

FIG. 13K is a graphical user interface of a checkout tab according to some embodiments. In some embodiments, after a concierge agent has requested clearing of the dressing room of products in the dressing room that the customer does not want, the concierge agent can show that the shopper has been moved to a checkout procedure. An indicator can be placed near shoppers that are in the checkout process, such as a hearts for eyes icon.

FIG. 13L is a graphical user interface of a dressing room timer according to some embodiments. In some embodiments, the concierge agent can display a timer that counts up. The concierge agent can display the timer next to the customer's name to let the user know how long a particular customer has been in the dressing room.

Graphical User Interface Examples for Managing a Wait List

Figure 14C:
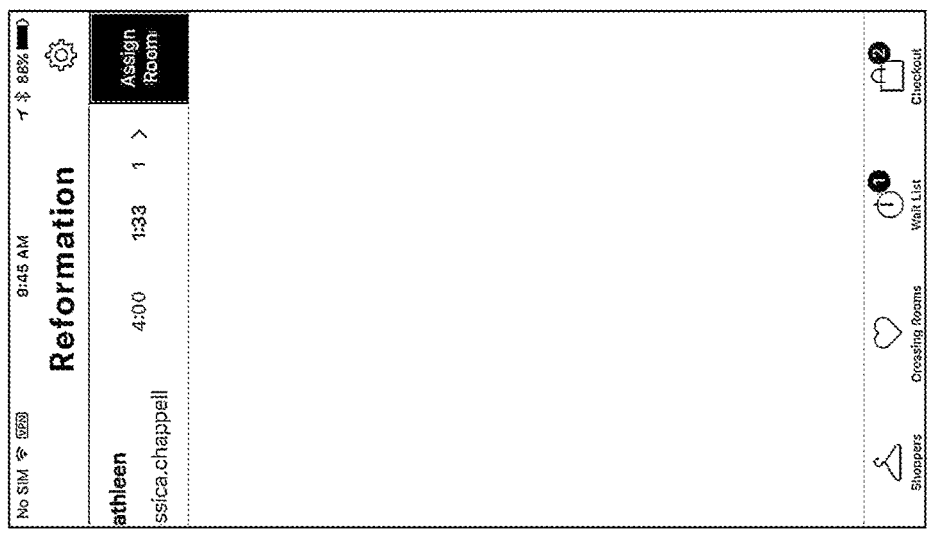
Figure 14B:
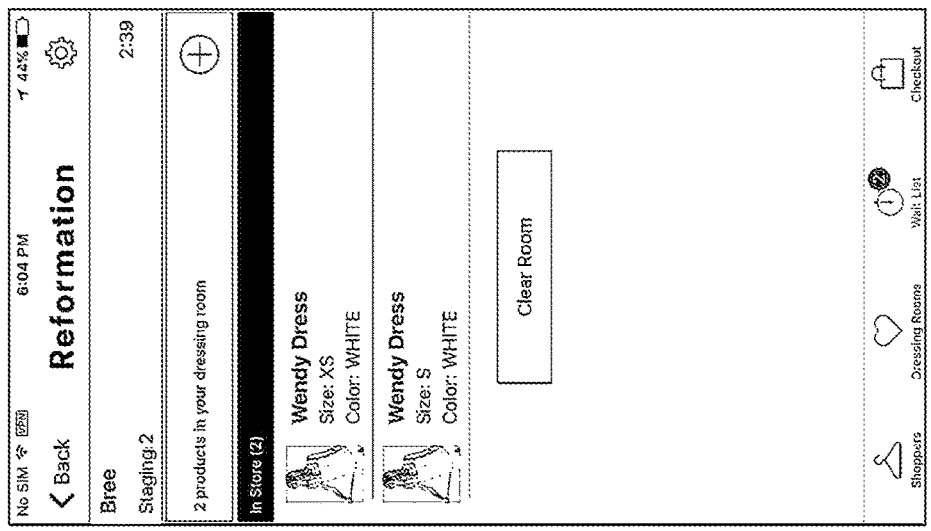
Figure 14A:
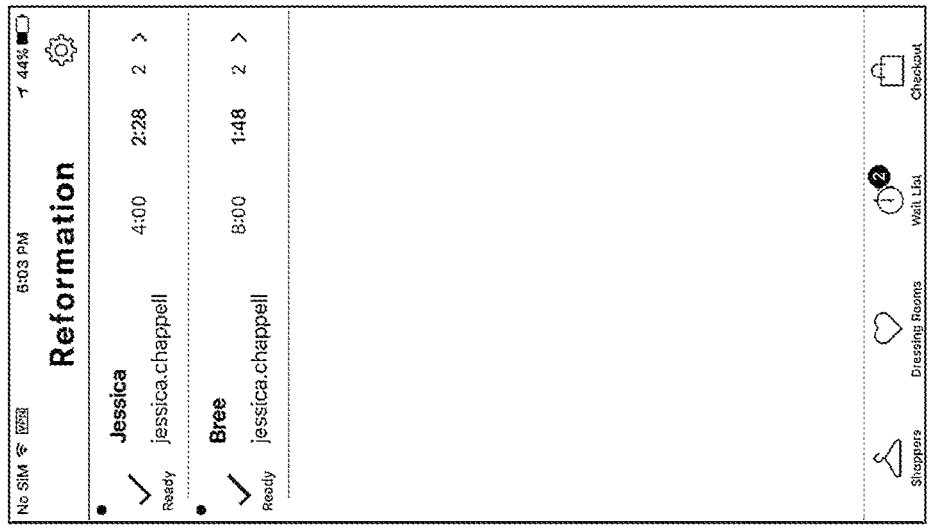
Figures 14D, 14E, 14F:
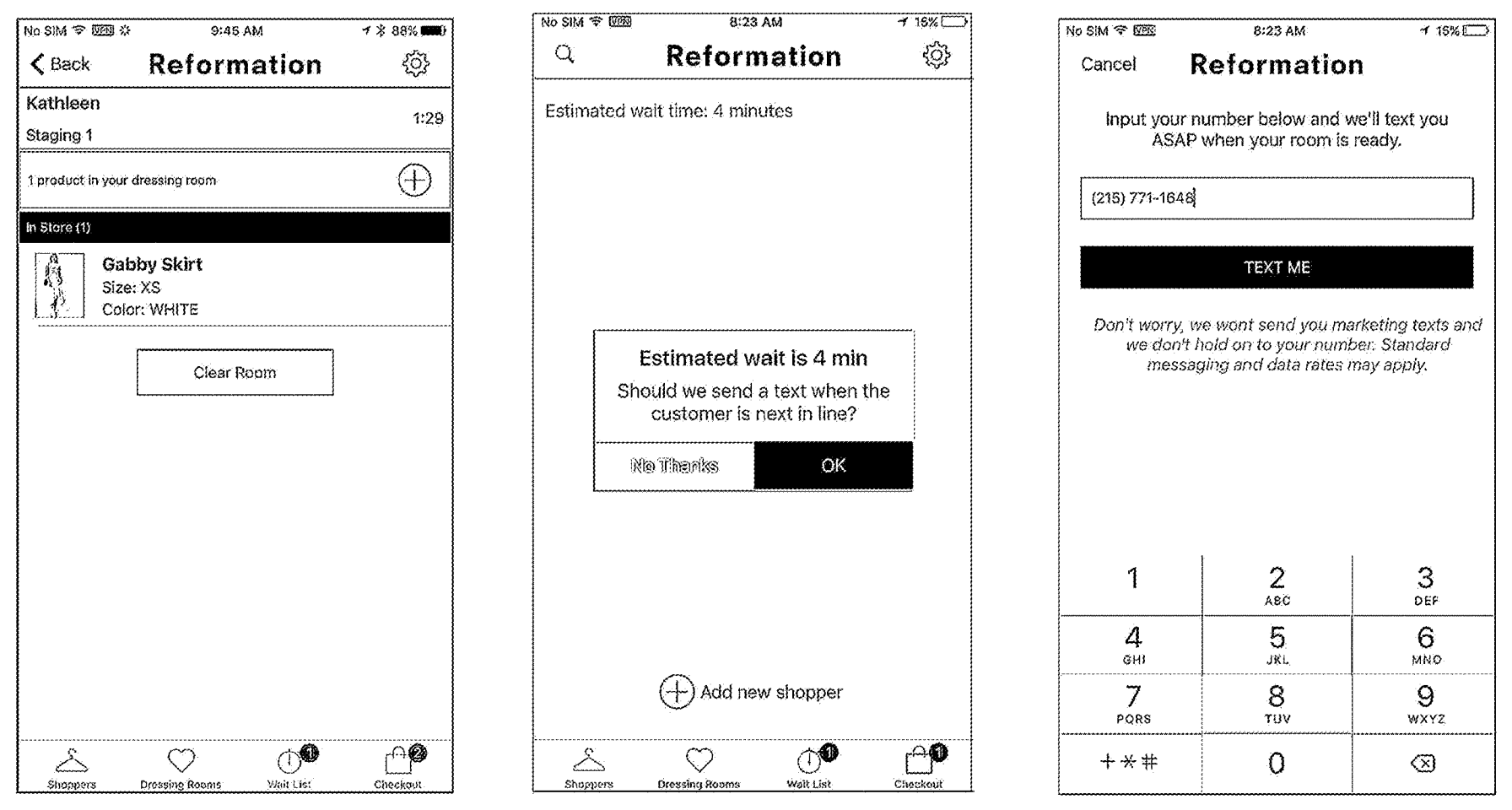
Figure 14G:
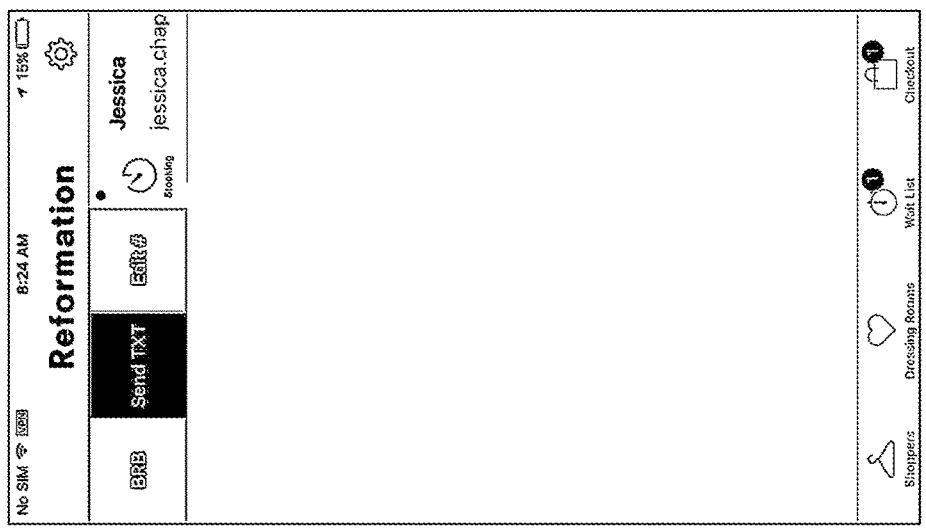

FIGS. 14A-14L are example graphical user interfaces for a concierge system (or other system) to manage the wait list according to some embodiments. FIG. 14A is a graphical user interface of a wait list tab according to some embodiments. Customers can be assigned to a wait list until the next dressing room becomes available. In some embodiments, the customers may be auto-assigned from the wait list to a dressing room when a dressing room is available, although in some embodiments they may not be, and can require a manual re-assign by the concierge system when a room frees up. The estimated wait time can display on the shopper agent in increments of 1 minute, 4 minutes, 10 minutes, 30 minutes, 1 hour, and the like. The actual waiting time can be displayed next to the estimated wait time. In some embodiments, the system can enable a user of the concierge system to select a shopper and clear them from the list, for example if the shopper has left the store.

FIG. 14B is a graphical user interface of a customer assigned to the wait list according to some embodiments. In some embodiments, the customer can be on the wait list and continue to add products to his or her fitting session. In some embodiments, the concierge agent, the wait list agent, the dressing room agent, the shopper agent, and/or the like can have an option to clear the dressing room.

FIG. 14C is a graphical user interface of a customer being assigned to the dressing room according to some embodiments. In some embodiments, when a dressing room becomes available, a customer and/or employee can swipe on the graphical user interface to reserve the room. In some embodiments, a dressing room can be assigned based on the first customer and/or employee to swipe and/or indicate desire for the dressing room. In some embodiments, the dressing room can be assigned based on an ordered list, such as the longest time waited, a higher priority customer, the number of articles of clothing reserved, a combination of various characteristics, and the like.

FIG. 14D is a graphical user interface that can be used if a customer on the wait list leaves the store according to some embodiments. In some embodiments, a customer can be on a wait list and can leave the store. In that case, the system can be configured to enable a user to click on the shopper and see the screen in FIG. 14D. The user can click on the "Clear Room" button to remove the shopper from the wait list, also optionally ending the fitting session associated with that shopper. In some embodiments, the system can be configured to remove the customer from the wait list in the event the customer leaves the store. The system can manually and/or automatically clear the customer in response to the customer leaving the store. The customer can request that the customer stay on the wait list if the customer indicates that they will return to the store.

FIG. 14E is a graphical user interface of an estimated wait time and option to text the customer according to some embodiments. For example, the system can be configured to send the customer a text message when the next dressing room is available. FIG. 14F is a graphical user interface of an option to add a phone number for wait list notification according to some embodiments. This screen may be displayed, for example, in response to a user clicking on the "OK" button of FIG. 14E. If the user clicks on the "No Thanks" button of FIG. 14E, however, then the interface of FIG. 14G may be displayed, which comprises a list of shoppers on the wait list, and can enable the user to select a shopper and add a texting number at a later time. In some embodiments, the estimated wait time for a dressing room can be displayed. In some embodiments, the graphical user interface can offer to send a text when the next dressing room is available and/or if the consumer is next-in-line for a dressing room.

Figure 14H:
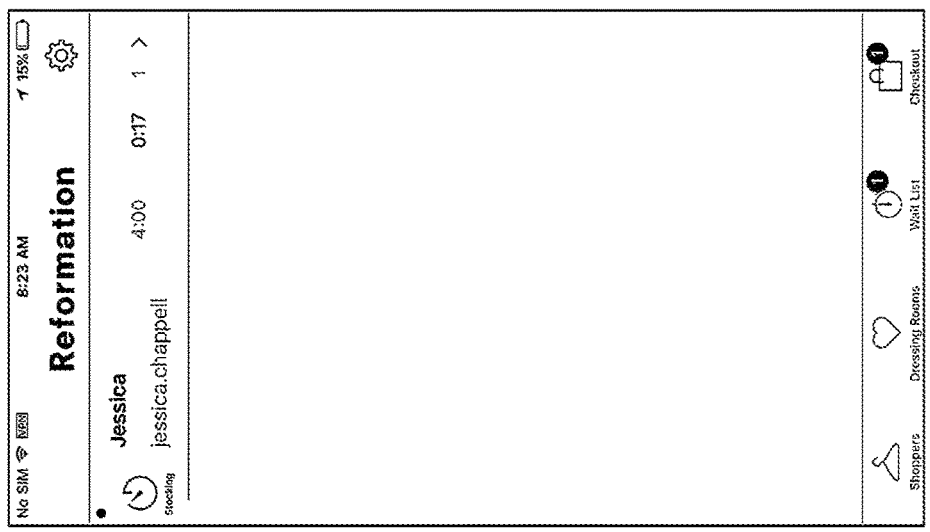
Figure 14I:
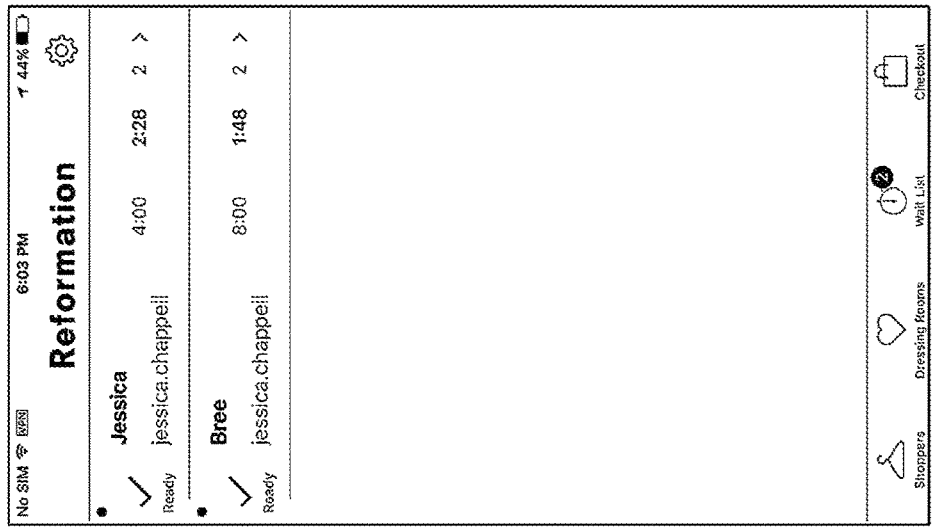
Figure 14L:
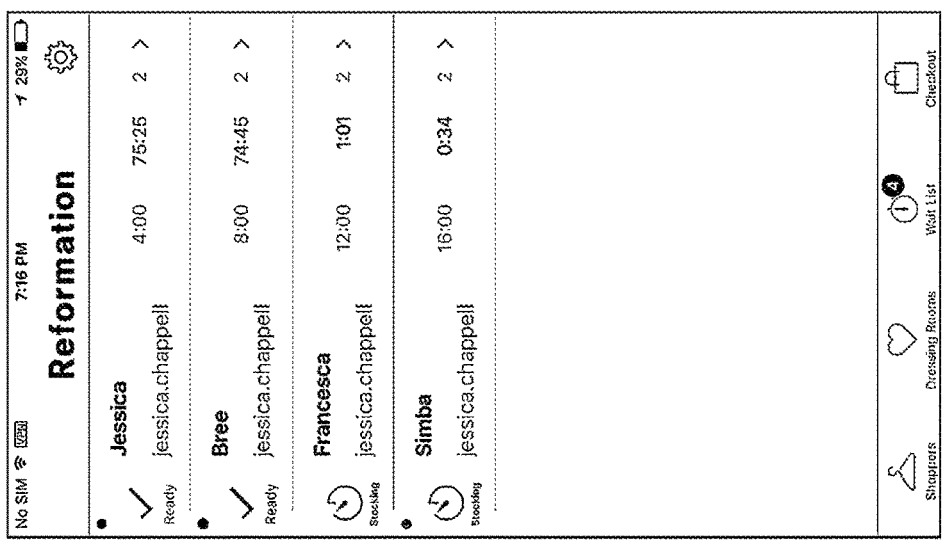

In some embodiments, a shopper on the wait list can be indicated as "in store" or "out of store" or similar. For example, if the shopper is waiting in the store, the user interface of FIG. 14H may display an indicator that the shopper is waiting in the store. FIG. 14H illustrates this with a blue dot located to the left of the shopper's name, although various other types of indicators could be used. In some embodiments, the system is configured to default to "in store" or "in real life" as the status of a shopper added to the wait list. If a shopper leaves the store while on the waiting list, the system can be configured to enable the concierge employee to indicate the shopper is no longer in the store by, for example, swiping on that shopper in the user interface, and selecting a "BRB" (standing for "be right back") button or the like. Such a button is illustrated in FIG. 14I. FIG. 14I also illustrates a "Send TXT" button, which may be used to, for example, send a text message to the customer to let them know a dressing room is available or will be available soon. In some embodiments, the graphical user interface can send a text to the consumer's phone number indicating that the customer is next-in-line for a dressing room. FIG. 14J is a graphical user interface of a text message indicating that the consumer is next-in-line according to some embodiments.

Figure 14K:
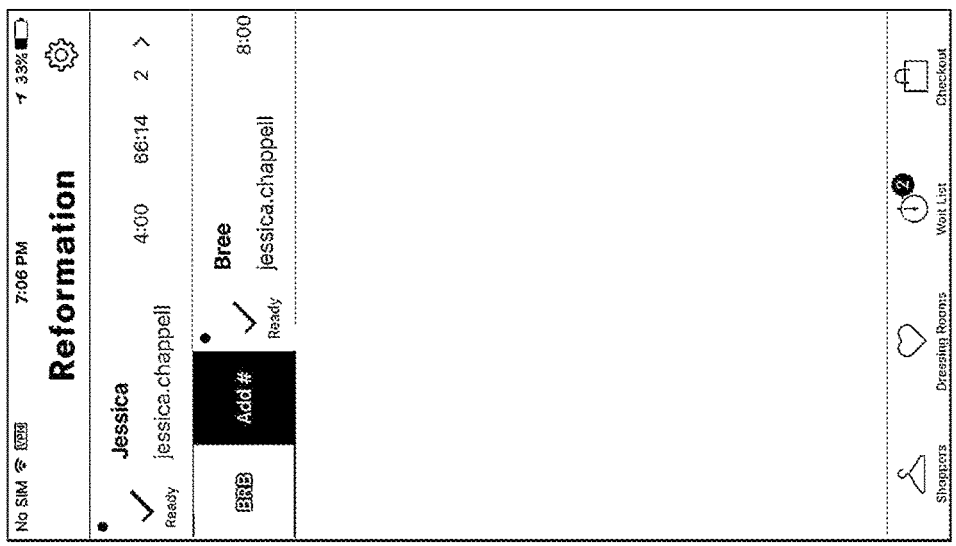
Figure 14J:
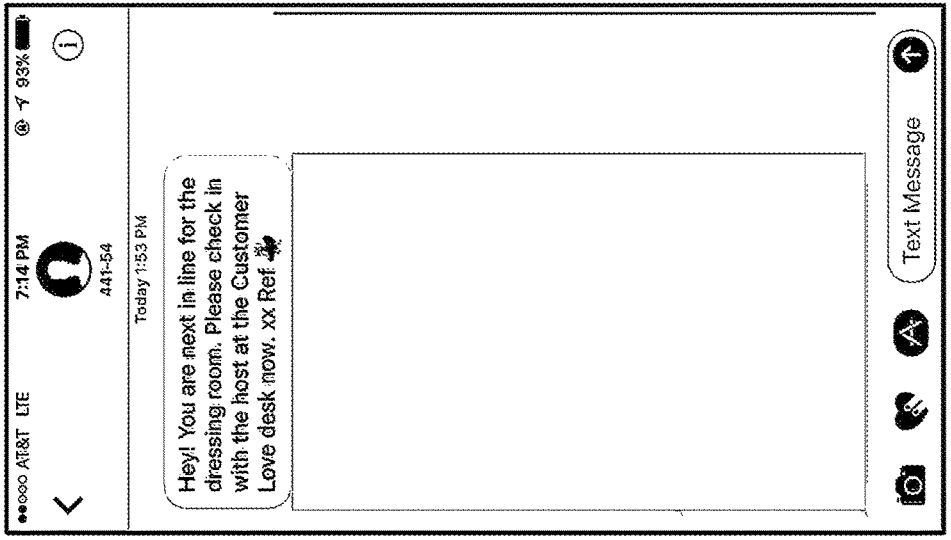

FIG. 14K is a graphical user interface of an option to add a phone number according to some embodiments. For example, if the customer had previously opted to not receive a text message, this interface can be used to add a phone number at a later time.

FIG. 14L is a graphical user interface of various statuses in the wait list according to some embodiments. In some embodiments, a blue dot can indicate that the customer is in the store waiting for a dressing room. A blue dot within an orange circle can indicate that the customer is in the store waiting for the dressing room and a text message has been sent notifying the customer. No dot can indicate that the customer stepped of the store during his or her wait for a dressing room. An orange dot can indicate that the customer stepped out while on the wait list and a text message has bene sent. Other types of indicators may also be used to indicate these various statuses.

Graphical User Interface Examples for Managing a Checkout Process

Figure 15C:
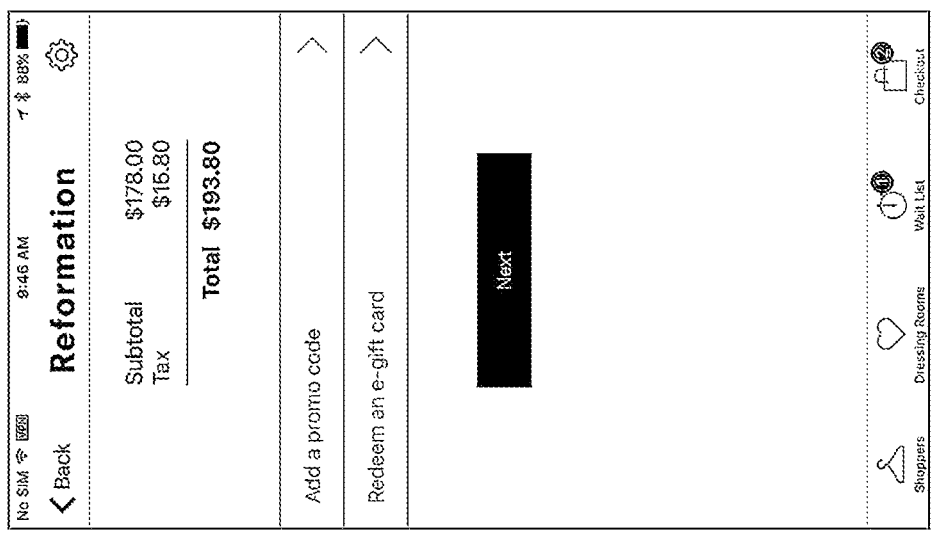
FIGS. 15A-15L are additional graphical user interfaces for a concierge user access point system according to some embodiments.
Figure 15B:
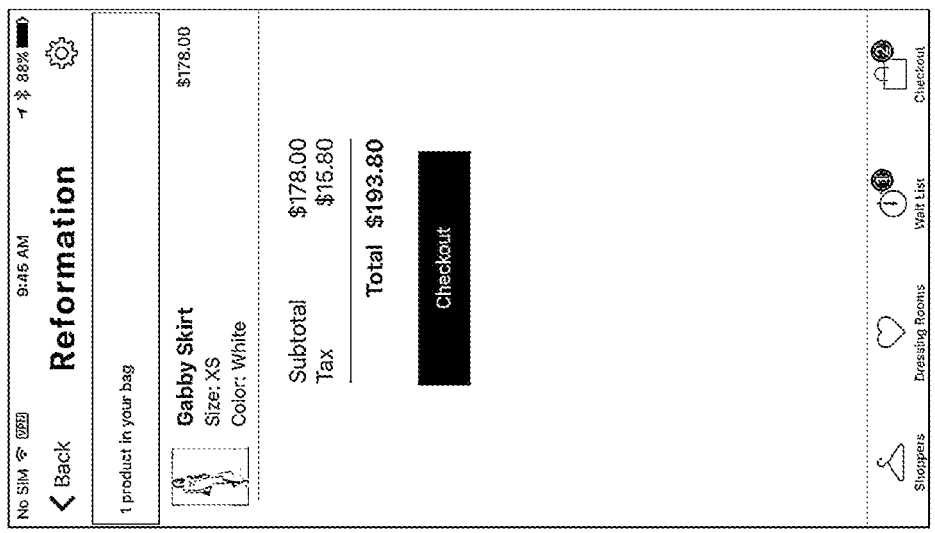
Figure 15A:
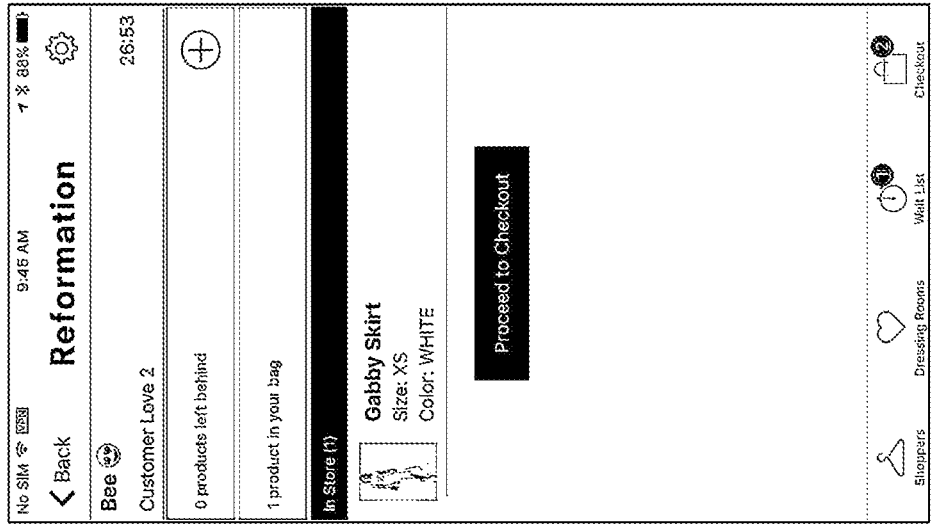

FIGS. 15A-15L are graphical user interfaces for the checkout procedure according to some embodiments. FIG. 15A is a graphical user interface for proceeding to checkout according to some embodiments. In some embodiments, the concierge agent, shopper agent, the dressing room agent, the showroom agent, and/or other agents can initiate an API call to the central server for initiating a checkout procedure.

FIG. 15B is a graphical user interface for confirming the order total according to some embodiments. The graphical user interface can display the order total, the amount of tax, the order total comprising the tax amount, and a breakdown for each item in the purchase list.

Figure 15F:
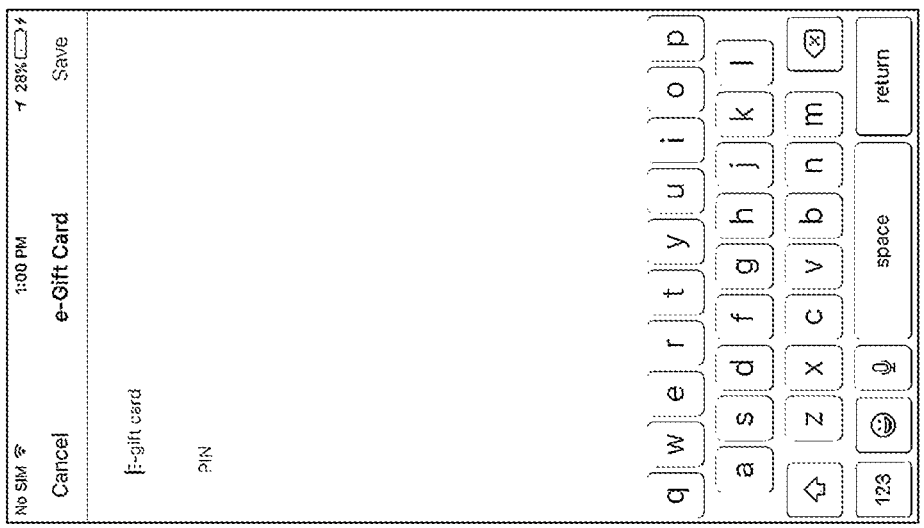

FIG. 15C is a graphical user interface for applying a discount or redeeming a gift card according to some embodiments. The graphical user interface can display the subtotal, the tax amount, and the grand total comprising the tax amount. The user can select applying a promo code and/or other discount code. The user can select redeeming an e-gift card and/or other card with monetary value. Once a user selects "add a promo code," the graphical user interface can display a modal to enter the promo code (as shown in FIG. 15D).

Figure 15E:
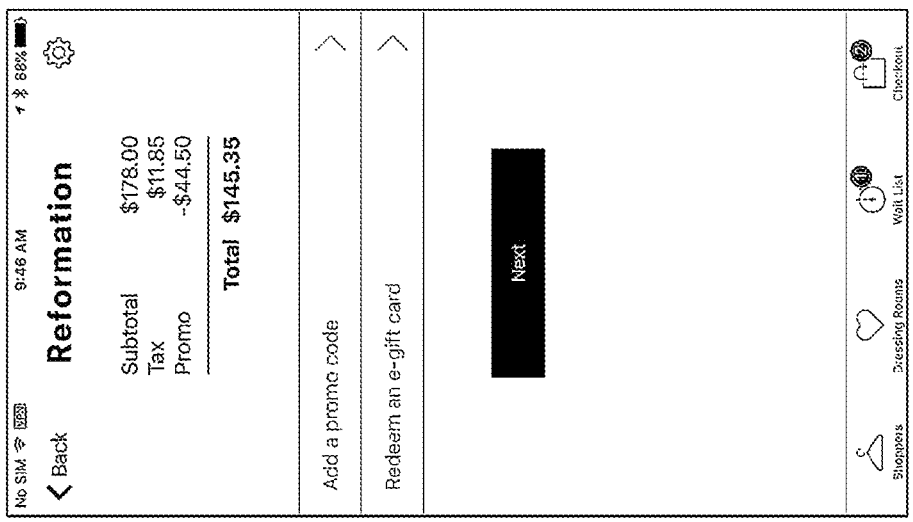
Figure 15D:
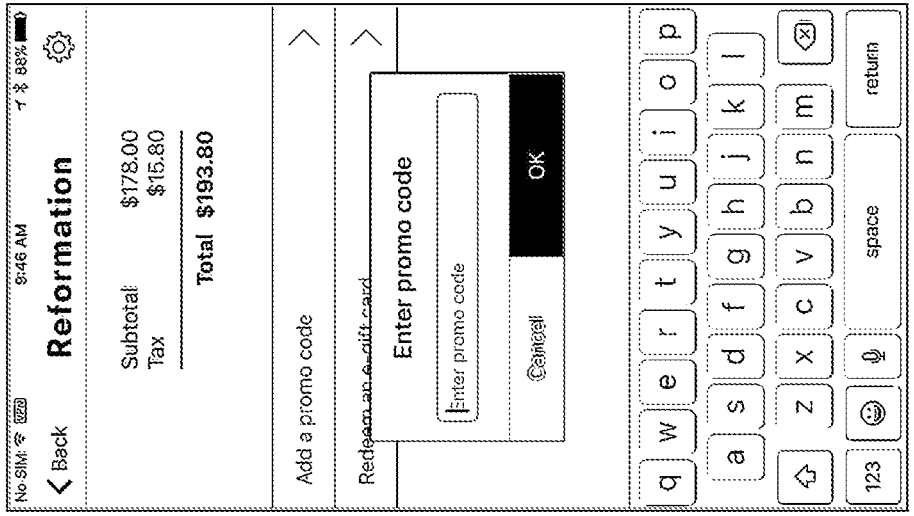
Figure 15I:
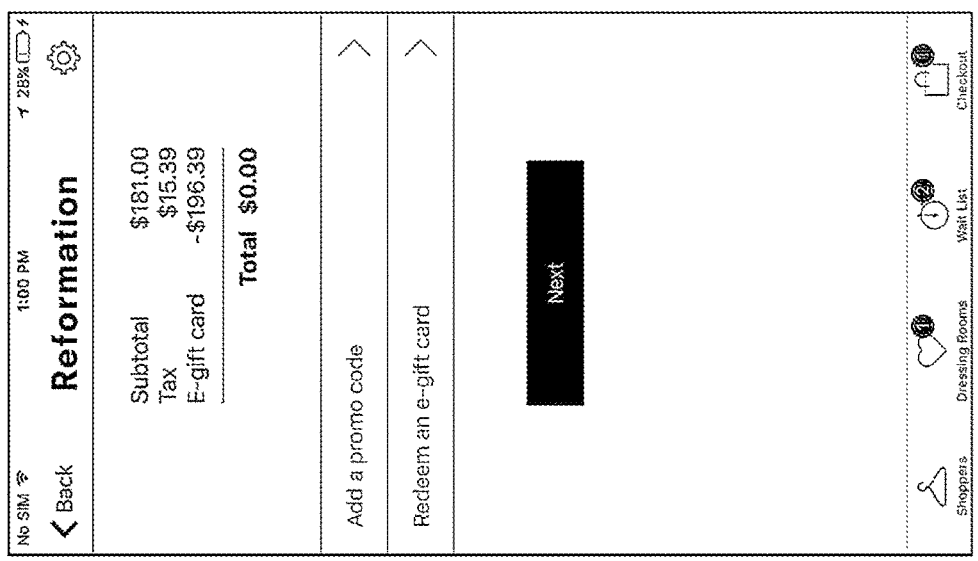
Figure 15H:
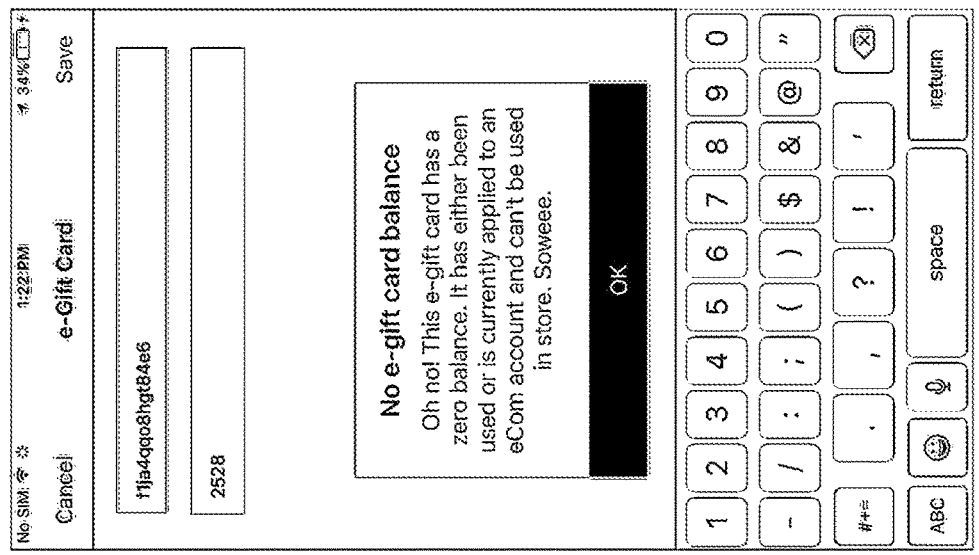
Figure 15G:
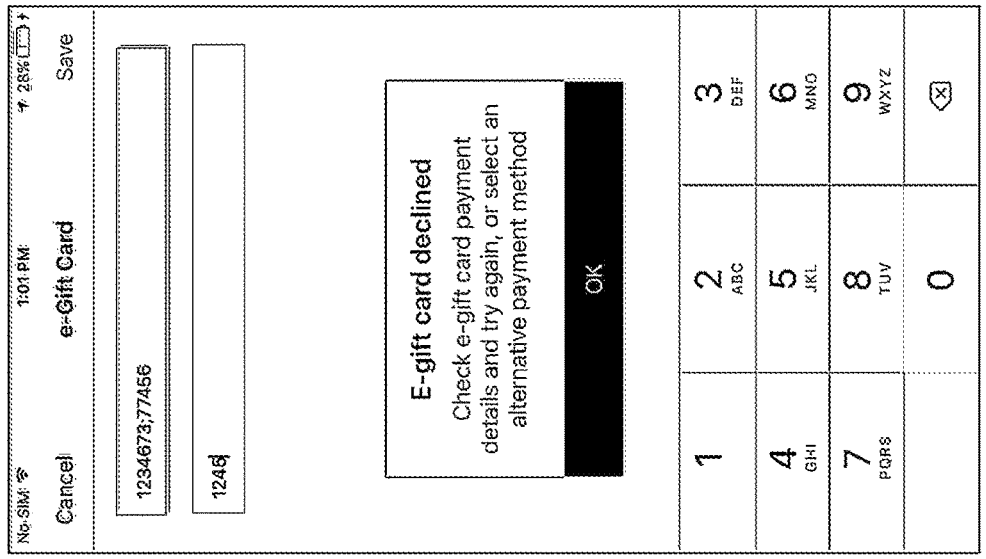

FIG. 15E is a graphical user interface of an order with a promo code applied according to some embodiments. The promo codes can be applied to a single purchase item and/or an entire purchase order. The promo code can be deducted from the subtotal and the tax. FIG. 15F is a graphical user interface of redeeming a gift card according to some embodiments. A user can select an e-gift card by entering in a number and a pin. [0192] FIG. 15G is a graphical user interface of a declined gift card according to some embodiments. The gift card can be denied if an incorrect number and pin is entered. FIG. 15H is a graphical user interface of a gift card without sufficient balance according to some embodiments. If there is no balance on the e-gift card, then the e-gift card can be completely used and now has a zero balance. In some embodiments, the e-gift card may comprise certain restrictions. For example, the e-gift card can be applied to a customer's eCommerce account and can only be used through the online account. FIG. 15I is a graphical user interface of a gift card applied to the balance according to some embodiments. The gift card can be applied to the total or a subset of the balance. If the e-gift card is successfully applied, it can be displayed before being applied. If the e-gift card does not cover the total balance, another form of payment can be received to pay for the remainder. If the e-gift card has more balance than the total amount for the purchase, then the remaining e-gift card balance can remain on the e-gift card.

Figure 15K:
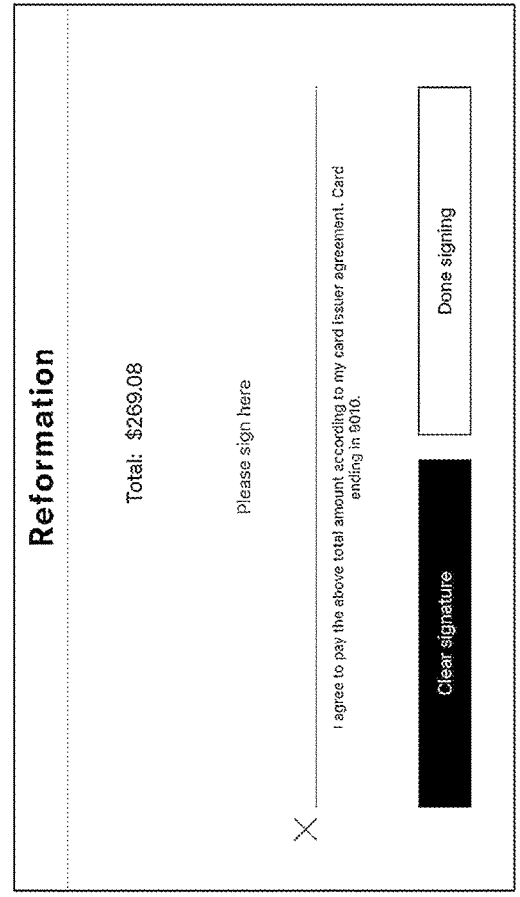
Figure 15L:
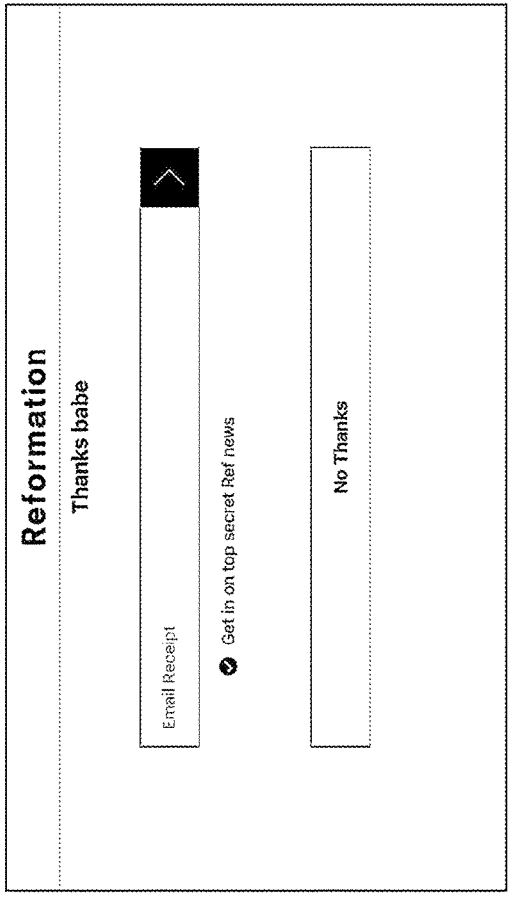
Figure 15J:
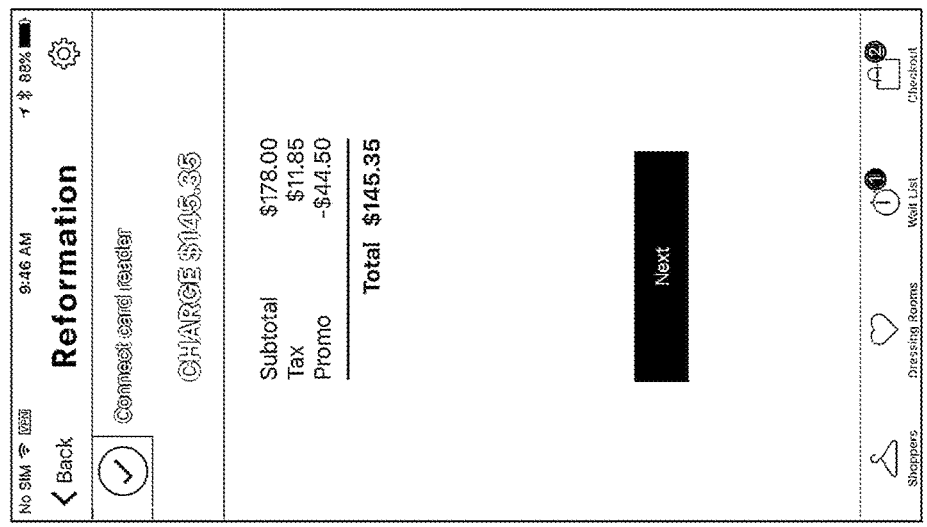

FIG. 15J is a graphical user interface of confirmed order total according to some embodiments. Once a consumer has confirmed the order total, the graphical user interface can be configured to enable the consumer to navigate to the page that requests a user to connect to a card reader. FIG. 15K is a graphical user interface for a signature page according to some embodiments. FIG. 15L is a graphical user interface for an email receipt according to some embodiments. The signature page can display the total amount that will be charged to the payment method. Once the charge is successfully performed, the consumer can enter in an email for the receipt. The email signup can be selected by default. The consumer can have the option to select "no thanks" to not receive the email receipt.

Additional Features and Options for Retail Concierge Systems for Show Room Management Many other optional features may be included in some embodiments. For example, in some embodiments, a retail concierge system can be configured to prepare for a customer arriving at the store. FIG. 16A illustrates one such example. The retail concierge system can identify a location of the customer. The location of the customer can be inputted by the user. In some embodiments, the shopper agent 170 identifies a location of the customer via locational technology, such as global positioning system (GPS) technology on a cell phone. The shopper agent 170 can transmit the current location of the customer to the retail concierge system (e.g., to the central server 102 of FIG. 1B or the main server 202 of FIG. 2C).

In some embodiments, agents can comprise an electronic device for use by a customer, a stock room or back of house employee, a concierge employee, a user-experience employee, a quality assurance employee, a checkout employee, and/or the like. The agents can comprise a display such as a welcoming display and/or an advertisement display. The agents can comprise a graphical user interface. In some embodiments, the agents can comprise fully automated and/or semi-automated robotics to perform certain functions of the retail concierge system, such as restocking inventory and/or managing a dressing room.

In some embodiments, the retail concierge system is configured to enable a user to access the retail concierge system from the shopper agent 170 and/or their own device, such as a computer or smart phone, before they arrive at the store, to allow the user to browse the inventory and/or preconfigure a dressing room or wardrobe to be ready for them when they arrive. In some embodiments, a user can request to try on an item that is not currently in stock at the store the user is closest to, but that could be delivered to that store before the user arrives at the store. For example, if a user indicates to the retail concierge system that they would like to arrive at the store at 3 PM to try on their clothes, and it is currently 1 PM, the retail concierge system can be configured to automatically display inventory to the user for selection that is not presently at the store but that the system would be able to have delivered to the store by or before the 3 PM time that the user wishes to be there.

In some embodiments, a customer can shop from the showroom floor of a retail establishment as disclosed herein using, for example, his or her smart phone, tablet computer, a smart phone or tablet computer provided by the retail establishment to the user, an interactive computing device attached to a wall of the establishment, attached to a pedestal, and/or the like. In some embodiments, the shopper agent 170 can be installed on the user's smart phone, tablet computer, smart phone, and the like.

In some embodiments, a customer can begin a new session at the store, such as by entering his or her name, email address, and/or other information on the store front agent or the showroom agent. In some embodiments, upon beginning a new session (e.g. a new fitting session) on a storefront agent or a showroom agent, the shopper agent can initiate on a user's computing device displaying the new session and/or updating information on the shopper agent of information entered into agents within the store. In some embodiments, the user can create a fitting session on the user's application. In some embodiments, the fitting session can be created via a user command on a user's application and/or an API call from the user's application to the retail concierge system.

In some embodiments, the retail concierge system can perform certain actions and/or initiate action on various systems or devices of the retail concierge system based on the location of the customer. For example, if the customer is at home and reserves an article of clothing, the retail concierge system can mark the article of clothing by a stock room agent 168 as reserved.

In some embodiments, if the customer is about to arrive at the store, the retail concierge system can retrieve a user profile for the customer. The retail concierge system can retrieve information from a user profile, such as a name, title, address, location, residence, email address, other identifiers, familial information, wish list items, shopping cart items, items previously searched or viewed, other historical information, demographic data, sex, race, economic status, age, level of education, income level and employment, psychiatric data, medical data, a personality trait, an interest, values, attitudes, lifestyles, opinions, preferences, likes and/or dislikes, predilections, purchase history, browser history, financial history, credit history, personal history, other activity data, and/or the like.

In some embodiments, the retail concierge system can perform certain actions based on the retrieved information. A storefront agent 160 (here illustrated as being at or outside of the storefront, but could also be inside the retail establishment) can enable a user to interact with the retail concierge system. For example, the storefront agent 160 can include a touch screen for the user start or continue a fitting session. A storefront agent 160 can initiate a storefront display 140 to display an item associated with the consumer and/or the shopper agent 170. For example, the consumer profile can include size 11 black sneakers in his or her shopping cart. The storefront agent 160 can initiate the display of such a black sneaker and/or other relevant or similar items such that the consumer can view an advertisement directed to the consumer is entering the store.

In some embodiments, the retail concierge system can initiate a show room agent 162 to identify whether the article of clothing of interest is available in the show room (or the staging room). For example, the retail concierge system can transmit the location of the black sneakers to a show room agent 162. The show room agent 162 can initiate a check in the store sections where the black sneakers 150 are located and check whether the black sneaker 150 is available. In some embodiments, the show room agent 162 can indicate that a consumer is approaching the store and/or that the consumer desires the black sneaker after conversing with the consumer.

In some embodiments, if the black sneaker 150 is not available in the show room, the show room agent 162 can notify the retail concierge system. The retail concierge system can update the shopper agent 170 of the unavailability of the black sneaker 150 in the show room. In some embodiments, the retail concierge system can send a signal to the stockroom agent 168 to identify whether a black sneaker 151 is available in the stock room 144. If available, the retail concierge system can inform the show room agent 162 that the stockroom agent 168 is retrieving the item from the stock room to place in the show room and/or notify the consumer of the product availability. If not available, the stockroom agent 168 can inform the retail concierge system, and the retail concierge system can notify the consumer via the shopper agent 170 that the item is unavailable at the store. The retail concierge system can communicate with agents in other stores, for example, the retail concierge system can communicate with stock room agents and/or show room agents to identify whether the item is located in other branches and/or store locations.

In some embodiments, the system can be configured to automatically assign an available dressing room 142A, 142B, 142C (collectively referred to herein as dressing room 142) to a customer and/or automatically notify one or more employees and/or the various agents within the retail concierge system as to what dressing room 142 is assigned. The retail concierge system can notify the shopper agent 170 as to what dressing room 142 is assigned for that customer. In some embodiments, the system can be configured to enable the customer to select a dressing room 142, and/or automatically cause the stock room agents 168 to initiate transport of that consumer's items to the magic wardrobe in the selected dressing room. For example, the dressing room agent 164A, 164B, 164C can send its status to the retail concierge system that two out of the three dressing rooms are available. The retail concierge system can transmit a signal to the shopper agent 170 to notify the consumer of the two available dressing rooms 142. The shopper agent 170 and/or the retail concierge system can automatically assign a dressing room and/or allow a consumer to select the dressing room 142 of choice. The shopper agent 170 can provide information on each dressing room 142 for selection, such as the room size, number of mirrors, closest dressing room 142 to current shopper agent 170 location, and the like.

In some embodiments, once the customer is in a dressing room 142, a computer device, such as a touch screen device, may be available to the customer for the customer to, for example, view what is being loaded into the magic wardrobe, view what is already in the magic wardrobe, request additional items to try on, complete a sale, and/or the like. The computer device can be a component of a dressing room agent 164 and/or the shopper agent 170.

In some embodiments, the dressing room agent 164 can comprise a port, a wireless device, and/or the like that allows the user to play his or her own music and/or videos while they are trying on clothes. In some embodiments, the system is configured to enable a user to select the music and/or videos that can be played while they are trying on clothes.

In some embodiments, a customer can reserve a dressing room 142 prior to arriving at the store and/or retail establishment. For example, the retail concierge system can be configured to enable a customer to reserve a dressing room 142 via an application on their smart phone, via text messaging, by calling an automated system, by calling an employee of the retail establishment, and/or the like.

In some embodiments, the wait list agent 166 can be configured to monitor a list of people waiting to be assigned to dressing rooms 142, who is assigned to what dressing room 142, what state each dressing room 142 is in, and/or the like. In some embodiments, the retail concierge system can be configured to notify the shopper agent 170 when a wardrobe or dressing room 142 is ready, so that the shopper agent 170 can direct a customer to the dressing room 142.

Figure 16B:
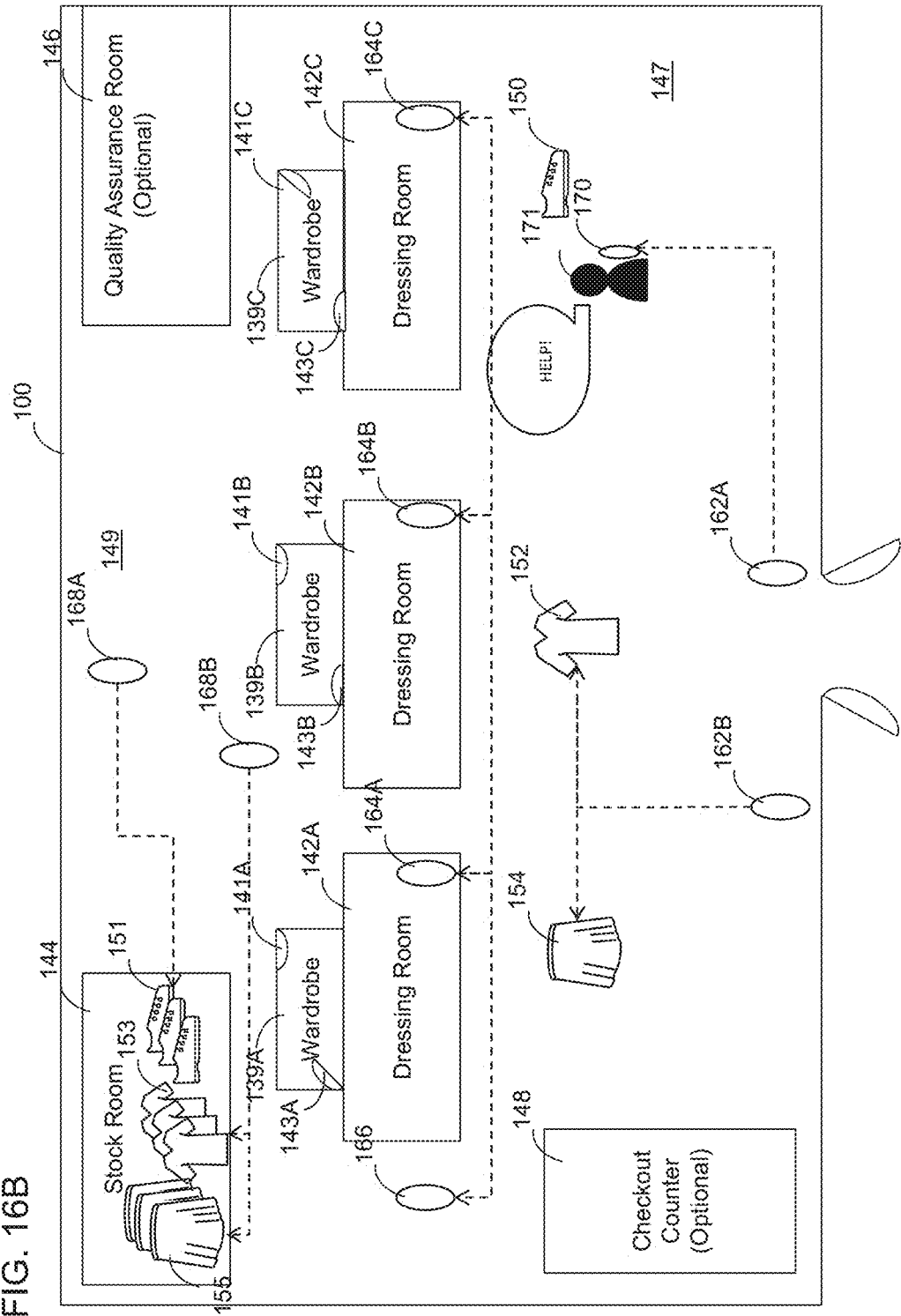
FIG. 16B is a schematic diagram illustrating a retail concierge system for a first customer requesting help and a second customer arriving at the store according to some embodiments.

In some embodiments, the retail concierge system is configured to adapt to the needs of a plurality of consumers. FIG. 16B is a schematic diagram illustrating a retail concierge system for a first customer requesting help. In some embodiments, a shopping agent 170 can indicate that a consumer is located near a particular article of clothing, such as a black sneaker 150. In some embodiments, when the customer is browsing the sample article of clothing available in the showroom, the retail concierge system can enable the shopper agent 170 to allow the customer to indicate which items for sale the customer wishes to try on. For example, the user can request an item and/or the retail concierge system can create a pull request for the inventory item. In some embodiments, the customer may be able to express these preferences by interacting with a shopper agent 170. The shopper agent 170 can comprise a computer device, such as a touch screen device located in the showroom area, the user's own computer device, such as the user's smart phone, and/or an electronic device or computer device located in another area of the retail store, such as in a dressing room area. In some embodiments, regardless of the device being used, the device can be configured to show to the customer or user a real-time inventory of what is available to try on and/or purchase. In some embodiments, the graphical user interface can display inventory in the showroom area, in the stock room, and the like.

In some embodiments, the customer can interact with the retail concierge system to build a "wardrobe" of clothing items that the user can then try on. For example, the user can interact with the retail concierge system to select a plurality of items, comprising the type of item, color, fabric, size, and/or the like. The retail concierge system can be configured to receive this information from the customer, and automatically notify a back of house system, a stockroom 144, and/or a stockroom agent 168A that the various items selected by the customer need to be placed in a dressing room for the customer to try on. In some embodiments, this automatic notification can take the form of a notification sent to a back of house employee via a stockroom agent 168A, who then gathers the required items and places them in the dressing room 142. In some embodiments, the stockroom agent 168A can display a list of pending pull requests for the retail store by getting a list of cabinets with open pull requests, and the stockroom agent 168 can indicate that the stockroom agent 168 is intending to fulfill the pull request by claiming the pull request on the stockroom agent 168. In some embodiments, the stockroom agents 168 can be configured to automatically retrieve the requested items, such as robotically, and place them in the dressing room for the customer to try on. After the stockroom agent 168A completes the pull request, the employee can input into the stockroom agent that the pull request is complete and receive confirmation receipt from the retail concierge system of the complete transmission.

In some embodiments, the retail concierge system can allow a consumer to request for help. For example, a first consumer can request for help using the shopper agent 170. The shopper agent 170 can transmit the location of the consumer to the retail concierge system and/or a show room agent 162A. The show room agent 162A can notify an employee to help the consumer. The show room agent 162A can identify a path from the location of the show room agent 162A to the consumer.

In some embodiments, the various agents of the retail concierge systems disclosed herein communicate with one or more central servers but not with one another. For example, a central server may present an API that can be communicated with by the various agents to coordinate movement of inventory, processing of sales, helping out customers, and/or the like. In some embodiments, at least some communications may be able to occur directly from one agent to another agent. For example, one agent may communicate with another agent over a wireless network, via Bluetooth communications, using NFC communications, and/or the like. Such functionality could in some embodiments, help to reduce the load on the main server and/or help to maintain a seamless user experience in instances of temporary downtime of the main server.

In some embodiments, the stockroom agent 168A can be assigned to the first consumer. The stockroom agent 168A can identify whether the desired article of clothing that the user needs help on is located in the stockroom 144. The stockroom agent 168B can be assigned to the second consumer. The stockroom agent 168B can identify whether the desired articles of clothing are in the stockroom 144, such as a skirt 155 and/or a shirt 153.

In some embodiments, the dressing room agents 164 can identify whether dressing rooms 142 are available for the first and second consumers. The dressing room agents 164 and/or the retail concierge system can transmit a signal to the shopper agents 170, 172 to indicate availability of the dressing rooms 142. The waiting list agent 166 can place the consumers and/or shopper agents 170, 172 on a wait list if there are no dressing rooms 142 available.

Figure 16C:
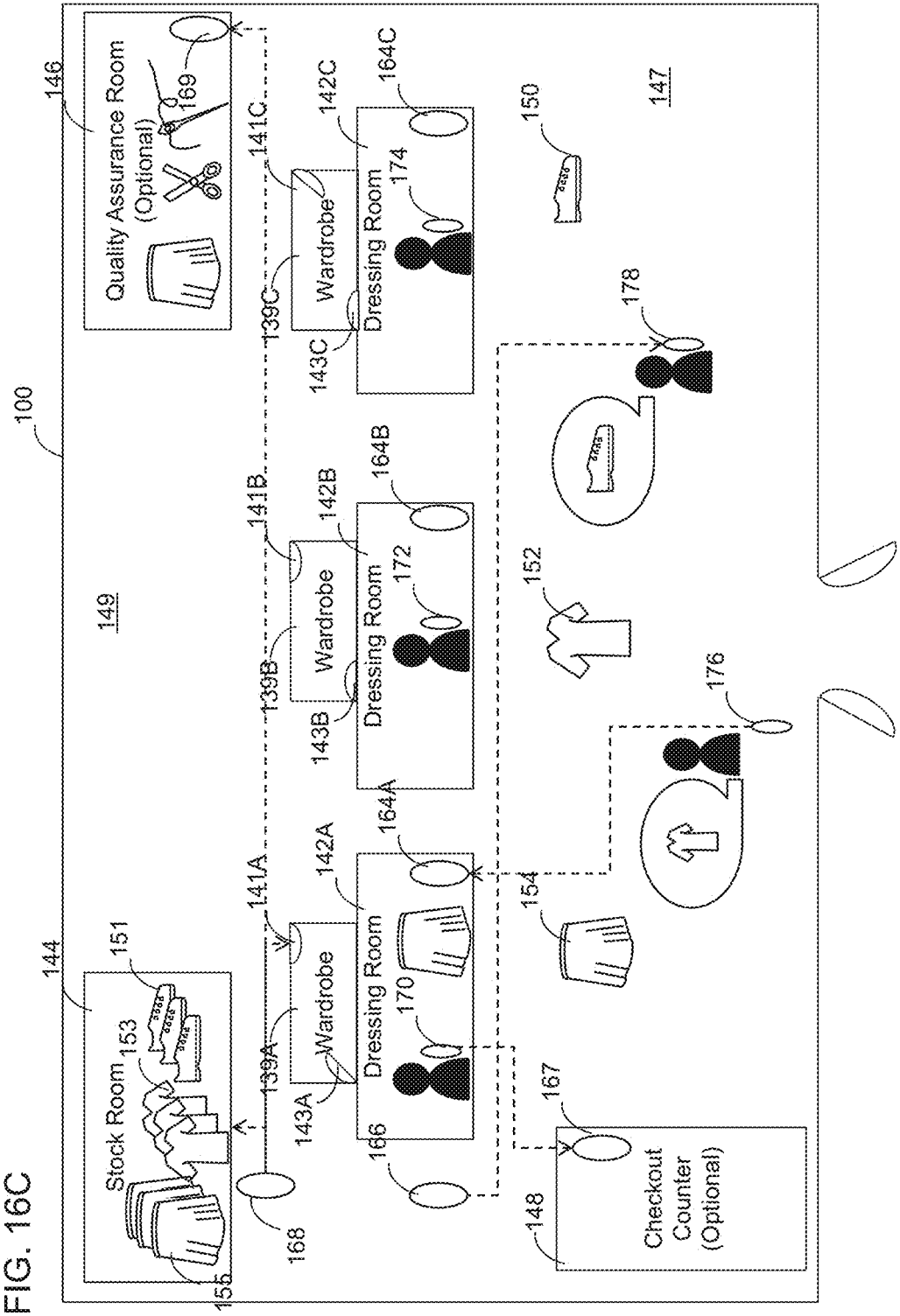
FIG. 16C is a schematic diagram illustrating a retail concierge system for dressing room management according to some embodiments.

Additional Features and Options for Retail Concierge Systems for Dressing Room Management In some embodiments, the dressing room agents 164 (and/or the central server or other user access point systems) can determine whether there are dressing rooms 142 available. In some embodiments, a waiting list agent 166 (and/or the central server or other use access point systems) can place users on a wait list. FIG. 16C is a block diagram illustrating a retail concierge system for dressing room management according to some embodiments. For example, the store can comprise three dressing rooms 142A, 142B, 142C (collectively referred to herein as dressing room 142). The dressing room agents 164 can identify shopper agents 170, 172, and 174 in the dressing rooms 142. The wait list agent 166 can place the consumers associated with shopper agents 176 and 178 on a wait list. It should be noted that, although this embodiment includes shopper agents, various other embodiments may not use shopper agents, and any interaction of the customer with the system may be via the dressing room agents 164 and/or showroom agents 162.

In some embodiments, the dressing room 142 that the customer uses to try on the plurality of items can comprise a temporary product storage area, product transition area, or the like, sometimes referred to herein as a magic wardrobe (e.g., 139A, 139B, 139C). The temporary product storage area, or magic wardrobe, may comprise, for example, an opening or access point accessible to the user in the dressing room via a hinged door, sliding door, curtain, and/or the like (e.g., 143A, 143B, 143C). In some embodiments, the temporary product storage area may have at least two access points, with one access point being into the dressing room for the customer to use, and a second access point being into the inventory or back of house area (e.g., 141A, 141B, 141C), such as for an inventory or back of house employee to use to stock the temporary product storage area and/or to retrieve goods from the temporary product storage area that are no longer needed by the customer. For dressing rooms 142B and 142C, the access point for the stock room agent 168 can be closed such that the stock room agent 168 does not have access to the dressing rooms 142B and 142C.

In some embodiments, the dressing room agent 164A can identify when a consumer is done with a dressing room 142A. In some embodiments, the retail concierge system can be configured to automatically determine when a dressing room is done being used by a customer and needs to be cleared out and/or cleaned for use by the next customer. For example, the retail concierge system can transmit a request to clear the remaining hangers (individual inventory items may in some embodiments be referred to as a "hanger," which may also be represented as an object in computer code, such as a JSON object). The retail concierge system can generate pull requests for the inventory in the dressing room to be moved to a different location, such as to the stock room and/or to quality assurance. The stockroom agents and/or the quality assurance agents can identify the pull requests, claim the pull requests, and transmit a notification that the pull requests have been complete. In some embodiments, this automatic determination is based on, for example, a checkout process having been completed, a motion detector sensing no motion for a predetermined amount of time in the dressing room, a concierge notifying the system via the concierge's electronic device that the wardroom or dressing room is clear, and/or the like.

In some embodiments, when the customer is done using the dressing room 142A, the stockroom agent 168 receives access to the dressing room 142A. In some embodiments, once a dressing room is done being used by a customer, the retail concierge system can be configured to notify an inventory employee and/or an automated system to retrieve any items from the dressing room and deliver them to a quality assurance or QA area (e.g., via a pull request that can be claimed by the stockroom agent 168). The stockroom agent 168 can clear the items in the dressing room 142A. The stockroom agent 168 can initiate action to place the items in quality assurance ("QA"). The quality assurance agent 169 (or other user access point system) can coordinate performance of quality assurance and initiate appropriate actions to take based on the quality of the article of clothing. For example, if the quality assurance system 146 determines that the article of clothing is in good condition, the quality assurance agent 169 can transmit an indication to the stockroom agent 168 to restock the article of clothing (e.g., via a pull request). At the QA area, the items can be prepped for trying on by a new customer, such as by cleaning the items, folding the items, inspecting the items for any defects that may have been introduced in the dressing room, and/or the like.

In some embodiments, the consumer can indicate on the shopper agent 170 (or other user access point system, such as a dressing room system 164) that the consumer would like to purchase the one or more articles of clothing. It should be noted that, in this and other embodiments disclosed herein, where it is referred to that a consumer or user can interact with the system using the shopper agent 170, it is also contemplated that the user could interact with the system to perform the same or similar functions using other agents, such as the dressing room agent 164, showroom agent 162, and/or the like. The checkout or concierge agent 167 can be notified that the consumer would like to make a purchase. The concierge agent 167 can initiate checkout procedures, such as receiving payment methods, discounts, coupons, promotional offers, and the like. The concierge agent 167 can perform checkout procedures at a checkout counter 148 or at any other location. In some embodiments, the checkout process can occur without a checkout counter. For example, a payment or checkout system can be incorporated into or used by the shopping agent 170, the dressing room agent 164 located in the dressing room, a show room agent 162, an electronic device located elsewhere in the customer accessible areas of the retail store, the central server, and/or the customer's own electronic device. In some embodiments, the concierge agent 167 receives fitting session details and/or completes the checkout transaction with the user.

In some embodiments, the dressing room agent 164A indicates to the retail concierge system, the waiting list agent 166, and/or the shopper agent 176 that the dressing room 142A is and/or will become available soon. The stockroom agent 168 can be notified of the next customer to use the dressing room 142A. The consumer can already have a list of items entered into the shopper agent 176 such that the stock room 168 is identifying such items and placing them into the dressing room 142 for the consumer associated with the shopper agent 176.

In some embodiments, the system can be configured to alert a customer and/or employee of the retail establishment that a dressing room is ready, that an order is ready, and/or the like. The alert can be transmitted when the user is in the retail store and/or when the user is not presently at the establishment. For example, the system may be configured to send notifications to users and/or employees via text messaging, email, notifications delivered to an app on a user's smart phone or other portable computing device, via a wireless portable device specifically designed to issue notifications, similar to those used in restaurants, a pager device, and/or the like.

In some embodiments, while a user is building their wardrobe or dressing room, for example if they are in the showroom area and adding items to the list of items they would like to try on, the system may wait until the customer indicates they are ready to try everything on before the system notifies the inventory system or back of house system to place the items in the user's magic wardrobe. In other embodiments, the system may be configured to at least partially begin collecting inventory items and/or filling the magic wardrobe while of the user is still in the process of selecting more items to try on.

In some embodiments, the system can be configured to notify customers and/or employees when items need to be added to the temporary product storage area, when items need to be removed from the temporary product storage area, and/or the like. In some embodiments, the access points to the temporary product storage area can be automatically lockable and unlockable. For example, the access point between the temporary product storage area and the inventory area may be configured to automatically be locked when a customer is in the dressing room to try clothes on and is not in need of additional items. As another example, the access point to the dressing room area from the temporary product storage area may be configured to be automatically locked when items are being added to or removed from the temporary product storage area. Such features can have safety and privacy benefits. For example, keeping the access point to the inventory area locked when the customer is trying on goods can help to ensure privacy and to make sure that a back of house employee does not accidentally open the temporary product storage area when the customer may be in a state of undress. Another benefit is that while items are being added to and/or removed from the temporary product storage area, it may be desirable to not allow the customer access to that area. This may be for safety reasons, such as particularly if the system is automated and items are being added or removed robotically. Further, not allowing the customer to see the clothing being added or removed can enhance the customer experience, and make the temporary product storage area seem more like a "magic" wardrobe.

In some embodiments, the waiting list agent 166 can receive a notification that the consumer associated with the shopping agent 176 is assigned to the dressing room 142A. The waiting list agent 166 can remove the consumer from the waiting list. The waiting list agent 166 can identify the consumer that is next-in-line for a dressing room, and/or can send a notification to the shopping agents 178 of an updated status in the waiting list for a dressing room.

In some embodiments, the retail concierge system may be configured to cause audio and/or visual indicators to indicate to a user when the magic wardrobe is ready for them to open, or the like. For example, in some embodiments, the retail concierge system can be configured to play a knocking sound when the wardrobe has been filled with clothes and is ready for the user to try the clothes on. As another example, the retail concierge system may be configured to use voice commands to instruct to the customer on what they should do.

Retail Concierge System for Dressing Room Help

In some embodiments, the retail concierge system can be configured to notify a stockroom agent 168 (or concierge agent 167) when a customer already in a dressing room needs help. In some embodiments, the shopping agent 170 and/or the dressing room agent 164A available to the customer in the dressing room can comprise functionality, such as a help button, that instructs the system to notify the concierge that the customer needs help.

Figure 16D:
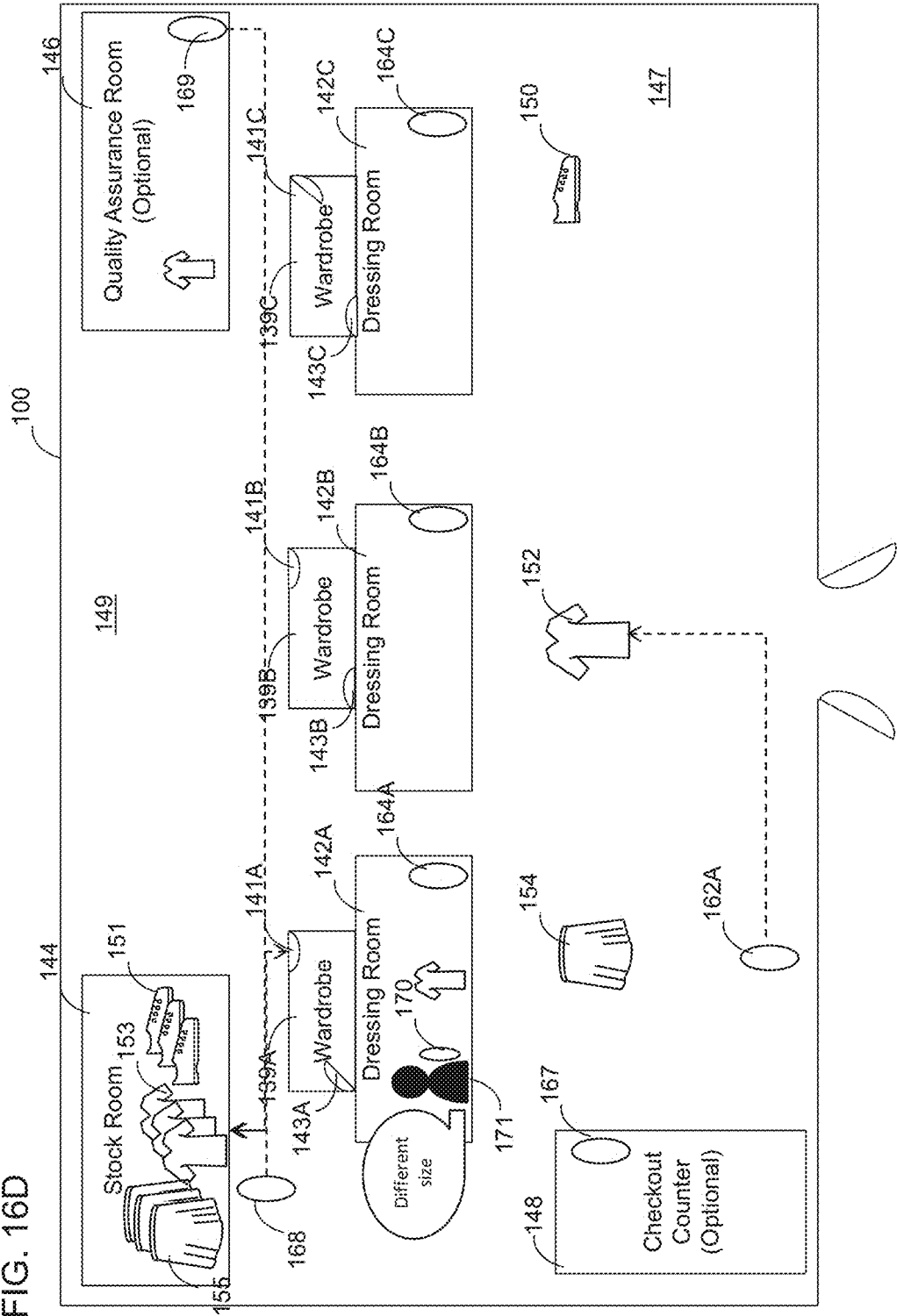
FIG. 16D is a schematic diagram illustrating a retail concierge system for a customer requesting a different size according to some embodiments.

FIG. 16D is a schematic diagram illustrating a retail concierge system for a customer requesting a different size according to some embodiments. In some embodiments, the consumer can request a different size via the shopping agent 170 and/or the dressing room agent 164A. The stockroom agent 168 can be notified of the request for a different size and can initiate a search in the stock room 144 for the appropriate size. In some embodiments, the show room agent 162 can be notified of the request for a different size. The show room agent 162 can initiate a search for the correct size in the show room. Upon identification of the appropriate sized article of clothing, the shopper agent 170 and/or the dressing room agent 164 can be notified that the article of clothing is found.

In some embodiments, if the stockroom agent 168 identifies the correct size for the article of clothing, the stockroom agent 168 can transmit a signal to the show room agent 162 that the appropriate size has been found and the show room agent 162 can stop the search for the item.

In some embodiments, if the show room agent 162A identifies the correct size for the article of clothing, the stockroom agent 168 can continue to look for the appropriate sized article of clothing. If the appropriate sized article of clothing is found in the stock room 144, the stock room agent 168 can notify the show room agent 162 that the stockroom 144 had the correct size and that the show room agent 162 does not have to initiate transport of the correctly sized article of clothing to the dressing room. If the appropriate sized article of clothing is not found in the stock room 144, the show room agent 162A can initiate delivery of the article of clothing to the dressing room 142A and/or the stockroom agent 168 can identify a similar or different sized article of clothing to replace the item identified by the show room agent 162A in the show room. In some embodiments, the quality assurance agent 169 can initiate a check on whether the desired item is currently in repair.

In some embodiments, the consumer can interact with the retail concierge system to request certain items, comprising a different color, a different fabric, a different size, a different article of clothing, a service such as fitting, a request for an opinion, a different fit, a different maker and/or brand, a different article of clothing than the one in the dressing room, and/or the like.

Retail Concierge System for Quality Assurance

Figure 16E:
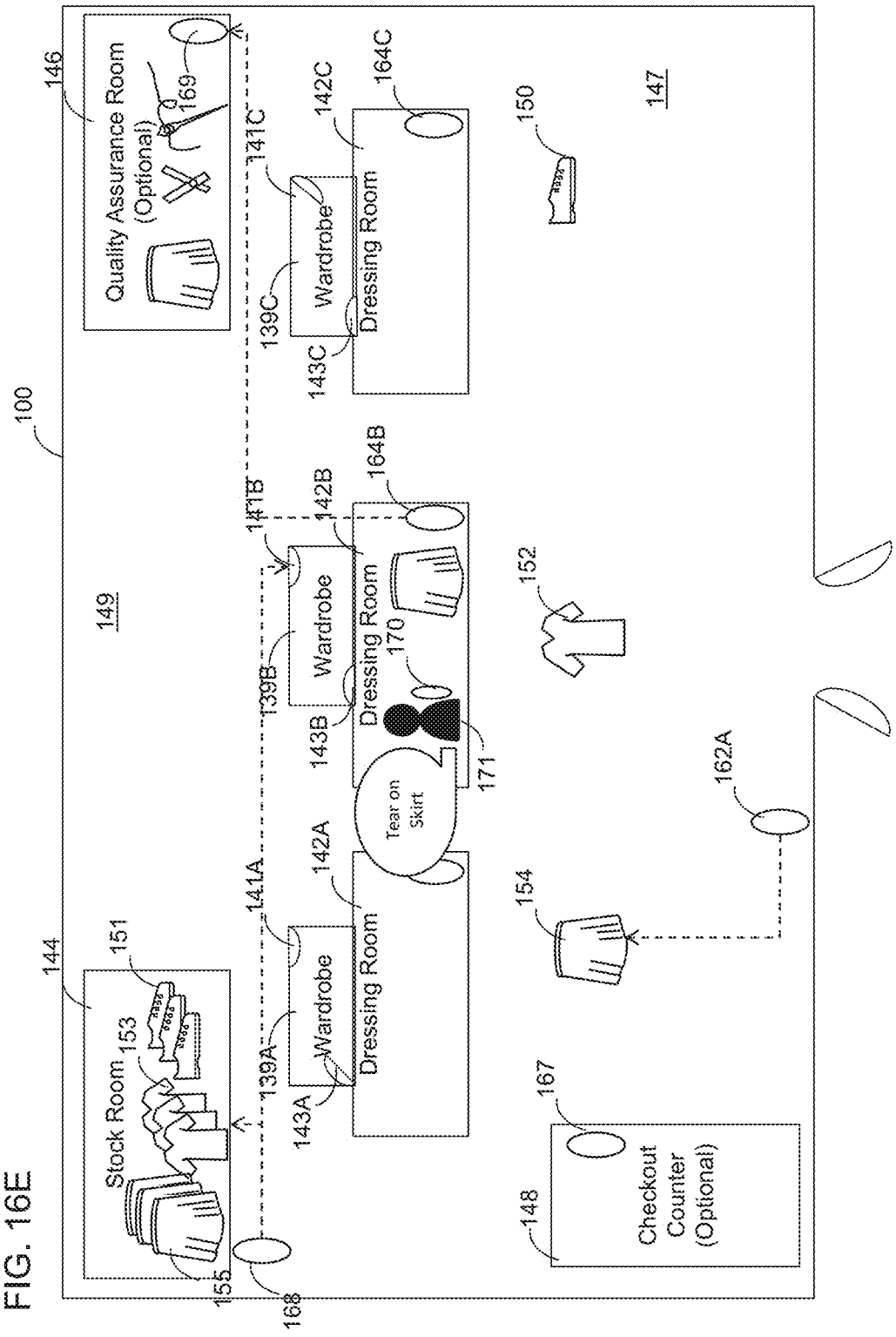
FIG. 16E is a schematic diagram illustrating a retail concierge system for a customer identifying a tear on a skirt according to some embodiments.

In some embodiments, the retail concierge system can perform quality assurance on an article of clothing. FIG. 16E is a block diagram illustrating a retail concierge system for a customer identifying a tear on a skirt according to some embodiments. The retail concierge system can perform quality assurance on articles of clothing identified by a user operating a show room agent 162 while looking through articles of clothing in the show room. The retail concierge system can cause performance of quality assurance on articles of clothing identified by a user of a dressing room agent 164 after a consumer tries on the article of clothing. The retail concierge system can cause performance of quality assurance on articles of clothing identified by a user of a stock room agent 168 when transporting the article of clothing to various systems and/or rooms. The retail concierge system can cause performance of quality assurance on articles of clothing identified by a user of a concierge or checkout agent 167 while performing the checkout procedure. The retail concierge system can cause performance of quality assurance on articles of clothing identified by a consumer.

In some embodiments, the consumer can identify quality assurance for an article of clothing. For example, the consumer can identify a tear on a skirt and indicate the tear on the shopper agent 170 and/or the dressing room agent 164B. The quality assurance agent 169 (or other user access point system) can be notified to pick up the item for repair at the quality assurance room 146. In some embodiments, the stockroom agent 168 can initiate a search in the stock room 144 to identify whether a replacement article of clothing can be found and delivered to the dressing room 142B. In some embodiments, the show room agent 162A can initiate a search on the show room to identify a replacement article of clothing for the consumer to try on instead of having to wait for the quality assurance agent to complete the repair.

In some embodiments, the consumer can request fitting or tailoring via the shopper agent 170 and/or the dressing room agent 164B to be performed by the quality assurance agent 169. The quality assurance agent 169 can receive the tailoring that needs to be done by the quality assurance room.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

What is claimed is:

1. A physical retail establishment system for enabling a dynamic in-person shopping experience, the physical retail establishment system comprising:
   a physical retail establishment comprising a showroom area, a stockroom area, a dressing room area, and a wardrobe,
   the wardrobe comprising a first door that separates the wardrobe from the dressing room area, and a second door that separates the wardrobe from the stockroom area;
   a first electronically controllable lock for selectively locking the first door;
   a second electronically controllable lock for selectively locking the second door;
   an electronic lock controller in electronic communication with the first and second electronically controllable locks to control whether the first and second electronically controllable locks are in a locked state or an unlocked state;
   a plurality of user access point systems located at the retail establishment, the plurality of user access point systems each comprising an electronic display configured to present an interactive graphical user interface,
   the plurality of user access point systems comprising at least a showroom system located in the showroom area, a dressing room system located in the dressing room area, a portable concierge system, and a portable stockroom system;
   a central server comprising one or more electronic databases configured to store data related to physical inventory of the retail establishment and to store data related to individual unique fitting sessions associated with the retail establishment,
   the central server configured to present an API over a computer network to the plurality of user access point systems, the API comprising a plurality of endpoints that enable the plurality of user access point systems to create and manage the unique fitting sessions,
   wherein the plurality of user access point systems and the central server each comprise one or more computer readable storage devices configured to store a plurality of computer executable instructions; and one or more hardware computer processors in communication with the one or more computer readable storage devices and configured to execute the plurality of computer executable instructions in order to:
   present to a first user, by the electronic display of the showroom system, an interactive graphical user interface that enables the first user to input user identifying information and to electronically browse the physical inventory of the retail establishment;
   transmit, from the showroom system to the central server, a first API request to create a new unique fitting session, the first API request comprising at least the user identifying information;
   transmit, from the central server to the showroom system, an identifier associated with the unique fitting session;
   transmit, from the showroom system to the central server, a second API request to add one or more inventory items to the unique fitting session, the second API request comprising at least the identifier associated with the unique fitting session and one or more identifiers associated with the one or more inventory items;
   generate, by the central server, a pull request associated with the unique fitting session, the one or more inventory items, and the wardrobe;
   access, by the stockroom system, the pull request;
   present to a second user, by the electronic display of the stockroom system, an interactive graphical user interface that enables the second user to view an action associated with the pull request, the action comprising at least transporting of the one or more inventory items from the stockroom area to the wardrobe, and to indicate that the action has been completed;
   transmit, from the stockroom system to the central server, a third API request comprising data indicating the pull request has been completed;
   transmit, from the central server to the concierge system, responsive to the central server receiving the third API request, a notification comprising data indicating the dressing room system is ready for the first user;
   transmit, from the central server to the dressing room system, data associated with the unique fitting session;
   present to the first user, by the electronic display of the dressing room system, an interactive graphical user interface that enables the first user to view electronic images associated with the one or more inventory items that are located in the wardrobe,
   wherein the electronic lock controller is configured to, responsive to detecting the first door of the wardrobe has been opened, control the second electronically controllable lock to keep the second electronically controllable lock in the locked state at least until the electronic lock controller detects the first door has been closed; and initiate, by the dressing room system or the concierge system, a checkout process to enable the first user to purchase one or more of the one or more inventory items.

2. The physical retail establishment system of claim 1, wherein the one or more hardware computer processors are further configured to execute the plurality of computer executable instructions in order to:
generate, by the central server, a second pull request associated with any of the one or more inventory items that were not purchased by the first user;
access, by the stockroom system, the second pull request;
present to the second user, by the electronic display of the stockroom system, an interactive graphical user interface that enables the second user to view a second action associated with the second pull request, the second action comprising at least transporting of the any of the one or more inventory items that were not purchased by the first user from the wardrobe to the stockroom area, and to indicate that the second action has been completed; and
transmit, from the stockroom agent to the central server, a fourth API request comprising data indicating the second pull request has been completed.

3. The physical retail establishment system of claim 2, wherein the one or more hardware computer processors are further configured to execute the plurality of computer executable instructions in order to:
disable, by the central server, association of any of the one or more inventory items with a second unique fitting session until at least the second pull request has been completed.

4. The physical retail establishment system of claim 1, wherein the central server is located in the physical retail establishment.

5. The physical retail establishment system of claim 1, wherein the central server is located remotely from the physical retail establishment.

6. The physical retail establishment system of claim 1, wherein the physical retail establishment comprises a plurality of dressing room areas, and at least one wardrobe associated with each of the plurality of dressing room areas.

7. The physical retail establishment system of claim 1, wherein the stockroom system comprises a tablet computer coupled to a band that is configured to attach to a forearm of the second user.

8. The physical retail establishment system of claim 1, wherein the stockroom area comprises at least one room and at least one hallway.

9. The physical retail establishment system of claim 1, wherein the electronic lock controller is controllable by one or more of the central server or the plurality of user access point systems.

10. The physical retail establishment system of claim 1, wherein the electronic lock controller is not controllable by one or more of the central server or the plurality of user access point systems.

11. A physical retail establishment system for enabling a dynamic in-person shopping experience, the physical retail establishment system comprising:
a plurality of user access point systems configured to be located at a retail establishment, the retail establishment comprising a showroom area, a stockroom area, a dressing room area, and a wardrobe, the wardrobe comprising a first door that separates the wardrobe from the dressing room area, and a second door that separates the wardrobe from the stockroom area,
the plurality of user access point systems each comprising an electronic display configured to present an interactive graphical user interface,
the plurality of user access point systems comprising at least a showroom system configured to be located in the showroom area, a dressing room system configured to be located in the dressing room area, a portable concierge system, and a portable stockroom system,
the wardrobe comprising a first electronically controllable lock for selectively locking the first door, and a second electronically controllable lock for selectively locking the second door, wherein the first and second electronically controllable locks are in electronic communication with an electronic lock controller to control whether the first and second electronically controllable locks are in a locked state or an unlocked state;
a central server comprising one or more electronic databases configured to store data related to physical inventory of the retail establishment and to store data related to individual unique fitting sessions associated with the retail establishment,
the central server configured to present an API over a computer network to the plurality of user access point systems, the API comprising a plurality of endpoints that enable the plurality of user access point systems to create and manage the unique fitting sessions,
wherein the plurality of user access point systems and the central server each comprise one or more computer readable storage devices configured to store a plurality of computer executable instructions; and one or more hardware computer processors in communication with the one or more computer readable storage devices and configured to execute the plurality of computer executable instructions in order to:
present to a first user, by the electronic display of the showroom system, an interactive graphical user interface that enables the first user to input user identifying information and to electronically browse the physical inventory of the retail establishment;
transmit, from the showroom system to the central server, a first API request to create a new unique fitting session, the first API request comprising at least the user identifying information;
transmit, from the central server to the showroom system, an identifier associated with the unique fitting session;
transmit, from the showroom system to the central server, a second API request to add one or more inventory items to the unique fitting session,
the second API request comprising at least the identifier associated with the unique fitting session and one or more identifiers associated with the one or more inventory items;
generate, by the central server, a pull request associated with the unique fitting session, the one or more inventory items, and the wardrobe;
access, by the stockroom system, the pull request;
present to a second user, by the electronic display of the stockroom system, an interactive graphical user interface that enables the second user to view an action associated with the pull request, the action comprising at least transporting of the one or more inventory items from the stockroom area to the wardrobe, and to indicate that the action has been completed;

transmit, from the stockroom system to the central server, a third API request comprising data indicating the pull request has been completed;

transmit, from the central server to the concierge system, responsive to the central server receiving the third API request, a notification comprising data indicating the dressing room system is ready for the first user;

transmit, from the central server to the dressing room system, data associated with the unique fitting session;

present to the first user, by the electronic display of the dressing room system, an interactive graphical user interface that enables the first user to view electronic images associated with the one or more inventory items that are located in the wardrobe, wherein the electronic lock controller is configured to, responsive to detecting the first door of the wardrobe has been opened, control the second electronically controllable lock to keep the second electronically controllable lock in the locked state at least until the electronic lock controller detects the first door has been closed; and initiate, by the dressing room system or the concierge system, a checkout process to enable the first user to purchase one or more of the one or more inventory items.

12. The physical retail establishment system of claim 11, wherein the one or more hardware computer processors are further configured to execute the plurality of computer executable instructions in order to:

generate, by the central server, a second pull request associated with any of the one or more inventory items that were not purchased by the first user;

access, by the stockroom system, the second pull request;

present to the second user, by the electronic display of the stockroom system, an interactive graphical user interface that enables the second user to view a second action associated with the second pull request, the second action comprising at least transporting of the any of the one or more inventory items that were not purchased by the first user from the wardrobe to the stockroom area, and to indicate that the second action has been completed; and transmit, from the stockroom agent to the central server, a fourth API request comprising data indicating the second pull request has been completed.

13. The physical retail establishment system of claim 12, wherein the one or more hardware computer processors are further configured to execute the plurality of computer executable instructions in order to:

disable, by the central server, association of any of the one or more inventory items with a second unique fitting session until at least the second pull request has been completed.

14. The physical retail establishment system of claim 11, wherein the physical retail establishment comprises a plurality of dressing room areas, and at least one wardrobe associated with each of the plurality of dressing room areas.

15. The physical retail establishment system of claim 11, wherein the stockroom system comprises a tablet computer coupled to a band that is configured to attach to a forearm of the second user.

16. The physical retail establishment system of claim 11, wherein the central server is located in the physical retail establishment.

17. The physical retail establishment system of claim 11, wherein the central server is located remotely from the physical retail establishment.

18. A computer-readable, non-transitory storage medium having one or more computer programs stored thereon for causing a suitably programmed computer system to process by a plurality of processors computer-program code executable to perform an operation comprising:

enabling a dynamic in-person shopping experience at a retail establishment when the one or more computer programs are executed on the suitably programmed computer system, the suitably programmed computer system comprising a central server and a plurality of user access point systems, the plurality of user access point systems configured to be located at the retail establishment and comprising at least a showroom system configured to be located in a showroom area of the retail establishment, a dressing room system configured to be located in a dressing room area of the retail establishment, a portable concierge system, and a portable stockroom system;

managing, by the central server, one or more electronic databases configured to store data related to physical inventory of the retail establishment and to store data related to individual unique fitting sessions associated with the retail establishment;

presenting, by the central server, an API over a computer network to the plurality of user access point systems, the API comprising a plurality of endpoints that enable the plurality of user access point systems to create and manage the unique fitting sessions;

presenting to a first user, by an electronic display of the showroom system, an interactive graphical user interface that enables the first user to input user identifying information and to electronically browse the physical inventory of the retail establishment;

transmitting, from the showroom system to the central server, a first API request to create a new unique fitting session, the first API request comprising at least the user identifying information;

transmitting, from the central server to the showroom system, an identifier associated with the unique fitting session;

transmitting, from the showroom system to the central server, a second API request to add one or more inventory items to the unique fitting session, the second API request comprising at least the identifier associated with the unique fitting session and one or more identifiers associated with the one or more inventory items;

generating, by the central server, a pull request associated with the unique fitting session, the one or more inventory items, and a wardrobe of the retail establishment, the wardrobe comprising a first electronically controllable lock for selectively locking a first door and a second electronically controllable lock for selectively locking a second door, wherein the first and second electronically controllable locks are in electronic communication with the electronic lock controller to control whether the first and second electronically controllable locks are in a locked state or an unlocked state;

accessing, by the stockroom system, the pull request;

presenting to a second user, by an electronic display of the stockroom system, an interactive graphical user interface that enables the second user to view an action associated with the pull request, the action comprising at least transporting of the one or more inventory items from the stockroom area to the wardrobe, and to indicate that the action has been completed;

transmitting, from the stockroom system to the central server, a third API request comprising data indicating the pull request has been completed;

transmitting, from the central server to the concierge system, responsive to the central server receiving the third API request, a notification comprising data indicating the dressing room system is ready for the first user;

transmitting, from the central server to the dressing room system, data associated with the unique fitting session;

presenting to the first user, by an electronic display of the dressing room system, an interactive graphical user interface that enables the first user to view electronic images associated with the one or more inventory items that are located in the wardrobe;

responsive to detecting the first door of the wardrobe has been opened, controlling the second electronically controllable lock to keep the second electronically controllable lock in the locked state at least until the electronic lock controller detects the first door has been closed; and initiating, by the dressing room system or the concierge system, a checkout process to enable the first user to purchase one or more of the one or more inventory items.

19. The computer-readable, non-transitory storage medium of claim 18, the operations further comprising:

generating, by the central server, a second pull request associated with any of the one or more inventory items that were not purchased by the first user;

accessing, by the stockroom system, the second pull request;

presenting to the second user, by the electronic display of the stockroom system, an interactive graphical user interface that enables the second user to view a second action associated with the second pull request, the second action comprising at least transporting of the any of the one or more inventory items that were not purchased by the first user from the wardrobe to the stockroom area, and to indicate that the second action has been completed; and transmitting, from the stockroom agent to the central server, a fourth API request comprising data indicating the second pull request has been completed.

20. The computer-readable, non-transitory storage medium of claim 19, the operations further comprising:

disabling, by the central server, association of any of the one or more inventory items with a second unique fitting session until at least the second pull request has been completed.

* * * * *